US008115986B2

(12) United States Patent  
Ichikawa et al.

(10) Patent No.: US 8,115,986 B2
(45) Date of Patent: Feb. 14, 2012

(54) MIRROR DEVICE COMPRISING DRIVE ELECTRODE EQUIPPED WITH STOPPER FUNCTION

(75) Inventors: Hirotoshi Ichikawa, Hachioji (JP); Yoshihiro Maeda, Hachioji (JP); Fusao Ishii, Menlo Park, CA (US)

(73) Assignees: Silicon Quest Kabushiki-Kaisha (JP); Olympus Corporation (JP)

(*) Notice: Subject to any disclaimer, the term of this patent is extended or adjusted under 35 U.S.C. 154(b) by 252 days.

(21) Appl. No.: 12/231,685

(22) Filed: Sep. 4, 2008

(65) Prior Publication Data

US 2009/0257110 A1   Oct. 15, 2009

Related U.S. Application Data

(63) Continuation-in-part of application No. 11/136,041, filed on May 23, 2005, now Pat. No. 7,304,783, and a continuation-in-part of application No. 11/183,216, filed on Jul. 16, 2005, now Pat. No. 7,215,460, which is a continuation-in-part of application No. 10/918,677, filed on Aug. 14, 2004, now Pat. No. 7,183,618.

(60) Provisional application No. 60/967,880, filed on Sep. 6, 2007, provisional application No. 60/930,151, filed on Jan. 17, 2008.

(51) Int. Cl.
*G02B 26/00* (2006.01)
(52) U.S. Cl. ........................................ 359/290
(58) Field of Classification Search ............. 359/290
See application file for complete search history.

(56) References Cited

U.S. PATENT DOCUMENTS

| 4,269,896 | A | * | 5/1981 | Yamagishi | 428/696 |
| 5,519,282 | A | * | 5/1996 | Takizawa et al. | 313/478 |
| 5,583,688 | A | | 12/1996 | Hornbeck | |
| 6,128,121 | A | * | 10/2000 | Choi et al. | 359/224.1 |
| 6,198,180 | B1 | | 3/2001 | Garcia | |
| 6,747,390 | B2 | * | 6/2004 | Park et al. | 310/309 |
| 6,798,560 | B2 | * | 9/2004 | Aubuchon | 359/291 |
| 6,856,068 | B2 | * | 2/2005 | Miller et al. | 310/311 |
| 6,980,347 | B2 | * | 12/2005 | Patel et al. | 359/290 |
| 6,992,810 | B2 | | 1/2006 | Pan et al. | |
| 2003/0016435 | A1 | | 1/2003 | Atobe et al. | |
| 2005/0007557 | A1 | | 1/2005 | Huibers | |
| 2005/0225834 | A1 | * | 10/2005 | Regan | 359/291 |
| 2006/0082856 | A1 | | 4/2006 | Patel et al. | |
| 2006/0152690 | A1 | | 7/2006 | DiCarlo et al. | |
| 2007/0091416 | A1 | | 4/2007 | Katoh et al. | |

* cited by examiner

*Primary Examiner* — Scott J Sugarman
*Assistant Examiner* — Vipin Patel
(74) *Attorney, Agent, or Firm* — Bo-In Lin

(57) ABSTRACT

The present invention provides a mirror device, comprising: a plurality of deflectable mirrors; an elastic member for supporting the mirror and to deflect the mirror to a range of deflecting angles; a drive electrode for driving the mirror; a control circuit for giving electric charge to the drive electrode and controlling the deflecting direction of the mirror; and a substrate on which the drive electrode and the elastic member, wherein the drive electrode is placed within an area on the substrate the mirror is projected on, has an outer form constituted by sides approximately in parallel to the outer peripheral lines of the present mirror and by sides approximately parallel to the deflection axis of the present mirror, or a form obtained by dividing the aforementioned outer form into a plurality thereof, and also fills the role of a stopper for regulating the deflection angle of the mirror.

24 Claims, 39 Drawing Sheets

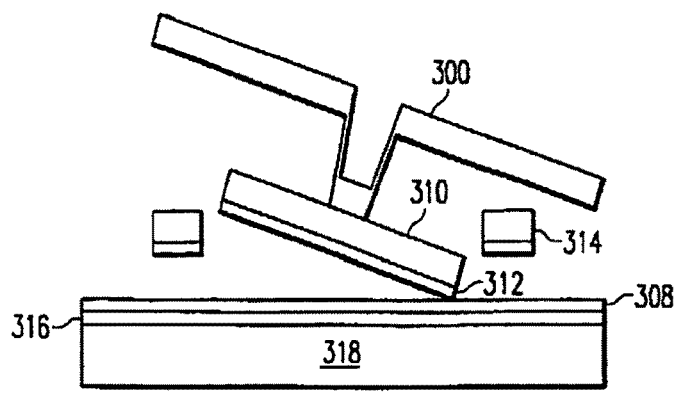
Prior Art (US5583688)
F I G. 2
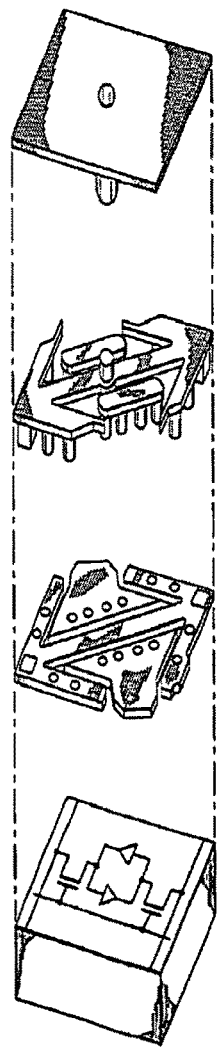
Prior Art (US2006/0152690)
F I G. 3

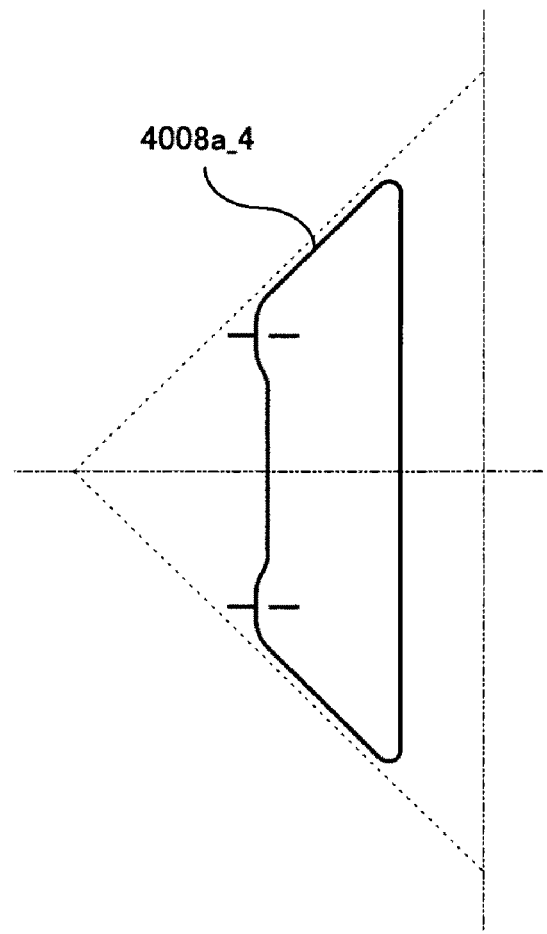
F I G. 1 6 A
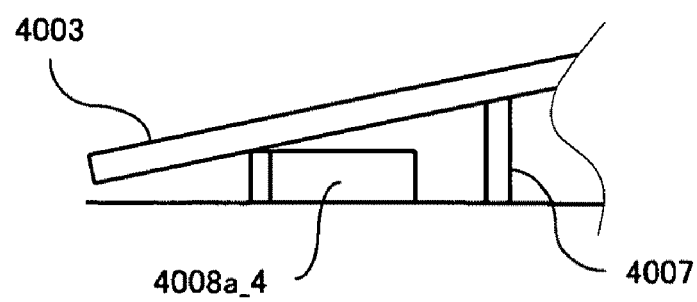
F I G. 1 6 B

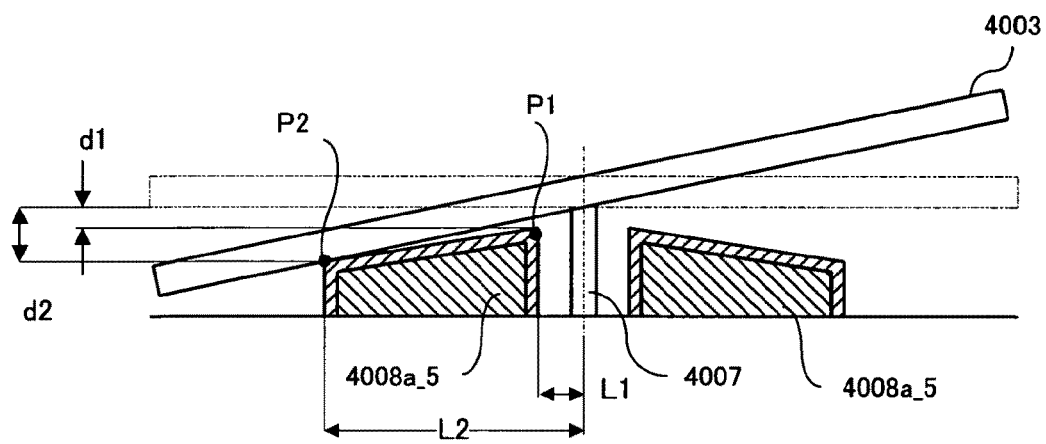
F I G. 1 7
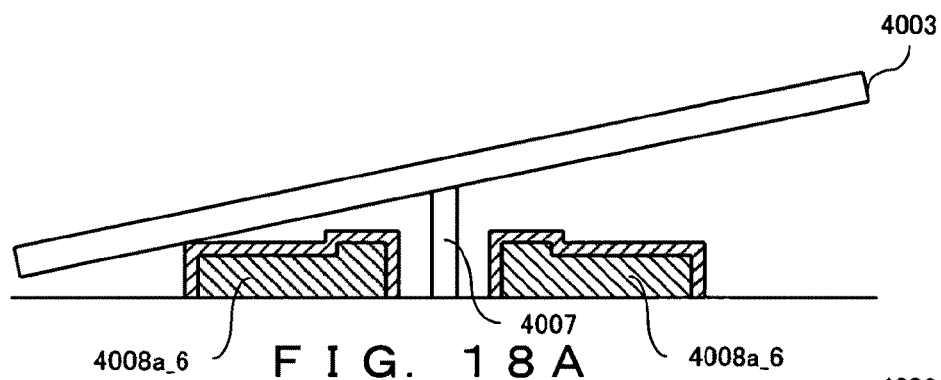
F I G. 1 8 A
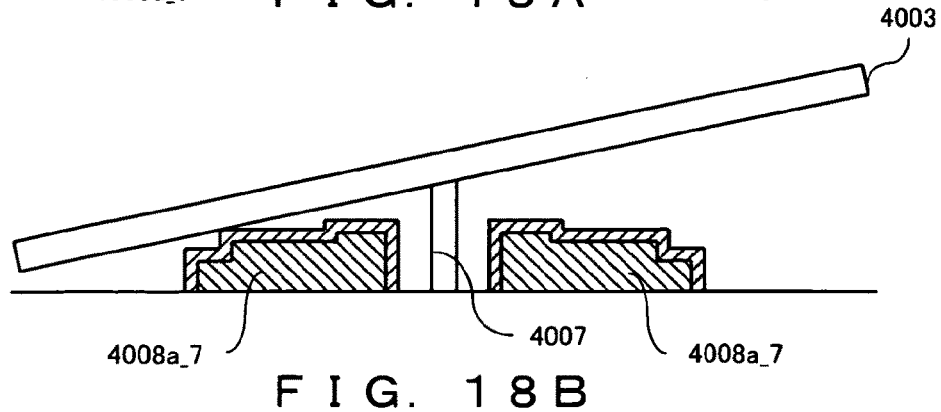
F I G. 1 8 B

MIRROR DEVICE COMPRISING DRIVE ELECTRODE EQUIPPED WITH STOPPER FUNCTION

This application is a Non-provisional Application claiming a Priority date of Sep. 6, 2007 based on a previously filed Provisional Application 60/967,880 and a Non-provisional patent application Ser. No. 12/009,389 filed on Jan. 17, 2008 for the Provisional Patent Application 60/930,151. The Provisional Application 60/930,151 is a Continuation in Part (CIP) Application of another U.S. patent application Ser. No. 10/918,677 filed on Aug. 14, 2004 and now issued into U.S. Pat. No. 7,183,618. The disclosures made in these Patent Applications filed by the same Applicant of this Non-Provisional Application are hereby incorporated by reference in this Patent Application. This Application is further a Continuation-in-Part Application of two previously filed application Ser. Nos. 11/136,041 filed on May 23, 2005 (now issued into U.S. Pat. No. 7,304,783) and 11/183,216 filed on Jul. 16, 2005 (now issued into U.S. Pat. No. 7,215,460). The disclosures made in these Applications as filed by the same Application of this Application are further incorporated by reference.

BACKGROUND OF THE INVENTION

1. Field of the Invention

The present invention relates generally to an image projection system implemented with a mirror device commonly known as a "digital micromirror device" or "micromirror device". More particularly, this invention relates to an image projection system implemented with a mirror device that includes micromirrors having a specific range of natural oscillation frequency and operated with more than three controllable states wherein one of the controllable states is related to the natural oscillation frequency of the micromirrors.

2. Description of the Related Art

Even though there have been significant advances made in recent years in the technology of implementing electromechanical micromirror devices as spatial light modulators, there are still limitations and difficulties when these are employed to provide high quality image displays. Specifically, when the display images are digitally controlled, the image qualities are adversely affected due to the fact that the image is not displayed with a sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. FIG. 1A refers to a digital video system 1, disclosed in a relevant U.S. Pat. No. 5,214,420, that includes a display screen 2. A light source 10 is used to generate light energy for the ultimate illumination of display screen 2. Light 9 generated is further concentrated and directed toward lens 12 by mirror 11. Lens 12, 13 and 14 form a beam columnator, which operates to columnate light 9 into a column of light 8. A spatial light modulator 15 is controlled by a computer 19 through data transmitted over data cable 18 to selectively redirect a portion of the light from path 7 toward lens 5 to display on screen 2. As shown in FIG. 1B, the SLM 15 has a surface 16 that includes an array of switchable reflective elements, e.g., micromirror devices 32, such as elements 17, 27, 37, and 47 as reflective elements attached to a hinge 30. When element 17 is in one position, a portion of the light from path 7 is redirected along path 6 to lens 5, where it is enlarged or spread along path 4 to impinge onto the display screen 2 so as to form an illuminated pixel 3. When element 17 is in another position, light is not redirected towards display screen 2 and hence pixel 3 remains dark.

The on-and-off states of the micromirror control scheme, as that implemented in the U.S. Pat. No. 5,214,420 and by most of the conventional display systems, impose a limitation on the quality of the display. Specifically, in a conventional configuration of the control circuit, the gray scale (PWM between ON and OFF states) is limited by the LSB (least significant bit, or the least pulse width). Due to the on-off states implemented in the conventional systems, there is no way to provide a shorter pulse width than LSB. The least brightness, which determines gray scale, is the light reflected during the least pulse width. The limited gray scales lead to degradations of image display.

Specifically, FIG. 1C exemplifies a conventional circuit diagram of control circuit for a micromirror, according to the U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors M6, M8, and M9 are n-channel transistors. The capacitances, C1 and C2, represent the capacitive loads of the memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The dual-state switching, as illustrated by the control circuit, controls the micromirrors to position either at an ON or an OFF orientation, as that shown in FIG. 1A. The brightness, i.e., the gray scales of display for a digitally control image system, is determined by the length of time the micromirror stays at an ON position. The length of time a micromirror is controlled at an ON position is in turned controlled by a multiple bit word. For simplicity of illustration, FIG. 1D shows the "binary time intervals" when controlled by a four-bit word. As shown in FIG. 1D, the time durations have relative values of 1, 2, 4, 8 that in turn define the relative brightness for each of the four bits, where 1 is for the least significant bit and 8 is for the most significant bit. According to the control mechanism as shown, the minimum controllable differences between gray scales is a brightness represented by a "least significant bit" that maintains the micromirror at an ON position.

When adjacent image pixels are shown with a great degree of difference in the gray scales, due to a very coarse scale of controllable gray scale, artifacts are shown between these adjacent image pixels. That leads to image degradations. The image degradations are especially pronounced in the bright areas of display, where there are "bigger gaps" between gray scales of adjacent image pixels. For example, it can be observed in an image of a female model that there are artifacts shown on the forehead, the sides of the nose and the upper arm. The artifacts are generated by technical limitations in that the digitally controlled display does not provide sufficient gray scales. Thus, in the bright areas of the display, the adjacent pixels are displayed with visible gaps of light intensities.

As the micromirrors are controlled to have a fully on and fully off position, the light intensity is determined by the length of time the micromirror is at the fully on position. In order to increase the number of gray scales of a display, the speed of the micromirror must be increased such that the digital control signals can be increased to a higher number of bits. However, when the speed of the micromirrors is increased, a stronger hinge is necessary for the micromirror to sustain the required number of operational cycles for a designated lifetime of operation, In order to drive micromirrors supported on a stronger hinge, a higher voltage is required. In this case, the voltage may exceed twenty volts and may even be as high as thirty volts. Micromirrors manufactured by applying the CMOS technologies would probably not be suitable for operation at this higher range of voltages, and therefore, DMOS micromirror devices may be required. In order to achieve a higher degree of gray scale control, more complicated manufacturing processes and larger device areas are necessary when DMOS micromirrors are implemented. Conventional modes of micromirror control are therefore facing a technical challenge in that the gray scale accuracy has to be sacrificed for the benefits of smaller and more cost effective micromirror display, due to the operational voltage limitations.

There are many patents related to light intensity control. These Patents include U.S. Pat. Nos. 5,589,852, 6,232,963, 6,592,227, 6,648,476, and 6,819,064. There are further patents and patent applications related to different shapes of light sources. These Patents includes U.S. Pat. Nos. 5,442,414 and 6,036,318 and Application 20030147052. U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation including U.S. Pat. Nos. 20,25,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed or provided direct resolution for a person of ordinary skill in the art to overcome the limitations and difficulties discussed above.

Therefore, a need still exists in the art of image display systems, applying digital control of a micromirror array as a spatial light modulator, for new and improved systems such that the difficulties and limitations discussed above can be resolved.

Incidentally, an address electrode for driving a mirror is placed under the mirror. The reason is that the mirror and address electrode need to be placed as closely to each other as possible in order to effectively generate a sufficient magnitude of a coulomb force for driving the mirror. The Coulomb force for driving the mirror is inversely proportional to the second power of the distance between the electrode and mirror. Further, the Coulomb force is also dependent on the area size of the address electrode, that is, the Coulomb force increases with the area size of the address electrode, and an address electrode with a sufficient area size needs to be placed under the mirror.

A miniaturization of a mirror device is naturally accompanied by a reduction in the space for placing an address electrode. In addition, a stopper is placed under the mirror, separate from the address electrode, to regulate the deflection angle of a mirror. The stopper abuts the mirror when the mirror is fully deflected. In a situation in which the mirror device is miniaturized, decreasing the space available for placing the address electrode, the conventional method of configuring of the address electrode and the stopper will be faced with a technical problem in that the space for placing the address electrode is further reduced, making it very difficult to obtain a sufficient magnitude of the coulomb force.

FIG. 2 is a cross sectional view for showing the structure of a mirror device for controlling a mirror deflection angle in the conventional mirror device, as disclosed in U.S. Pat. No. 5,583,688. This mirror device comprises a landing yoke 310, which is connected to a mirror 300. The yoke 310 deflects with the mirror 300. The yoke 310 includes a tip 312 formed in a part of the landing yoke 310. The tip 312 contacts a metallic layer, which is formed separately from the address electrode 314 to stop the mirror before the mirror 300 deflects to an angular position to come into contact with the address electrode 314, thereby regulating the deflection angle of the mirror 300. In such a configuration, the landing yoke and tip occupy part of the space available for placing an electrode, making it difficult to increase the size of the address electrode.

FIG. 3 shows the structure for regulating a mirror deflection angle in the conventional mirror device, as disclosed in US Patent Application 20060152690. Although this patent application discloses a structure that has eliminated the landing yoke, however, the mirror device still has a tip as a separate component for determining the deflection angle of the mirror. The tip functioning as a stopper is disposed in the space that would be available for placing an address electrode. In a mirror device with configuration shown in FIG. 3, it would be difficult to increase the size of the address electrode.

FIG. 4 shows cross sectional views of a mirror to illustrate the structure for regulating a mirror deflection angle in the conventional mirror device, as disclosed in U.S. Pat. No. 6,198,180. In the mirror device disclosed by the patent, the configuration includes a stop post, which is separate from a capacitor panel to define the maximum deflection angle of the mirror. Therefore, the electrode size is still limited by the extra space occupied by the capacitor stop post and the capacitor panel.

FIG. 5 shows a cross section view of a mirror device for illustrating the structure for regulating a mirror deflection angle in the conventional mirror device, as disclosed in U.S. Pat. No. 6,992,810. The mirror device comprises a mechanical stop element, which regulates the deflection angle of a mirror, directly under the mirror. The mechanical stop element abuts on a landing electrode that is maintained at the same potential as the mirror. This disclosure also makes it difficult to increase the electrode size.

In order to provide mirror device by implementing the conventional pulse width modulator (PWM) to generate images with higher levels of gray scale, a higher drive voltage is required. A higher drive voltage is necessary due the requirement to deflect the mirrors supported on hinges that have a higher elasticity constant for mirrors oscillating at a higher speed in order to achieve higher levels of gray scale. For these reasons, there are still technical difficulties and limitation exist to further miniaturize the mirror device while providing improved quality of display images with higher resolution of gray scales by applying conventional mirror configurations and control techniques.

SUMMARY OF THE INVENTION

In consideration of the above-described problems and limitations, one aspect of the present invention is to miniaturize a mirror device and provide a projection apparatus that implements this miniaturized mirror device.

A first exemplary embodiment of the present invention is a mirror device, comprising: a plurality of deflectable mirrors; an elastic member for supporting the mirror to deflect to different deflecting angles; a drive electrode for driving the mirror; a control circuit for giving electric charge to the drive electrode and controlling the deflecting direction of the mirror; and a substrate on which the drive electrode and the elastic member are formed, wherein the drive electrode is placed within an area on the substrate the mirror is projected on, has an outer form constituted by sides approximately in parallel to the outer peripheral lines of the present mirror and by sides approximately parallel to the deflection axis of the present mirror, or a form obtained by dividing the aforementioned outer form into a plurality thereof, and also fills the role of a stopper for regulating the deflection angle of the mirror.

A second exemplary embodiment of the present invention is the mirror device according to the first exemplary embodiment, wherein the drive electrode is equipped with opposite surfaces, which are opposite to the mirror and of which the distances from the present mirror are different.

A third exemplary embodiment of the present invention is the mirror device according to the first exemplary embodiment, wherein the drive electrode has a plurality of surfaces in parallel to the bottom surface of the mirror.

A fourth exemplary embodiment of the present invention is the mirror device according to the third exemplary embodiment, wherein the contact part of the drive electrode contacting with the mirror or a deflection member that deflects with the mirror is any of the border parts of the plurality of surfaces of the drive electrode.

A fifth exemplary embodiment of the present invention is the mirror device according to the first exemplary embodiment, satisfying the relationship of $$d1 \geq (L1*d2)/L2,$$

where "L1" is the distance between the edge of the drive electrode on a side close to the deflection axis of the mirror and the present deflection axis, "L2" is the distance between the edge of the drive electrode on a side far from the deflection axis of the mirror and the present deflection axis, "d1" is the distance between the bottom surface of the mirror on the edge of the drive electrode on a side close to the deflection axis of the mirror and the drive electrode, and "d2" is the distance between the bottom surface of the mirror on the edge of the drive electrode on a side far from the deflection axis of the mirror and the drive electrode.

A sixth exemplary embodiment of the present invention is the mirror device according to the first exemplary embodiment, wherein the contact part of the drive electrode contacting with the mirror or a deflection member that deflects with the mirror is anywhere other than the edge of the drive electrode on a side far from the deflection axis of the present mirror.

A seventh exemplary embodiment of the present invention is the mirror device according to the first exemplary embodiment, wherein the drive electrode has a form so that a contact with the mirror or a deflection member that deflects with the mirror is a point contact.

An eighth exemplary embodiment of the present invention is the mirror device according to the first exemplary embodiment, wherein the drive electrode has a form so that a contact with the mirror or a deflection member that deflects with the mirror is a line contact.

A ninth exemplary embodiment of the present invention is the mirror device according to the first exemplary embodiment, wherein the drive electrode has a form so that a contact with the mirror or a deflection member that deflects with the mirror is an area contact.

A tenth exemplary embodiment of the present invention is the mirror device according to the ninth exemplary embodiment, wherein the contact part of the drive electrode contacting with the mirror or a deflection member that deflects with the mirror is a slope surface having the same slope angle as the deflection angle of the mirror.

An eleventh exemplary embodiment of the present invention is the mirror device according to the first exemplary embodiment, wherein there is a plurality of contact parts of the drive electrode contacting with the mirror or a deflection member that deflects with the mirror.

A twelfth exemplary embodiment of the present invention is the mirror device according to the eleventh exemplary embodiment, wherein a plurality of the contact parts are individually placed apart from each other by no less than 30% of the deflection axis length of the mirror.

A thirteenth exemplary embodiment of the present invention is the mirror device according to the first exemplary embodiment, wherein at least a part of the drive electrode including the contact part contacting with the mirror or a deflection member that deflects with the mirror is covered with an insulation member, and the dielectric strength voltage of the insulation member is no less than 2 times the drive voltage of the mirror.

A fourteenth exemplary embodiment of the present invention is the mirror device according to the thirteenth exemplary embodiment, wherein the dielectric strength voltage of the insulation member is no less than 3 volts.

A fifteenth exemplary embodiment of the present invention is the mirror device according to the first exemplary embodiment, wherein the mirror has an approximate square form, and the deflection axis of the mirror is on the diagonal line thereof.

A sixteenth exemplary embodiment of the present invention is the mirror device according to the first exemplary embodiment, wherein the pitch between the adjacent mirrors is between 4 µm and 10 µm.

A seventeenth exemplary embodiment of the present invention is the mirror device according to the first exemplary embodiment, wherein the deflection angle of the mirror is equal to an angle α which is determined by an aperture ratio of a projection optical system satisfying a theoretical resolution determined by the pitch of the adjacent mirrors in a direction projecting a modulated light to a projection light path, while the deflection angle is no less than the angle α in a direction other than the direction projecting the modulated light to the projection light path.

An eighteenth exemplary embodiment of the present invention is the mirror device according to the first exemplary embodiment, wherein at least a part of the drive electrode including the contact part contacting with the mirror or a deflection member that deflects with the mirror is covered with a passivation material.

A nineteenth exemplary embodiment of the present invention is the mirror device according to the eighteenth exemplary embodiment, wherein the passivation material is a halide.

A twentieth exemplary embodiment of the present invention is the mirror device according to the first exemplary embodiment, wherein at least a part of the drive electrode is covered with a low reflection material.

A twenty-first exemplary embodiment of the present invention is the mirror device according to the first exemplary embodiment, wherein at least a part of the drive electrode is covered with a film having a film thickness of ¼ of the wavelength of the visible light.

A twenty-second exemplary embodiment of the present invention is a projection apparatus, comprising: a light source; an illumination optical system for condensing the illumination light emitted from the light source and directing the light; a mirror device array, comprising a plurality of deflectable mirror elements, for modulating the illumination light emitted from the light source; and a projection optical system for projecting the light modulated by the mirror device array, wherein the mirror element includes a mirror and a drive electrode for driving the mirror, the deflection angle of the mirror is determined by the aperture ratio of the projection optical system satisfying a theoretical resolution that is determined on the basis of the pitch of the adjacent mirrors, and the drive electrode also fills the function of a stopper for regulating the deflection angle.

A twenty-third exemplary embodiment of the present invention is the projection apparatus according to the twenty-second exemplary embodiment, wherein the deflection angle of the mirror is between 2 degrees and 14 degrees relative to the horizontal state of the present mirror.

A twenty-fourth exemplary embodiment of the present invention is a projection apparatus, comprising: a light source; an illumination optical system for condensing the illumination light emitted from the light source and directing the light; a mirror device array, comprising a plurality of deflectable mirror elements, for modulating the illumination light emitted from the light source; and a projection optical system for projecting the light modulated by the mirror device array, wherein the mirror element includes a mirror and a drive electrode for driving the mirror, the deflection angle of the mirror is larger than an angle that is determined by the aperture ratio of the projection optical system satisfying a theoretical resolution that is determined on the basis of the pitch of the adjacent mirrors, and the drive electrode also fills the role of a stopper for regulating the deflection angle.

BRIEF DESCRIPTION OF DRAWINGS

FIG. 2 is a side cross sectional view for showing the configuration for regulating a mirror deflection angle in a conventional mirror device;

FIG. 3 is a series of perspective top views for showing the configuration for regulating a mirror deflection angle in a conventional mirror device;

FIG. 16A is a diagram showing another form of an electrode, as viewed from above, comprised in a mirror element of a mirror device according to the embodiment of the present invention;

FIG. 16B is a diagram showing a cross section of an electrode (from FIG. 16A) comprised in a mirror element of a mirror device according to the embodiment of the present invention;

FIG. 17 is a diagram showing the cross-section of another form of an electrode comprised in a mirror element of a mirror device according to the embodiment of the present invention;

FIG. 18A is a diagram showing the cross-section of another form of an electrode comprised in a mirror element of a mirror device according to the embodiment of the present invention;

FIG. 18B is a diagram showing the cross-section of another form of an electrode comprised in a mirror element of a mirror device according to the embodiment of the present invention;

DETAILED DESCRIPTION OF THE PREFERRED EMBODIMENTS

Outline of the Device

Image projection apparatuses implemented with a spatial light modulator, such as a transmissive liquid crystal, a reflective liquid crystal, a mirror array and other similar image modulation devices, are widely known.

A spatial light modulator is formed as a two-dimensional array of elements,—ranging from tens of thousands to millions of miniature modulation elements, with the individual elements enlarged and displayed as the individual pixels corresponding to an image to be displayed onto a screen by way of a projection lens.

Spatial light modulators generally used for projection apparatuses primarily include two types: 1.) a liquid crystal device, formed by sealing a liquid crystal between transparent substrates, for modulating the polarizing direction of incident light and providing them with a potential and 2.) a mirror device deflecting miniature micro electro mechanical systems (MEMS) mirrors with electrostatic force and controlling the reflecting direction of illumination light.

One embodiment of the above described mirror device is disclosed in U.S. Pat. No. 4,229,732, in which a drive circuit using MOSFET and deflectable metallic mirrors are formed on a semiconductor wafer substrate. The mirror can be deformed by electrostatic force supplied from the drive circuit and is capable of changing the reflecting direction of the incident light.

Meanwhile, U.S. Pat. No. 4,662,746 has disclosed an embodiment in which one or two elastic hinges retain a mirror. If the mirror is retained by one elastic hinge, the elastic hinge functions as a bending spring. If two elastic hinges retain the mirror, they function as torsion springs to incline the mirror and thereby deflecting the reflecting direction of the incident light.

Figure 1A:
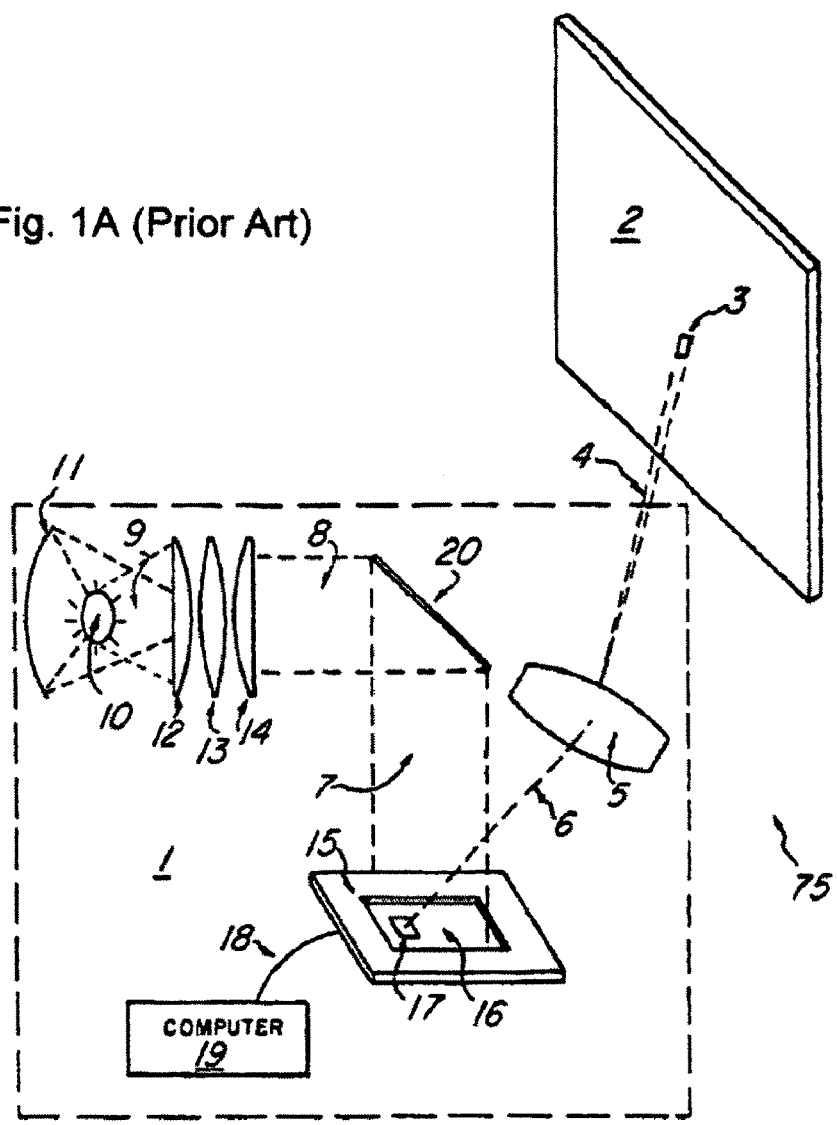
FIG. 1A is a functional block diagram for showing the configuration of a projection apparatus according to a conventional technique.
Figure 1B:
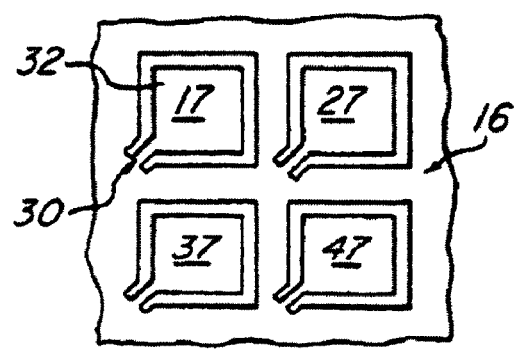
FIG. 1B is a to view for showing the configuration of a mirror element of the projection apparatus according to a conventional technique.
Figure 1C:
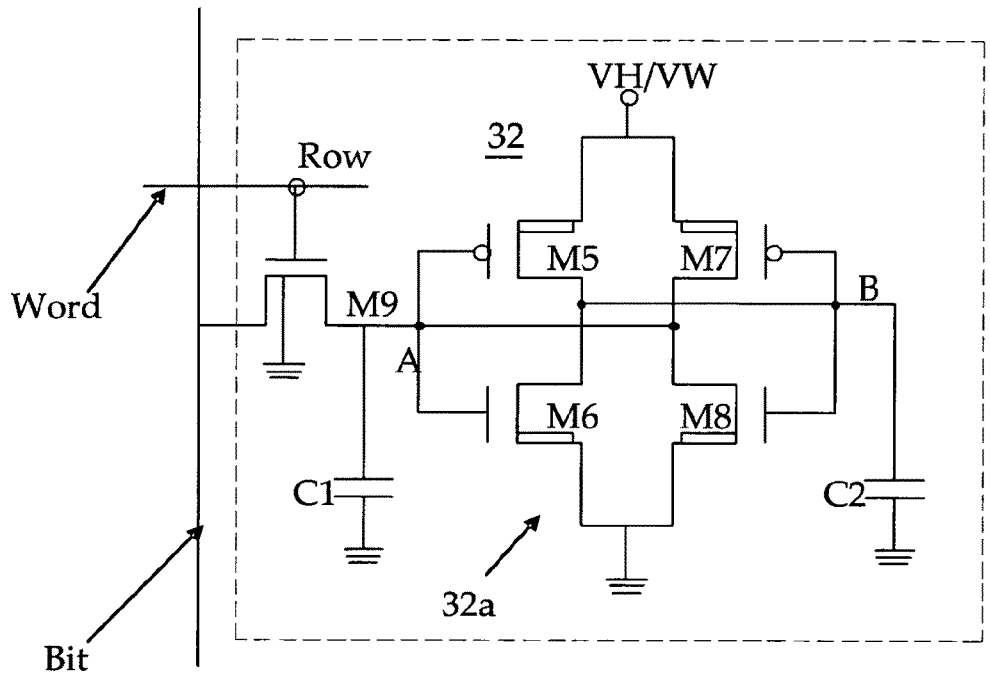
FIG. 1C is a circuit diagram for showing the configuration of the drive circuit of a mirror element of the projection apparatus according to a conventional technique.
Figure 1D:
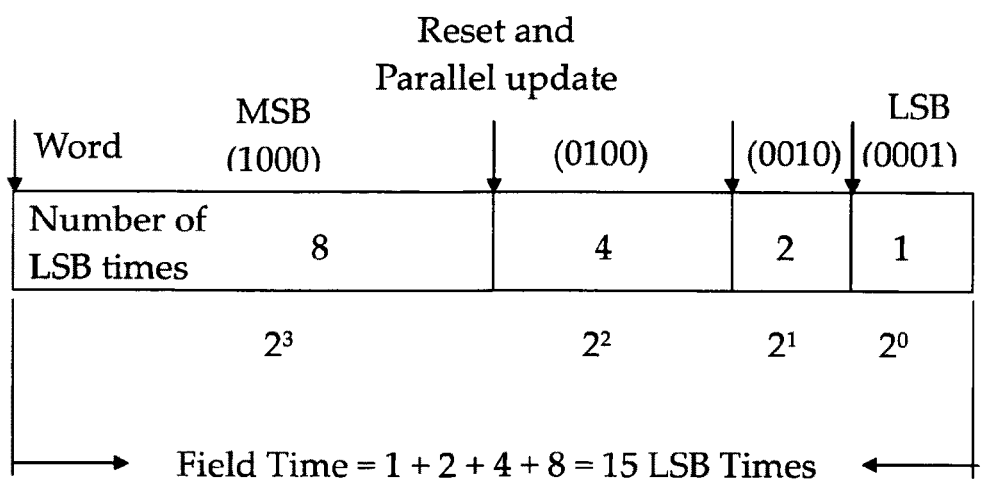
FIG. 1D is a timing diagram for showing the format of image data used in the projection apparatus according to a conventional technique.
Figure 4:
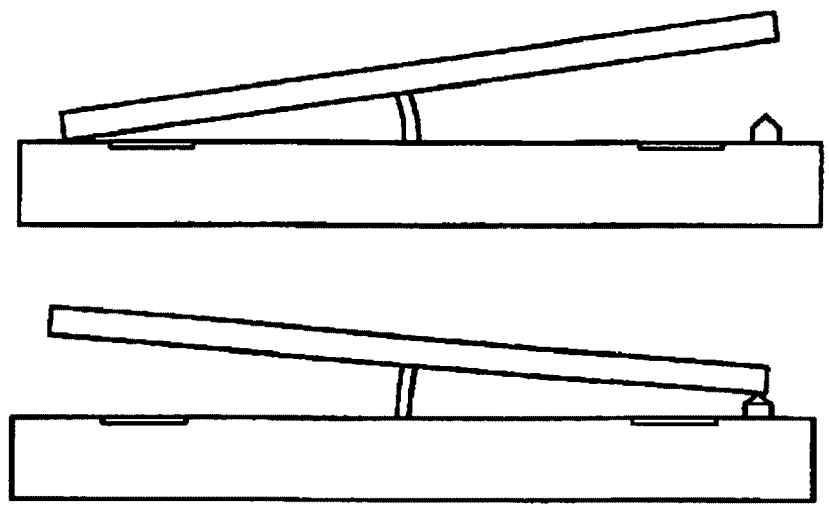
FIG. 4 shows two alternate cross sectional views to illustrate the configuration for regulating a mirror deflection angle in a conventional mirror device.
Figure 5:
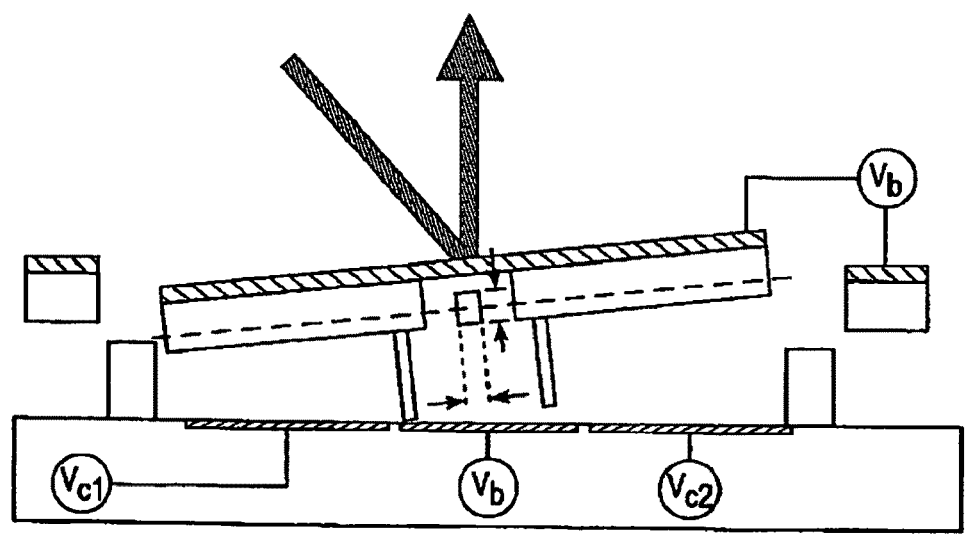
FIG. 5 is a side cross sectional view for showing the configuration for regulating a mirror deflection angle in a conventional mirror device.
Figure 6:
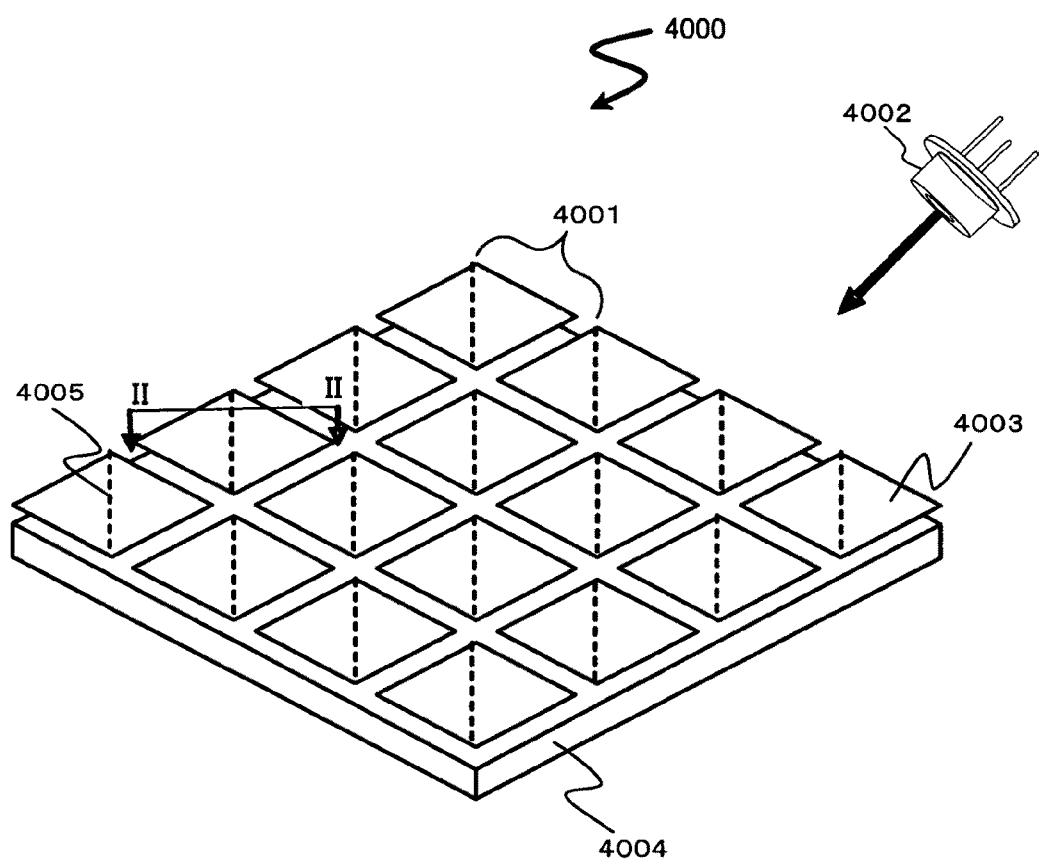
FIG. 6 is a top view for showing a diagonal perspective view of a mirror device comprised of, in two dimensions on a device substrate, a plurality of mirror elements, each controlling the reflecting direction of an incident light by the deflection a mirror.

FIG. 6 is a diagram of a diagonal view of a mirror device that includes micromirrors 4003 configures as two dimension arrays. Each of the plurality of mirror elements is controlled to oscillate and deflect to specific angles for reflecting the incident light according to the mirror control signals. The mirror device 4000 includes mirror elements 4001 arranged as two-dimensional arrays on a device substrate 4004. Each of these mirror elements includes=address electrodes (not shown here), elastic hinge (not shown here), and a mirror 4003 supported by the elastic hinge. In FIG. 6, each of these multiple mirror elements 4001 comprises a square mirror 4003. The square mirrors 4003 are arrayed alone two horizontal directions in constant intervals on the device substrate 4004.

The mirror 4003 of one mirror element 4001 is controlled by applying a voltage to the address electrode provided on the device substrate 4004. The mirror driven by a drive electrode abuts a landing electrode, which is structured separately from the drive electrode, and thereby a prescribed maximum tilt angle is maintained. A "landing chip", which possesses a spring property, is formed on the point of contact location between the landing electrode and the mirror when to aid the mirror to reverse an oscillation direction a when controlled by a voltage applied to an electrode on the opposite side of the hinge. The parts forming the landing chip and the landing electrode are maintained at the same potential so that contact will not cause a shorting or other similar disruption.

Outlines of Mirror Size and Resolution

The mirror 4003 has a square shape and the length of each side of the square is between 4 µm and 10 µm. The mirrors are placed on a semiconductor wafer substrate in such a manner as to minimize the gap between adjacent mirrors so that random reflection light from the gap that may interfere the image display is minimized to prevent a degradation of the image display due to a poor contrast.

Furthermore, the ratio (referred to as "aperture ratio" hereinafter) of the effective reflection surface to the pixel placement region is commonly set at approximately no less than 80%, with the reflection ratio approximately designated at no lower than 80%. The gap between adjacent mirrors is preferably reduced to a range between 0.15 µm and 0.55 µm, while avoiding physical interference with adjacent mirror elements. A mirror device with improved aperture also has an advantage to reduce the energy irradiated on the device substrate through the gap between adjacent mirrors and accordingly decrease operational failures caused by extraneous heating and a photoelectric effect.

A mirror device formed on a substrate must include an appropriate number of mirror elements for displaying image with sufficient number of image display elements generally referred to as image pixels. The appropriate number of image display elements is determined in compliance with the resolution of a display specified by the Video Electronics Standards Association (VESA) and with the television-broadcasting standard. The number of mirror elements in compliance with the WXGA (with the resolution of 1280×768), as specified by the VESA, and in which mirrors are arrayed in intervals (referred to as "pitch" hereinafter) of 10 µm./A sufficiently miniature mirror device is configured with the display area having a diagonal length of about 15.49 mm (0.61 inches).

Outline of the Introduction of Laser Light Source

Figure 7:
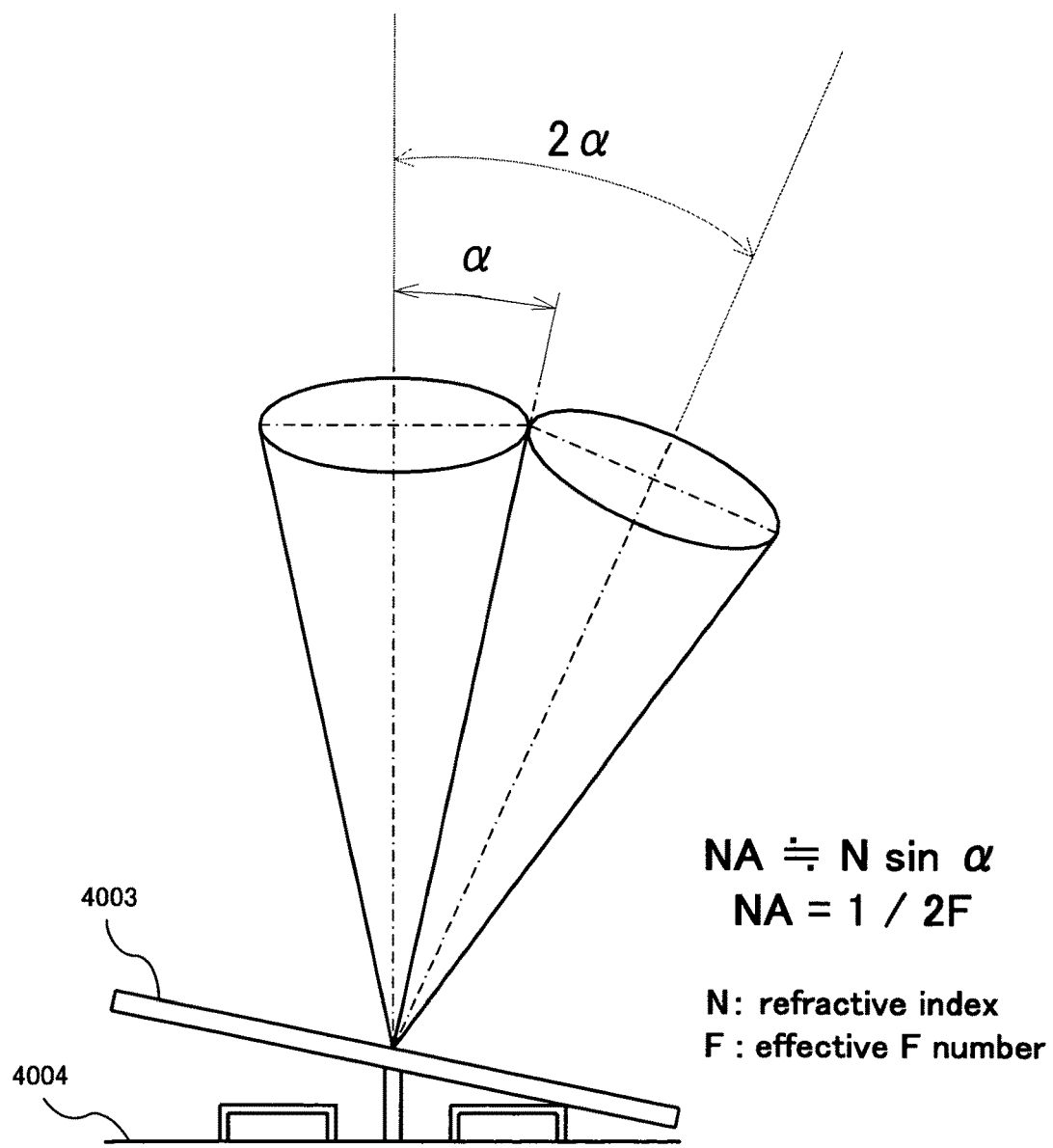
FIG. 7 is a side perspective diagram for showing the relationship among the numerical aperture NA1 of an illumination light path, the numerical aperture NA2 of a projection light path and the deflection angle of a mirror.

Referring to FIG. 7 for a description of the functional relationships among the numerical aperture (NA) NA1 of an illumination light path, the numerical aperture NA2 of a projection light path and the tilt angle α of a mirror for a projection apparatus implemented with a display device as described above. Assuming that the tilt angle α of a mirror 4003 is 12 degrees. When a modulated light reflected by the mirror 4003 and incident to the pupil of the projection light path is set perpendicular to a device substrate 4004, the illumination light is incident at an angle 2α, that is, 24 degrees, relative to the perpendicular axis of the device substrate 4004. For the light reflected by the mirror to be most efficiently incident to the pupil of the projection lens, it is desirable for the numerical aperture of the projection light path to be equal to the numerical aperture of the illumination light path. If the numerical aperture of the projection light path is smaller than that of the illumination light path, the illumination light cannot be sufficiently transmitted into the projection light path. On the other hand, if the numerical aperture of the projection light path is larger than that of the illumination light path, the illumination light can be entirely transmitted; but then the projection lens becomes unnecessarily large, which increases the inconvenience in terms of configuring the projection apparatus. Furthermore, in this case, the light fluxes of the illumination light and projection light must be directed apart from each other because the optical members of the illumination system and those of the projection system must be physically placed in separate locations in an image display system.

It is possible to reduce an extraneous space between the light flux of the illumination light and that of the projection light by designing a layout so that the aforementioned light fluxes are adjacent to each other, as exemplified in FIG. 7.

From the above considerations, when a mirror device with the tilt angle of a mirror at 12 degrees is used, the numerical aperture (NA) NA1 of the illumination light path and the numerical aperture NA2 of the projection light path are preferably set as follows:

$$NA1 = NA2 = \sin \alpha = \sin 12°$$

The F number of the illumination light path is designated as Fa and the F number of the projection light path is designated as Fb, the numerical aperture can be converted into an F number as follows:

$$Fa = Fb = 1/(2*NA) = 1/(2*\sin 12°) = 2.4$$

In order to maximize the projection of illumination light emitted from a non-polarized light source in the emission direction of light, such as a high-pressure mercury lamp or a xenon lamp, which are generally used for a projection apparatus, it's necessary to maximize the projecting angle of light onto the cross sectional surface of the light path of the illumination light. Since the numerical aperture of the illumination light path is determined by the specification of the tilt angle of the mirror. The tilt angle of the mirror must be increased in order to increase the numerical aperture of the illumination light path.

However, there is a technical difficulty associated with a configuration by increasing the tilt angle of the mirror due to a fact that such system requires a higher drive voltage to drive the mirror:

The electrostatic force F generated between the mirror and electrode is given by the following expression:

$$F=(\epsilon*S*V^2)/(2*d^2),$$

where "S" is the area size of the electrode, "V" is a voltage, "d" is the distance between the electrode and mirror, and "ϵ" is the permittivity of vacuum.

The equation clearly illustrates that the drive force is decreased in proportion to the square of the distance d between the electrode and mirror. It is possible to increase the drive voltage in order to compensate for the decrease in the drive force associated with the increase in the distance. However, the drive voltage is about 5 to 10 volts in the drive circuit by means of a CMOS process used for driving a mirror, and therefore, a relatively special process, such as a DMOS process is required if a drive voltage in excess of about 10 volts is needed. A DMOS process would greatly increase the cost of a mirror device and hence, is undesirable. Further, for the purpose of cost reduction, it is desirable to obtain as many mirror devices as possible from a single semiconductor wafer substrate in order to improve the productivity.

Shrinking the pitch between mirror elements reduces the size of the mirror device. The area size of an electrode is also reduced in association with a reduction in the size of the mirror, which also leads to less driving power.

Along with these requirements for miniaturizing a mirror device, there is a design tradeoff for further consideration because of the fact that the larger a mirror device, the brighter is the display image when the conventional light lamp is used as the light source. Attributable to a optical functional relationship generally known as etendue, the efficiency of the non-polarized light projected from the conventional lamp may be substantially reduced. The adverse effects must be taken into consideration as an important factor for designing and configuring an image projection system, particularly for designing the light sources.

Figure 8A:
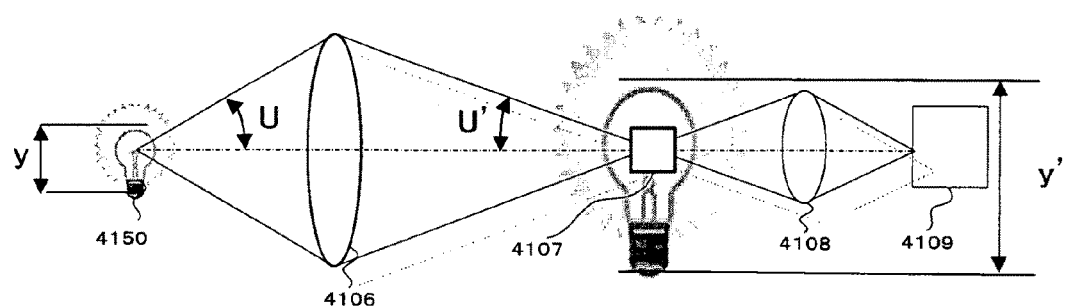
FIG. 8A is an illustration of the optical transmissions for illustrating the etendue by depicting the projection of an image, by way of an optical device, using a discharge lamp light source.

Referring to FIG. 8A, a light source 4150 projects an illumination light through a light source lens to impinge onto a device 4107. The light is then transmitted from the device 4107 through a projection length 4108 to project an image 4109. In this optical system, the optical transmissions may be represented by the following equation:

$$y*u=y'*u',$$

where "y" is the size of the light source, "u" is the import angle of light on the light source side, "y'" is the size of a light source image and "u'" is the converging angle on the image side.

A reduction of the size of the device 4107 leads to reduction in the angle of the light projected from the light source 4150 impinging onto the device. A smaller projection angle from the light source however leads to an undesirable effect of sacrificing the brightness of the projected images.

Figure 8B:
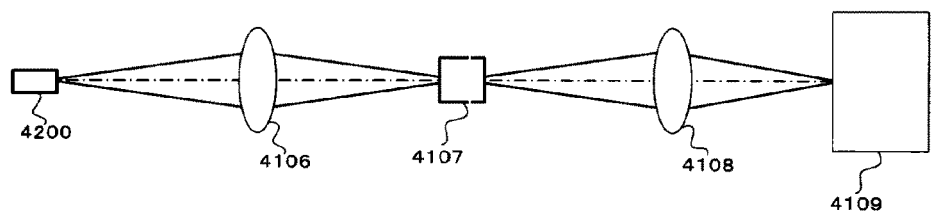
FIG. 8B is an illustration of the optical transmissions for projecting an image, by way of an optical device, using a laser light source in the embodiment of the present invention.
Figure 8C:
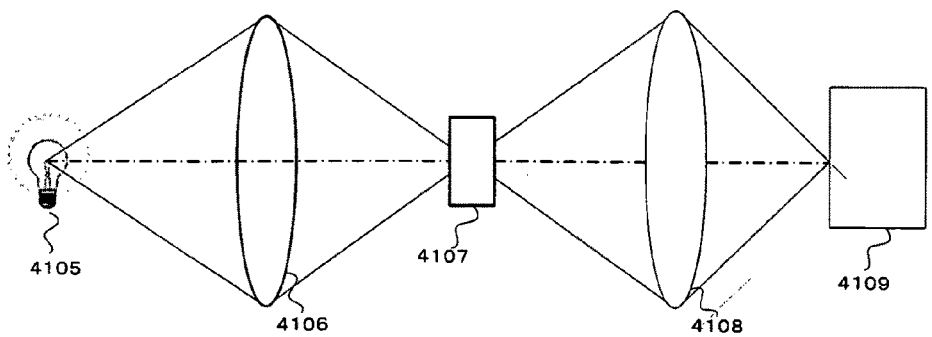
FIG. 8C is an illustration of the optical transmissions for projecting an image, by way of an optical device, using a discharge lamp.

Accordingly, the embodiment of the present invention is configured to use a laser light source 4200 to emit coherent and polarized light as shown in FIG. 8B. A more efficient energy utilization is achievable when an image display system of this invention implement the laser light source 4200 to obtain a sufficient amount of energy even the illumination light is projected onto the device 4107 with smaller projection angle in contrast to the conventional lamp 4105 shown in FIG. 8C. Therefore, a smaller device, e.g., a mirror device of this invention, for controlling and modulating the illumination light for image projection can be implemented without sacrificing the brightness of the display image.

Outline of Resolution Limit

The following descriptions explain how to determine the limit value of the aperture ratio of a projection lens. A projection apparatus implements the projection lens to enlarge and display the modulated pixels reflected form the surface of a mirror device according to the resolution requirement of the projection apparatus.

The pixel pitch of the mirror device is designated with a symbol "Rp" to represent the distance between adjacent mirror elements of the mirror device. The aperture ration of a projection lens is designated with a symbol "NA", the F number is designated with a symbol "F" and the wavelength of the light is designated by a symbol "λ". The limit value of the pixel pitch "Rp" between adjacent pixels on the projection surface is derived by the following equation:

$$Rp=0.61*\lambda/NA=1.22*\lambda*F$$

With a miniaturized mirror and decreased pitch between mirror elements, according to the functional relationship among the aperture ratio NA, which is theoretically required for resolving individual mirrors, the F number for the projection lens, and the corresponding deflection angle of the mirror is calculated and listed in the following tables for the wavelength of light at λ400 nm, the green light (at λ=650 nm) and the red light (at λ=800 nm), respectively.

The NA required for providing a specified resolution in the projected image between adjacent mirror elements and the tilt angle of a mirror for separating the illumination light and projection light a specific NA:

| \multicolumn{4}{c}{At λ = 400 nm} | | | |
|---|---|---|---|
| Mirror device pixel pitch: μm | Aperture ratio: NA | F number for projection lens | Deflection angle of mirror: degrees |
| 4 | 0.061 | 8.2 | 3.49 |
| 5 | 0.049 | 10.2 | 2.79 |
| 6 | 0.041 | 12.3 | 2.33 |
| 7 | 0.035 | 14.3 | 2.00 |
| 8 | 0.031 | 16.4 | 1.75 |
| 9 | 0.027 | 18.4 | 1.55 |
| 10 | 0.024 | 20.5 | 1.40 |
| 11 | 0.022 | 22.5 | 1.27 |

| \multicolumn{4}{c}{At λ = 650 nm} | | | |
|---|---|---|---|
| Mirror device pixel pitch: μm | Aperture ratio: NA | F number for projection lens | Deflection angle of mirror: degrees |
| 4 | 0.099 | 5.0 | 5.67 |
| 5 | 0.079 | 6.3 | 4.54 |
| 6 | 0.066 | 7.6 | 3.78 |
| 7 | 0.057 | 8.8 | 3.24 |
| 8 | 0.050 | 10.1 | 2.84 |

-continued

At λ = 650 nm

| Mirror device pixel pitch: μm | Aperture ratio: NA | F number for projection lens | Deflection angle of mirror: degrees |
|---|---|---|---|
| 9 | 0.044 | 11.3 | 2.52 |
| 10 | 0.040 | 12.6 | 2.27 |
| 11 | 0.036 | 13.9 | 2.06 |

At λ = 800 nm

| Mirror device pixel pitch: μm | Aperture ratio: NA | F number for projection lens | Deflection angle of mirror: degrees |
|---|---|---|---|
| 4 | 0.122 | 4.1 | 6.97 |
| 5 | 0.098 | 5.1 | 5.58 |
| 6 | 0.081 | 6.1 | 4.65 |
| 7 | 0.070 | 7.2 | 3.99 |
| 8 | 0.061 | 8.2 | 3.49 |
| 9 | 0.054 | 9.2 | 3.11 |
| 10 | 0.049 | 10.2 | 2.79 |
| 11 | 0.044 | 11.3 | 2.54 |

Based on the above tables, it is clear that a sufficient F number for a projection lens required for resolving, in the projected image, individual pixels with, for example, 10 μm pixel pitch is theoretically F=20.5. The projection lens has an extremely small aperture when the wavelength of illumination light is λ=400 nm. In the meantime, the mirror would have a sufficient deflection angle of mere 1.4 degrees to provide the required resolution. The mirror device can be controlled and the mirror elements may be driven with a very low drive voltage.

However, as discussed above, the image brightness would be significantly reduced when a conventional non-coherent lamp as light source is implemented with an illumination lens matched with such a projection lens. Accordingly, a laser light source is implemented to circumvent the above-described problem attributable to the etendue. The implementation of the laser light source makes it possible to increase the F number for the illumination and projection optical systems to the number indicated in the table and to reduce the deflection angle of a mirror element as a result, thus enabling the configuration of a compact mirror device with a low drive voltage.

Further, the introduction of a laser light source, as in the present embodiment, provides the benefit of lowering the drive voltage, making it possible to further reduce the thickness of the circuit wiring pattern of a control circuit which controls the mirror. It is also possible to further reduce power consumption by setting the deflection angle of the mirror at a minimum for each frequency of light as the target of modulation. That is, the deflection angle of the mirror can be reduced for a mirror device for modulating, for example, the blue light as compared to the deflection angle of a mirror for the mirror device for modulating the red light. It is thus possible for a projection apparatus to be configured without increasing the sizes of optical components used in the apparatus when, for example, single color laser light sources are used for light sources, the respective illumination light paths are individually provided, and the optimal NAs are set for the respective illumination light paths.

It is also possible to cause the laser light source to perform pulse emission by configuring a circuit that emits the pulse emission of ON and OFF lights alternately for a predetermined period. Controlling the pulse emission of the light source makes it possible to adjust intensity in accordance with the image signal (that is, in accordance with the brightness and hue of the entire projection image) and to express the finer gradations of the display image. Further, lowering the output of the laser light makes it possible to vary the dynamic range of an image and to darken the entire screen in response to a dark image.

Furthermore, performing a pulse control makes it possible to turn OFF a laser light source as appropriate during a non-image display period or during a period of changing over the colors of a display image in one frame. As a result, a temperature rise due to the irradiation with extraneous light onto a mirror device can be alleviated.

The following description provides detail descriptions of a first preferred embodiment of the present invention, in reference to the configuration of the above described mirror device.

First Embodiment

The following detail descriptions are provided for a mirror device according to the present embodiment, with reference to the accompanying drawings.

Figure 9A:
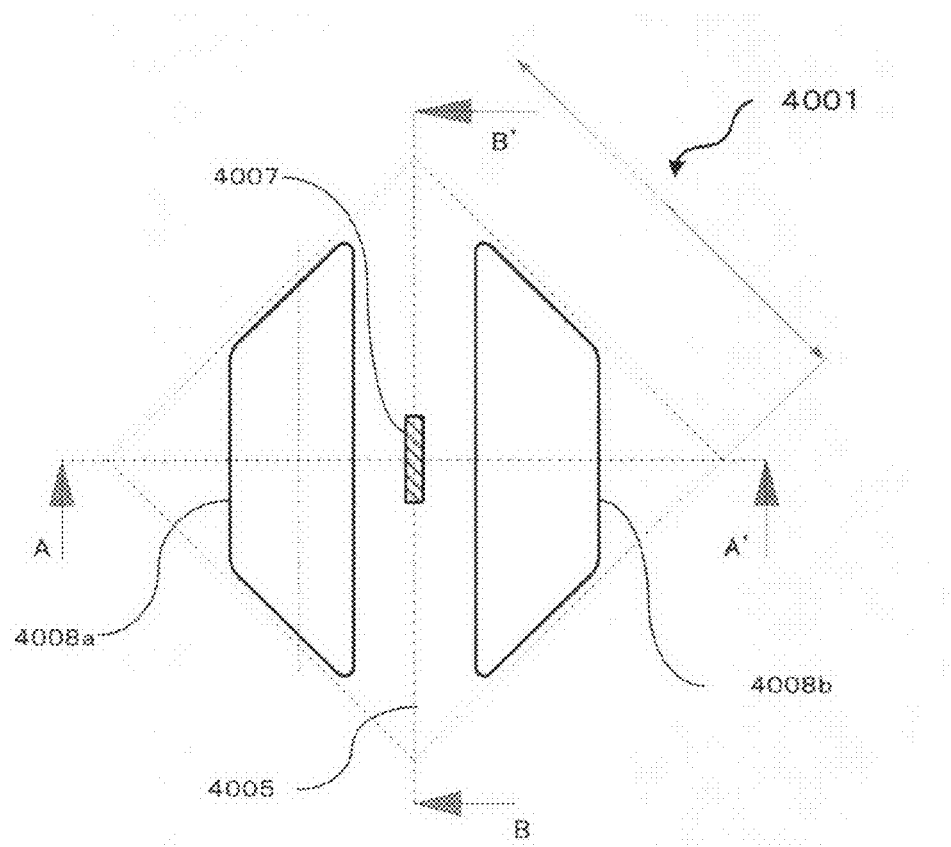
FIG. 9A is a cross-sectional diagram, as viewed from above, of a mirror element of a mirror device according to the embodiment of the present invention.
Figure 9B:
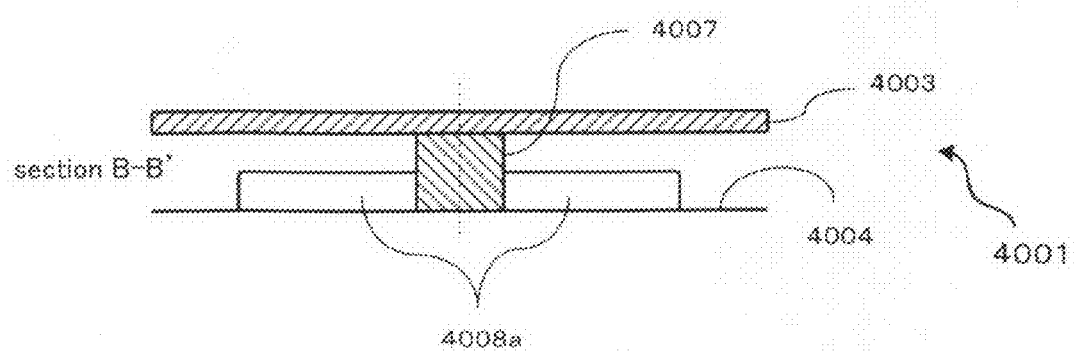
FIG. 9B is a cross-sectional diagram, as viewed from the side, showing a configuration of a mirror element of a mirror device according to the embodiment of the present invention.
Figure 9C:
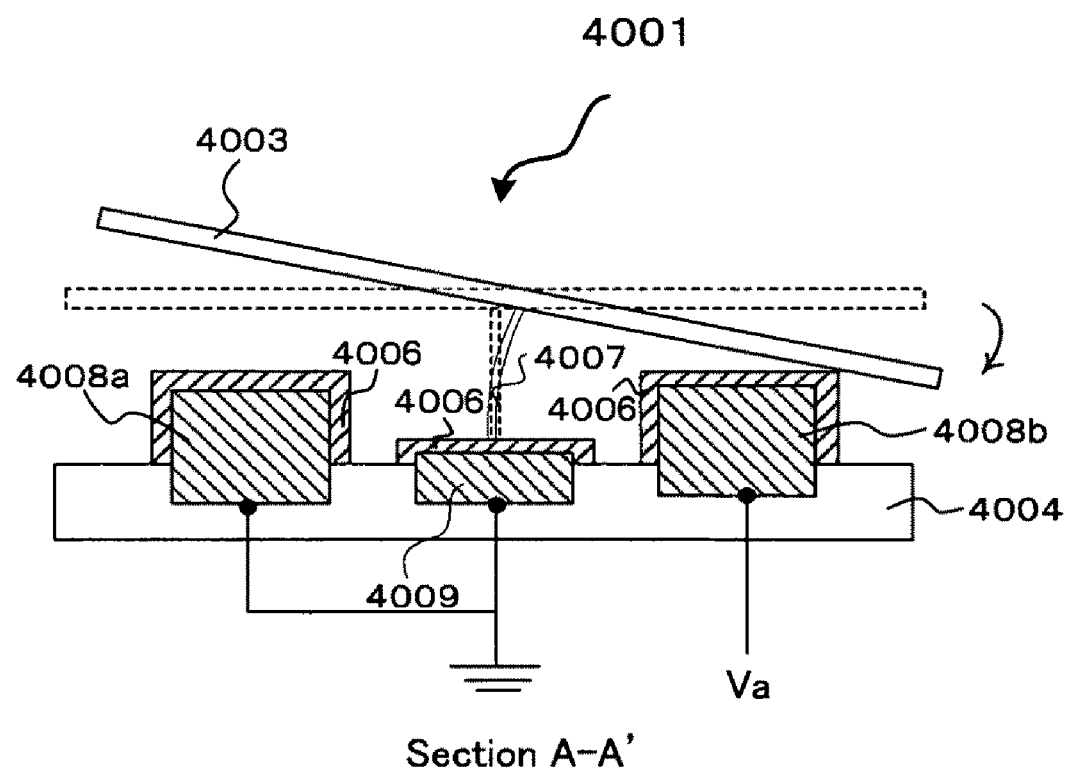
FIG. 9C is a cross-sectional diagram, as viewed from the side, showing a configuration of a mirror element of a mirror device according to the embodiment of the present invention.

FIGS. 9A through 9C are respectively a top view and a side cross sectional view of a mirror element implemented in a mirror device according to the present embodiment. FIG. 9A shows a mirror element, as viewed from above, with the mirror removed. FIG. 9B is a diagram of a cross-section of the mirror element of FIG. 9A taken along the line B-B' depicted in FIG. 9A. FIG. 9C is a diagram of a cross-section of the mirror element of FIG. 9A taken along the line A-A' depicted in FIG. 9A. The mirror element 4001 comprises a mirror 4003, an elastic hinge 4007 for supporting the mirror 4003, two address electrodes (i.e., address electrodes 4008a and 4008b) and memory cells (i.e., first memory cell 4010a and second memory cell 4010b—that correspond to the respective address electrodes.

In the mirror element shown in FIGS. 9A through 9C, the mirror 4003 is made of a highly reflective material, such as aluminum or gold, is supported by the elastic hinge 4007, of which the entirety or a part (e.g., the connection part with a fixed part, the connection part with a moving part or the intermediate part) is made of a silicon material, a metallic material or the like, and the mirror 4003 is placed on the device substrate 4004. Here, the silicon material may be composed of a poly-silicon, single crystal silicon, amorphous silicon, and combination of or similar kinds of materials, while the metallic material may include aluminum, titanium, or an alloy of them. Alternatively, a composite material produced by layering different materials may be used. Ceramic or glass may also be used to form the elastic hinge 4007.

The mirror 4003 is formed in the approximate shape of a square, with the length of a side, ranging between 4 μm and 10 μm in an exemplary embodiment. Further, the mirror pitch may be between 4 μm and 10 μm. The deflection axis 4005 of the mirror 4003 is on the diagonal line thereof.

The light emitted from a light source may be a coherent light such as a laser light source, to project onto the mirror 4003 along a orthogonal or diagonal direction relative to the deflection axis 4005.

The following is a description of the reason for placing the deflection axis of the mirror 4003 on the diagonal line thereof.

Figure 10A:
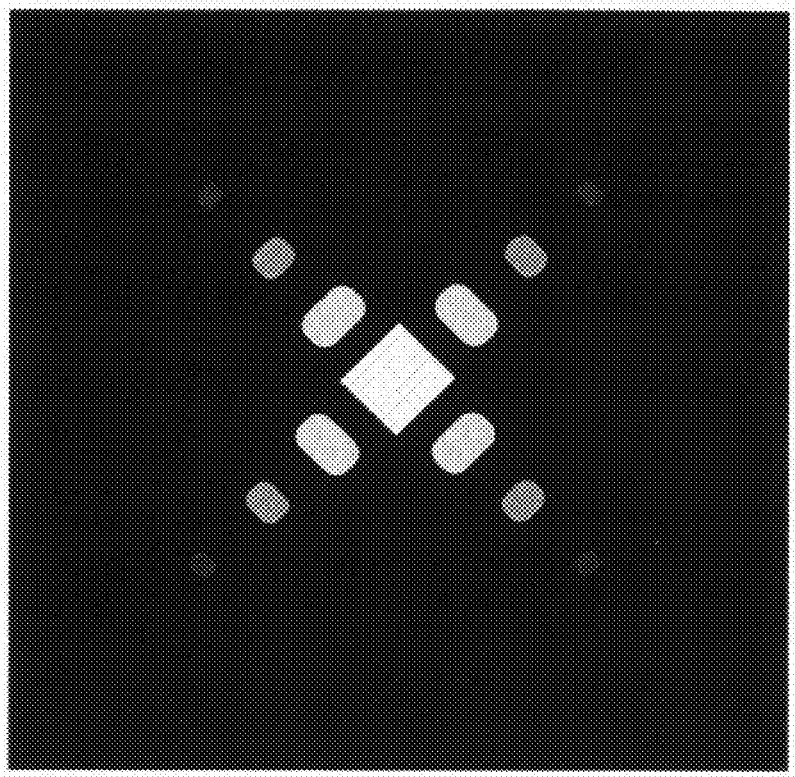
FIG. 10A is an image diagram for illustrating diffraction light generated when a mirror reflects light.
Figure 10B:
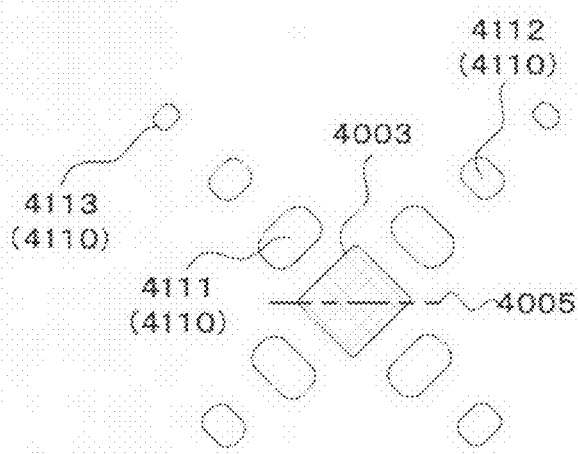
FIG. 10B is a diagram for illustrating diffraction light generated when a mirror reflects light.

FIGS. 10A and 10B are diagrams for showing the diffracted light patterns generated when the light is reflected by a mirror of a mirror device.

As shown in the figures, the diffracted light is generated as a result of irradiating the light onto a mirror shown in the center of the diagrams, and the diffracted light 4110 spreads in directions perpendicular to the four sides of the mirror 4003 as the primary diffracted light 4111, the secondary diffracted light 4112, the tertiary diffracted light 4113, and so on. As shown in FIG. 10A, the light intensity decreases gradually with the primary diffracted light 4111, secondary diffracted light 4112, tertiary diffracted light 4113, and so on. When using a laser light source, the coherence is improved by the uniformity of the wavelength of a laser light, distinguishing the diffracted light 4110. Note that the diffracted light 4110 also possesses an expansion to the depth direction of the mirror 4003 in three dimensions.

The mirror device 4000 shown in FIG. 6 can be configured to set the diagonal direction of the mirror 4003 as the deflection axis thereof, thereby making it possible to prevent the diffracted light 4110 from entering the projection optical system. As a result, the diffracted light 4110 does not enter the projection optical system, and thereby the contrast of a projected image is improved. It is also possible to enhance the contrast by setting the deflecting angle of the mirror 4003 at a large angle relative to the incidence pupil of the projection lens and by maintaining the numerical aperture of the illumination light at a lower value, thereby separating the OFF light from the incidence pupil of the projection lens by a greater distance. This is the reason for placing the deflection axis of the mirror 4003 on the diagonal line thereof.

The lower end of the elastic hinge 4007 is connected to the device substrate 4004 that includes a circuit for driving the mirror 4003. The upper end of the elastic hinge 4007 is connected to the bottom surface of the mirror 4003. In the exemplary embodiment, an electrode for securing an electrical continuity and an intermediate member for improving the strength of a member and improving the strength of connection may be placed between the elastic hinge 4007 and the device substrate 4004, or between the elastic hinge 4007 and the mirror 4003. Further, in the exemplary embodiment shown in FIG. 9C, a hinge electrode 4009 is formed between the elastic hinge 4007 and device substrate 4004. Note that a simple notation of "electrode" means the address electrode in the following description.

Figure 11A:
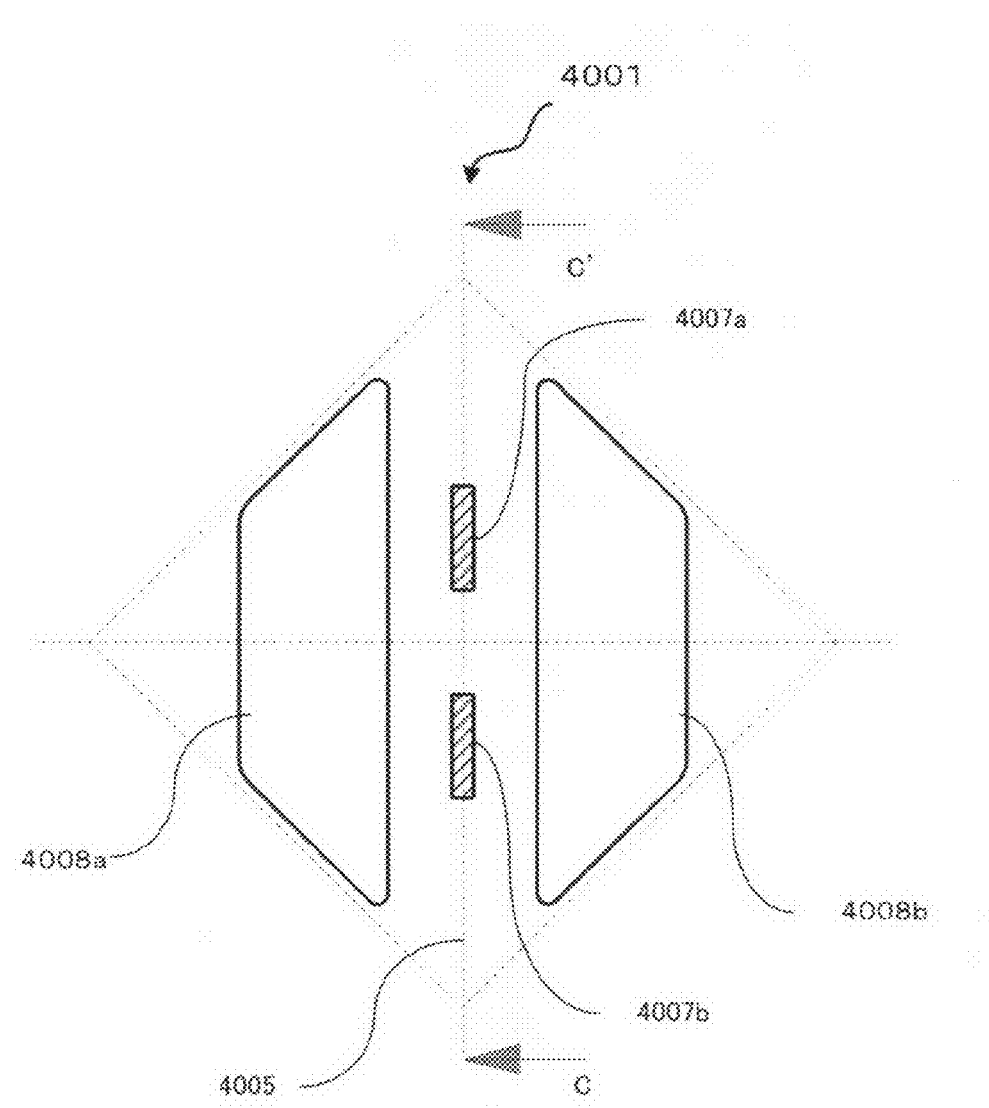
FIG. 11A is a cross-sectional diagram, as viewed from above, showing an example of a modification of a mirror element of a mirror device according to the embodiment of the present invention.
Figure 11B:
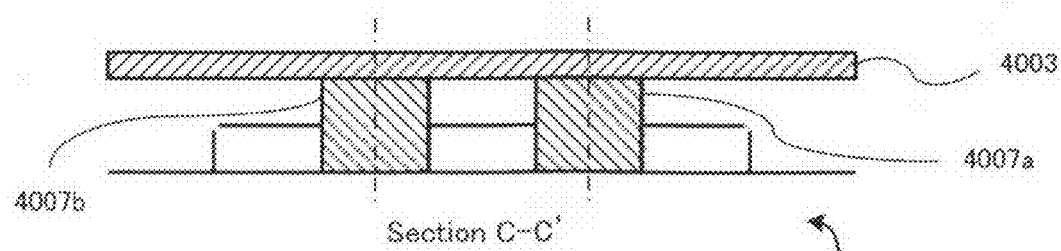
FIG. 11B is a cross-sectional diagram, as viewed from the side, showing an example of a modification of a mirror element of a mirror device according to the embodiment of the present invention.

FIGS. 11A and 11B are diagrams showing an example of a modification of a mirror element of a mirror device according to the present embodiment. FIG. 11A is a diagram of the mirror element, as viewed from above, with the mirror removed. FIG. 11B is a diagram of a cross-section of FIG. 11A as taken along the line C-C' depicted in FIG. 11A.

Note that a plurality of elastic hinges (refer to 4007a and 4007b) may be placed along the deflection axis 4005 of the mirror 4003, as shown in FIGS. 11a and 11b. Such a placement of elastic hinges is advantageous because the mirror is stabilized during a deflection operation. When a plurality of elastic hinges is placed, as shown in FIGS. 11a and 11b, the interval between the elastic hinges, or the interval between the multiple intermediate members placed between the hinge and substrate should be as large as possible, preferably no less than 30% of the deflection axis length of the mirror.

As shown in FIG. 9C, the electrodes 4008a and 4008b, used for driving the mirror 4003, are placed on the top surface of the device substrate 4004 and opposite to the bottom surface of the mirror 4003. The address electrodes are placed in either symmetrical or nonsymmetrical locations relative to the deflection axis 4005. The address electrodes may be formed with aluminum, tungsten or copper.

The mirror element 4001 further includes two memory cells, i.e., a first memory cell 4010a and a second memory cell 4010b, to apply voltages to the address electrodes 4008a and 4008b. The first and second memory cells 4010a and 4010b each includes a dynamic random access memory (DRAM) structure comprising field effect transistors (FETs) and a capacitance in this configuration. The structures of the individual memory cells 4010a and 4010b are not limited as such and may instead be, for example, a static random access memory (SRAM) structure, or similar kinds of memory circuits. Further, the individual memory cells 4010a and 4010b are connected to the respective address electrodes 4008a and 4008b to a COLUMN line 1, a COLUMN line 2, and a ROW line.

In the first memory cell 4010a, an FET-1 is connected to the address electrode 4008a to a COLUMN line 1 and ROW line, respectively, and a capacitance Cap-1 is connected between the address electrode 4008a and GND (i.e., the ground). Likewise, in the second memory cell 4010b, an FET-2 is connected to the address electrode 4008b, to COLUMN line 2 and ROW line, respectively, and a capacitance Cap-2 is connected between the address electrode 4008b and GND.

Controlling the signals on the COLUMN line 1 and ROW line applies a predetermined voltage to the address electrode 4008a, thereby making it possible to tilt the mirror 4003 towards the address electrode 4008a. Likewise, controlling the signals on the COLUMN line 2 and ROW line applies a predetermined voltage to the address electrode 4008b, thereby making it possible to tilt the mirror 4003 towards the address electrode 4008b.

Note that a drive circuit for each of the memory cells 4010a and 4010b is generally formed inside the device substrate 4004. Controlling the respective memory cells 4010a and 4010b, in accordance with the signal of image data, enables control of the deflection angle of the mirror 4003 and carries out the modulation and reflection of the incident light.

The following description is for the address electrode of a mirror element according to the present embodiment. FIGS. 13A, 13B, 14, 15, 16A, 16B, 17, 18A, 18B, 19A, 19B and 20A through 20C are diagrams for describing the configurations to form each of the address electrodes of the mirror element 4001 according to the present embodiment.

In the present embodiment, the address electrode also serves the function of a stopper, which determines the maximum deflection angle of a mirror. The maximum allowable deflection angle of a mirror is an angle determined by the aperture ratio of a projection lens that satisfies a theoretical resolution determined from the pitch of adjacent mirrors on the basis of the following equation:

$$d = 0.61 * \lambda / NA = 1.22 * \lambda * F$$

Figure 13A:
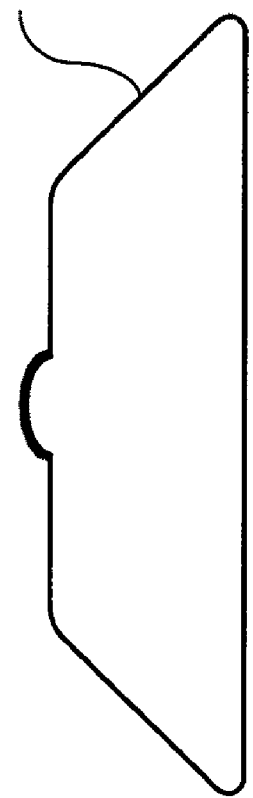
FIG. 13A is a diagram of an electrode, as viewed from above, comprised in a mirror element of a mirror device according to the embodiment of the present invention.
Figure 13B:
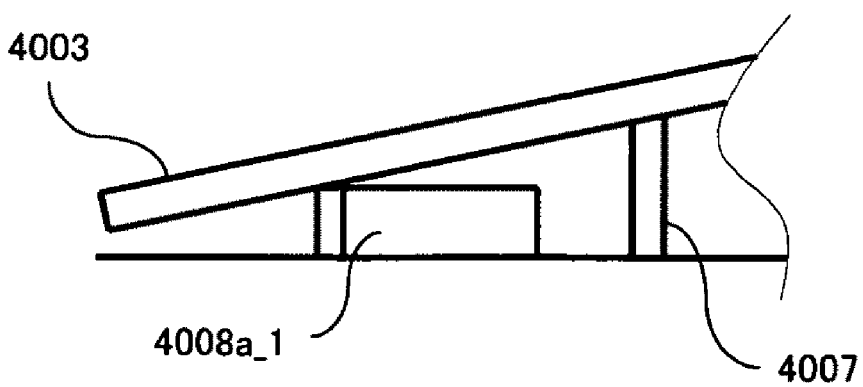
FIG. 13B is a diagram showing the cross section of an electrode (from FIG. 13A.) comprised in a mirror element of a mirror device according to the embodiment of the present invention.
Figure 14:
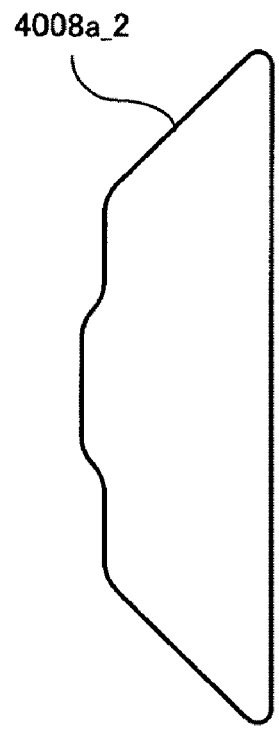
FIG. 14 is a diagram showing another form of an electrode, as viewed from above, comprised in a mirror element of a mirror device according to the embodiment of the present invention.

In another word, the deflection angle of a mirror may not be set at a lower angle than the determined angle. Since a laser light is transmitted with a uniform phase, the diffracted light has a higher light intensity than the light emitted from a mercury lamp. Therefore, the adverse effects of the diffracted light generally occurs to the non-coherent light projected from a lamp as a light source can be prevented by setting the deflection angle of mirror at a larger angle than the appropriate angle calculated from the numerical aperture NA of the light flux of a laser light source and the F number for a projection lens, thereby preventing the diffracted light from being reflected towards the projection lens. In an exemplary embodiment, the deflection angle of a mirror may be 10 to 14 degrees, or 2 to 10 degrees, relative to the horizontal state of the mirror 4003. In, a configuration in which the address electrode also serves as a stopper, the space available for the electrode is significantly increased compared to a conventional configuration with the address electrode formed separately from the stopper. The mirror device implemented with such mirror element can therefore be further miniaturized. "Stiction" is a well-known phenomenon resulting from an event when a mirror 4003 sticks to the contact surface between the mirror 4003 and address electrode (i.e., also a stopper). The stiction is due to surface tension or intermolecular force when the mirror is deflected. Accordingly, in order to reduce the occurrence of stiction between the mirror 4003 and address electrode, a part of the address electrode may be configured as a circular arc, as shown in FIGS. 13A and 13B, so as to reduce the contact with the mirror 4003 to a point, or as a form to reduce contact to a line, as shown in FIG. 14.

Figure 15:
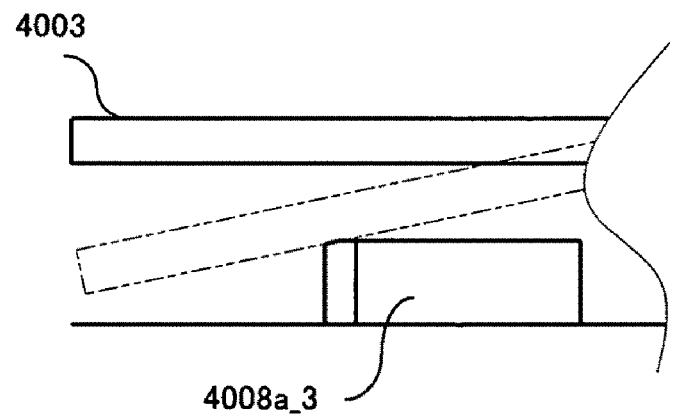
FIG. 15 is a diagram showing the cross-section of another form of an electrode comprised in a mirror element of a mirror device according to the embodiment of the present invention.

The performance of the mirror elements in the mirror device may be adversely affected as a result of excessive contact force between the parts of the address electrode in contact with the mirror 4003. In order to prevent the adverse effects, the mirror may be configured to incline in the same angle as the tilt angle of the mirror 4003 to adjust the contact pressure, as shown in FIG. 15. Note that the address electrode contacts the mirror 4003 face to face at a single point in the example shown in FIG. 15. The address electrode may also be configured to contact the mirror 4003 in multiple places as shown in FIGS. 16A and 16B, instead of being limited to a single spot. The configuration shown in FIGS. 16A and 16B is preferable because the deflecting direction of the mirror is stably maintained. In this case, the individual contact points are preferably placed apart from each other at a distance no less than 30% of the diagonal size of the mirror.

Further, a part of the address electrode, including at least the part contacting the mirror 4003, may be provided with a passivation layer, such as halide, in order to reduce the occurrence of stiction between the mirror 4003 and the address electrode. Moreover, an elastic member formed as an integral part of the address electrode may be used as stopper.

The address electrode is configured to have a shape of a trapezoid includes a top and a bottom side, which are approximately parallel to the deflection axis 4005. The trapezoid further includes sloped sides approximately parallel to the contour line of the mirror 4003 of the mirror device, in which the deflection axis 4005 of the mirror 4003 is matched with the diagonal line thereof, as shown in FIG. 9A. Since the electrode and stopper are not separately manufactured as in the conventional method, the electrode-stopper may be conveniently manufactured. The electrode may also be configured by dividing the above-described trapezoid into multiple parts.

In order to prevent undesirable reflection light from entering into the projection light path, at least a part of the electrode may be covered with a low reflectance material or a thin film layer that has a film thickness substantially equivalent to ¼ of the wavelength λ of visible light.

A difference in potentials needs to be generated between the mirror and electrode to drive the mirror by electrostatic force. The present embodiment using the electrode also as stopper is configured to provide the surface of the electrode and/or the rear surface of the mirror with an insulation layer(s) in order to prevent an electrical shorting at the point of mirror contact with the electrode. If the surface of the electrode is provided with an insulation layer, the configuration may also be such that the insulation layer is provided to only a part of the electrode, including the part in contact with the mirror. FIG. 9C illustrates the case of providing the surface of the address electrode (i.e., address electrodes 4008$a$ and 4008$b$) with an insulation layer 4006. The insulation layer is made of an oxidized compound, azotized compound, silicon, or silicon compound, e.g., SiC, $SiO_2$, $Al_2O_3$, and Si.

The material and thickness of the insulation layer is determined so that the dielectric strength voltage is maintained at no less than the voltage required to drive the mirror, preferably no less than 5 volts. For example, the dielectric strength voltage may be configured to be two times the drive voltage of the mirror or higher, 3 volts or higher, or 10 volts or higher. Further, selecting an insulation material resistant to the etchant used in the production process makes it possible for the material to function as the electrode protective film in the process of etching a sacrifice layer in the production process (which is described in detail later), thereby simplifying the production process.

The following description is for an exemplary embodiment to show the size and shape of an address electrode.

Referring to FIG. 17, where "L1" is the distance between the deflection axis and the edge of the electrode on the side closer to the deflection axis of the mirror 4003, "L2" is the distance between the deflection axis and the edge of the electrode on the side farther from the deflection axis, and "d1" and "d2" are the distances between the mirror's bottom surface and the electrode at the respective edges. "P1" is a representative point on the electrode edge on the side closer to the deflection axis of the mirror, and "P2" is a representative point on the electrode edge on the side farther from the deflection axis.

The exemplary embodiment as shown in FIG. 17 is a case in which the electrode is formed so that: d1<d2. In this configuration, the stopper that determines the tilt angle of the mirror 4003 is preferably placed at the point "P2", in consideration of a production variance of the electrode height that influences the deflection angle of the mirror. The present embodiment is accordingly configured to satisfy the relationship of:

$$d1 > (L1 * d2)/L2$$

This configuration provides an efficient space utilization of the space under the mirror and maintains a stable deflection angle of the mirror.

Figure 19A:
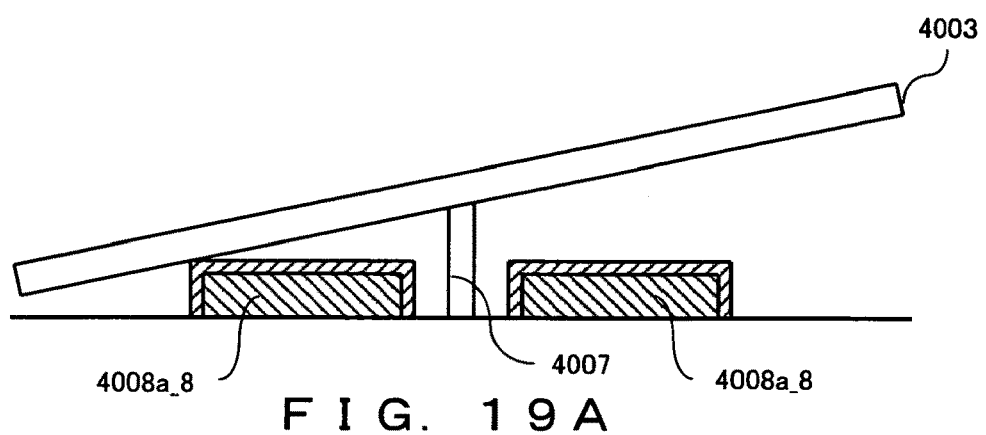
FIG. 19A is a diagram showing the cross-section of another form of an electrode comprised in a mirror element of a mirror device according to the embodiment of the present invention.
Figure 19B:
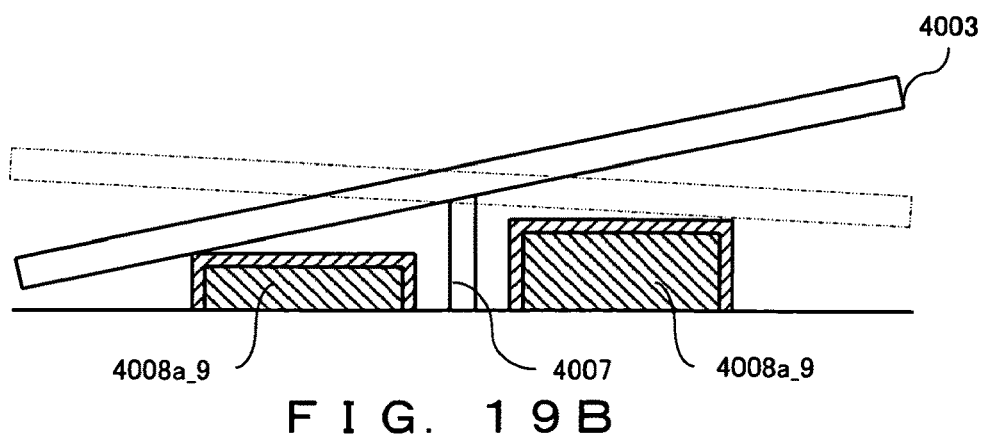
FIG. 19B is a diagram showing the cross section of another form of an electrode comprised in a mirror element of a mirror device according to the embodiment of the present invention.

Note that, while in the example shown in FIG. 17, the points P1 and P2 are in a continuous slope; an electrode with a stepped slope may be formed, as shown in FIGS. 18A and 18B, for ease of production. It is possible to form an electrode so that the deflection angle of the mirror 4003, when it comes in contact with the address electrode on one side is the same as the deflection angle on the other side, as shown in FIG. 19A. Alternately, it is possible to configure the address electrode such that the deflection angles of the mirror 4003 are different on the two sides, for example, the deflection angle in the OFF state may be configured to be larger than that in the ON state.

Figure 20A:
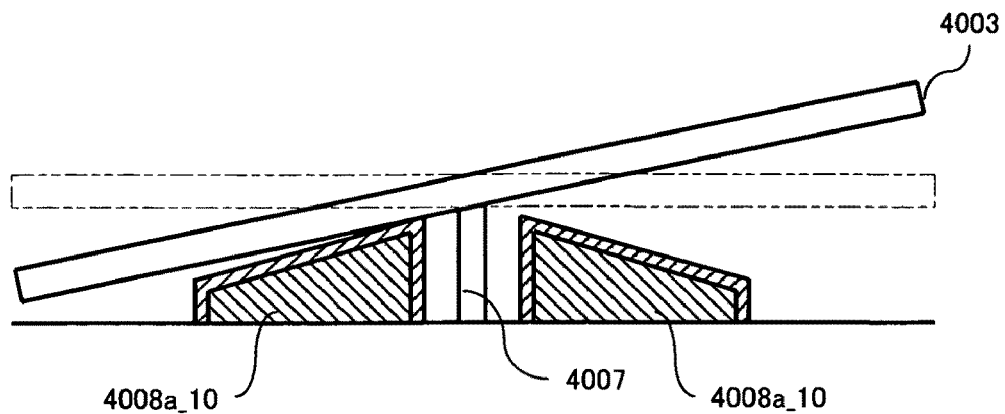
FIG. 20A is a diagram showing the cross-section of another form of an electrode comprised in a mirror element of a mirror device according to the embodiment of the present invention.
Figure 20B:
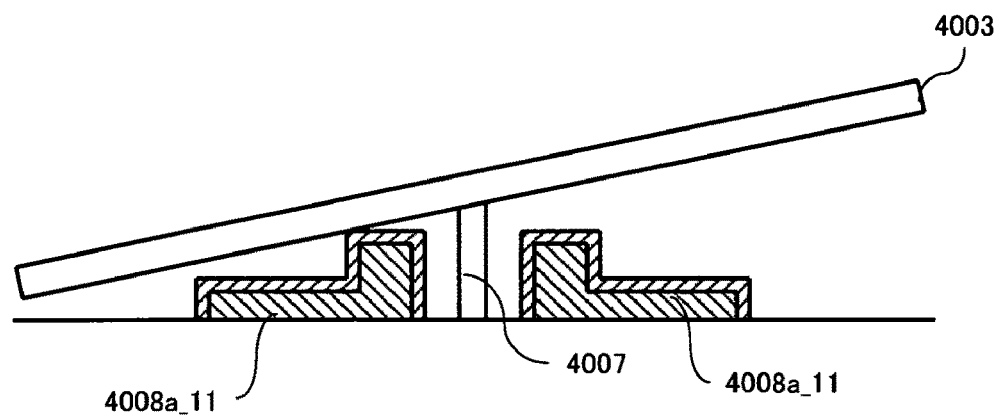
FIG. 20B is a diagram showing the cross section of another form of an electrode comprised in a mirror element of a mirror device according to the embodiment of the present invention.
Figure 20C:
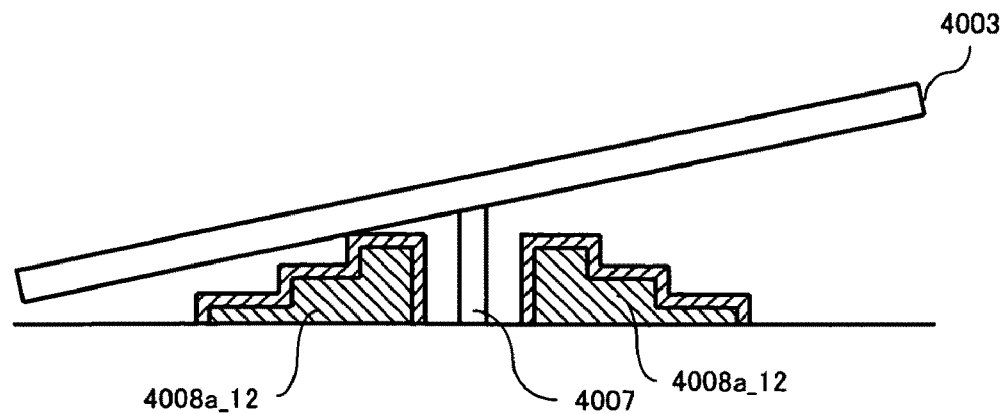
FIG. 20C is a diagram showing the cross-section of another form of an electrode comprised in a mirror element of a mirror device according to the embodiment of the present invention.

When the reduction of stiction between the address electrode and mirror is a consideration, the closer the contact point to the deflection axis, the more advantageous it is because the momentum arises from the impeding the motion of the mirror with a reduced force from the. If stiction is still a concern, even when an address electrode is coated with a layer for preventing stiction, the configurations as shown in FIGS. 20A, 20B and 20C are viable. In FIGS. 20A, 20B and 20C the stoppers are not formed on the external parts of the address electrode farthest from the deflection axis.

When the electrode is configured so that d1=d2, the point on the electrode determining the deflection angle of the mirror is P2, and the configuration is determined so as to satisfy the following equation:

$$\cot\theta = d2/L2$$

Figure 21:
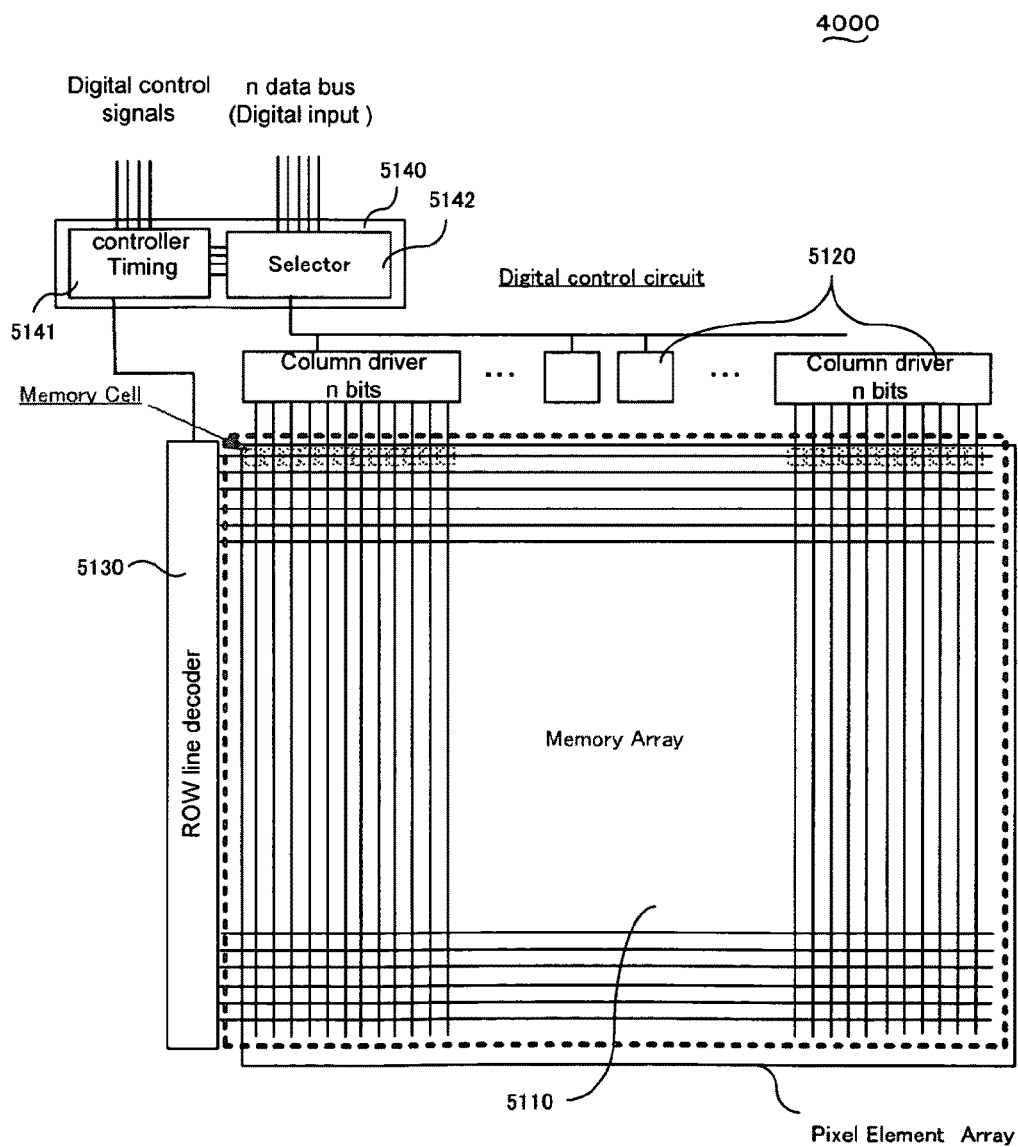
FIG. 21 is a schematic circuit diagram exemplifying a layout of the internal configuration of a mirror device according to the embodiment of the present invention.

Next is a description of the outline of the circuit configuration of the mirror device according to the present embodiment. FIG. 21 shows an exemplary embodiment of the mirror device 4000 that includes a mirror element array 5110, COLUMN drivers 5120, ROW line decoders 5130, and an external interface unit 5140.

The external interface unit 5140 comprises a timing controller 5141 and a selector 5142. The timing controller 5141 controls the row line decoder 5130 on the basis of a timing signal from an SLM controller (not shown in the drawing). The selector 5142 supplies the column driver 5120 with digital signals incoming from the SLM controller.

A plurality of mirror elements 4001 are arrayed as a mirror element array 5110 at the positions aligned with individual bit lines. The bit lines are vertically extended from the column drivers 5120, crosses individual word lines. The word lines are horizontally extended from the row decoders 5130.

Figure 12:
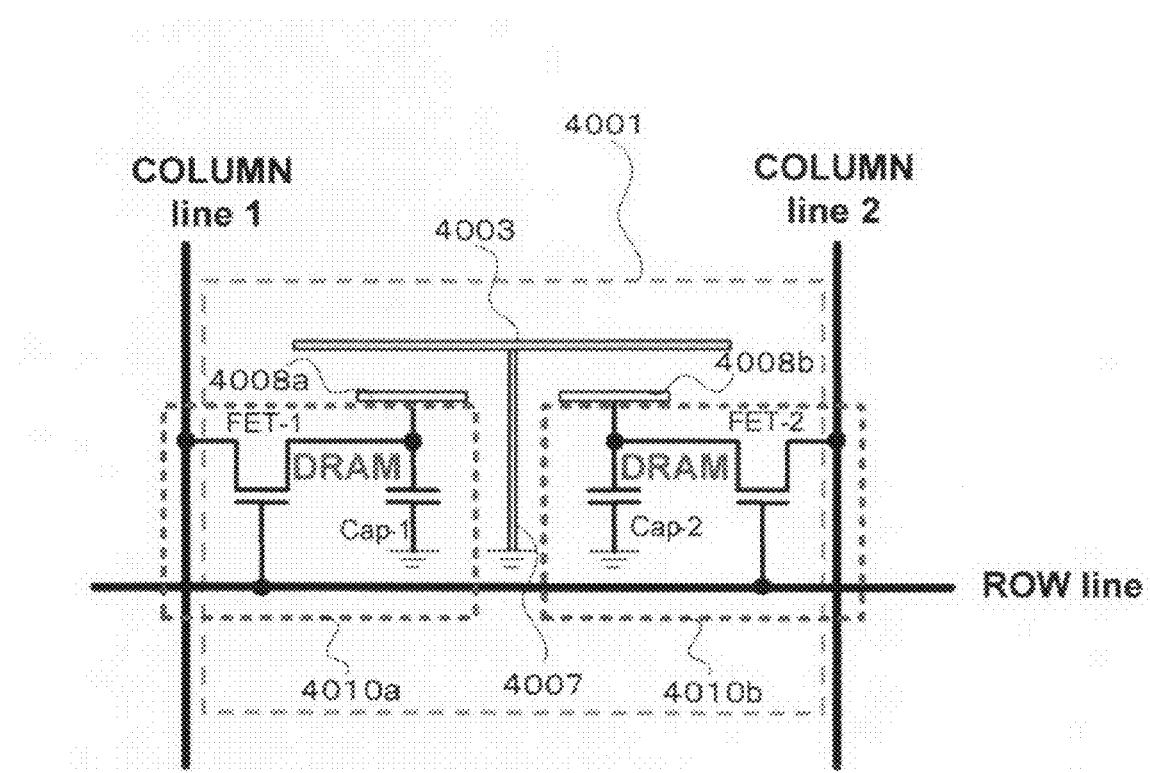
FIG. 12 is an outline diagram of a cross-section of a mirror element implemented by a mirror device according to the embodiment of the present invention.

An electrical voltage is applied to the address electrodes 4008 (i.e., the address electrodes 4008a and 4008b) in each mirror element 4001. The electrical voltage is applied to the address electrodes 4008) through the memory cells (i.e., the first memory cell 4010a and the second memory cell 4010b) as shown in FIG. 12. The voltage applied to the electrodes is based on the signals from the bit lines and word line. Here, the bit lines correspond to the COLUMN lines 1 and 2, which are shown in FIG. 12, and the word line corresponds to the ROW line shown in FIG. 12. The address electrodes 4008a and 4008b are noted as OFF electrode 5116 and ON electrode 5115, respectively, in the following description for convenience.

Another method of driving a mirror to display an image with higher levels of gray scale resolution with a reduced drive voltage is disclosed in US Patent Application 20050190429. In this patent application, a mirror is controlled to operate in a free oscillation state in the inherent oscillation frequency, and thereby an intensity of light about 25% to 37% of the emission light intensity produced when a mirror is controlled under a constant ON can be obtained during the oscillation period of the mirror. According to such a control, it is no longer required to drive the mirror at a high speed to achieve a higher resolution of gray scale. A high level of gray scale resolution is achievable with a hinge of a low spring constant for supporting the mirror. The drive voltage may be reduced. This method, combined with the method of decreasing the drive voltage by decreasing the deflection angle of a mirror, as described above, would produce an even greater improvement.

According to the present embodiment, the use of a laser light source makes it possible to decrease the deflection angle of a mirror and also to shrink the mirror device without introducing a degradation of brightness, and further, the use of the above described oscillation control enables a higher level of gray scale resolution without increasing the drive voltage.

Figure 22A:
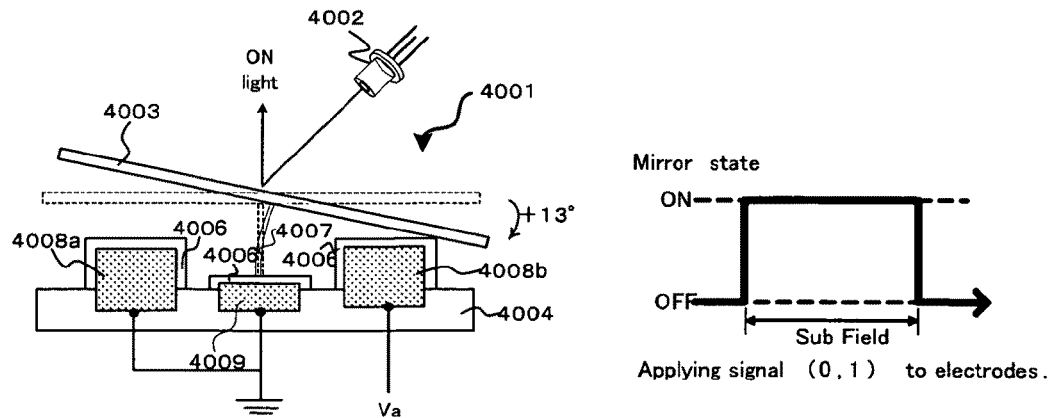
FIG. 22A is a diagram depicting a state in which incident light is reflected towards a projection optical system by deflecting the mirror of a mirror element.

FIG. 22A is a diagram depicting a state in which incident light is reflected towards a projection optical system by deflecting the mirror of a mirror element. Note that in this case, the deflection angle is designated at 13 degrees; the deflection angle, however, is not limited to this angle.

FIG. 12 shows the memory cells 4010a and 4010b (which are not shown here) for storing signal (0,1) for Appling a voltage of "0" volts to the address electrode 4008a of FIG. 22A and applies a voltage of Va volts to the address electrode 4008b. As a result of applying the voltage of Va volts, the mirror 4003 is drawn by a coulomb force and deflected from a deflection angle of "0" degrees, i.e., the horizontal state, to that of +13 degrees in the direction of the address electrode 4008b. This causes the incident light to be reflected by the mirror 4003 towards the projection optical system known as the ON state).

Specifically, the present patent application defines the deflection angles of the mirror 4003 as "+" (positive) for clockwise (CW) direction and "−" (negative) for counterclockwise (CCW) direction, with "0" degrees as the initial state of the mirror 4003. Further, an insulation layer 4006 is provided on the device substrate 4004 and a hinge electrode 4009, connected to the elastic hinge 4007, is grounded through the insulation layer 4006.

Figure 22B:
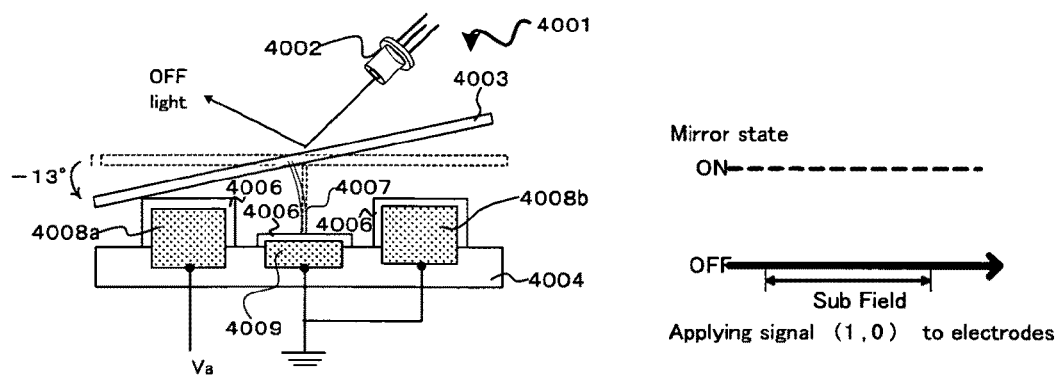
FIG. 22B is a diagram depicting a state in which an incident light is reflected away from a projection optical system by deflecting the mirror of a mirror element.

FIG. 22B is a diagram depicting a state when the incident light is not reflected towards a projection optical system by deflecting the mirror of a mirror element. With a signal (1, 0) stored in the memory cells 4010a and 4010b (which are not shown here), illustrated in detail in FIG. 12, a voltage of Va volts is applied to the address electrode 4008a, and "0" volts is applied to the address electrode 4008b. As a result of applying the voltage Va volts to the electrode 4008a, the mirror 4003 is drawn by a coulomb force and deflected from a deflection angle of "0" degrees, i.e., the horizontal state, to that of −13 degrees in the direction of the address electrode 4008a. This causes the incident light to be reflected by the mirror 4003 in a direction away from that of the light path towards the projection optical system (known as the OFF state).

Figure 22C:
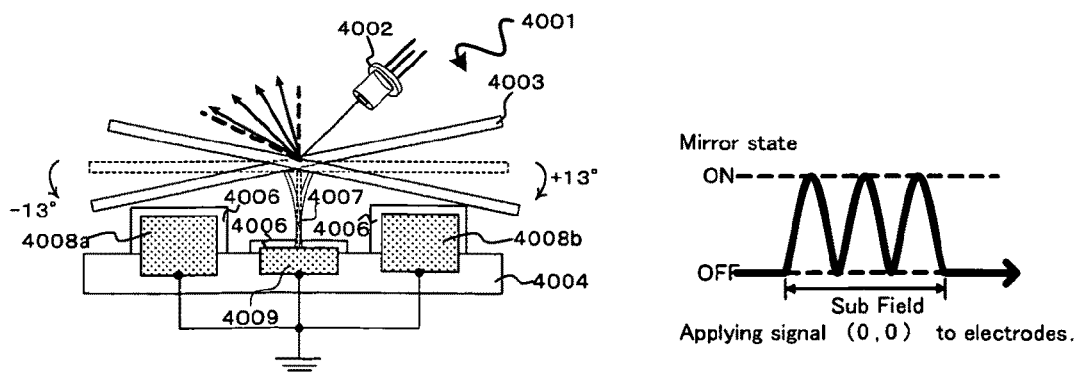
FIG. 22C is a diagram delineating a state in which incident light is repeatedly reflected towards and away from a projection optical system by the free oscillation of the mirror of a mirror element.

FIG. 22C is a diagram delineating a state in which incident light is reflected towards and away from a projection optical system by the repeated free-oscillation of the mirror of a mirror element.

In FIG. 22C, a signal (0, 0) is stored in the memory cells 4010a and 4010b (which are not shown here) and a voltage of "0" volts is applied to the address electrodes 4008a and 4008b. As a result of zero voltage applied to the electrodes, the Coulomb force between the mirror 4003 and the address electrode 4008a or 4008b, is withdrawn. The mirror 4003 is operated in a free oscillation state within the range of the deflection angles, ±13 degrees, in accordance with the property of the elastic hinge 4007. During this free oscillation, the incident light is reflected toward the projection optical system only when the mirror 4003 is within the range of a specific deflection angle. The mirror 4003 repeats the free oscillations, changing over frequently between the ON light state and OFF light state. Controlling the number of changeovers makes it possible to finely adjust the intensity of light reflected towards the projection optical system (which is called a free oscillation state).

The total intensity of light reflected during the time of the free oscillation towards the projection optical system is certainly lower than the intensity that is produced when the mirror 4003 is continuously in the ON state and higher than the intensity that is produced when it is continuously in the OFF state. That is, it is possible to make an intermediate intensity between those of the ON state and OFF state. Therefore, by finely adjusting the intensity as described above, a higher gradation image can be projected than with the conventional technique.

Although not shown in the drawing, an alternative configuration may be such that only a portion of light is made to enter the projection optical system by reflecting an incident light in the initial state of a mirror 4003. Configuring as such makes a reflection light enter the projection optical system with a higher intensity than that produced when the mirror 4003 is continuously in the OFF light state and with a lower intensity than that produced when the mirror 4003 is continuously in the ON light state thus controlling the mirror to operate in an intermediate state.

Figure 23:
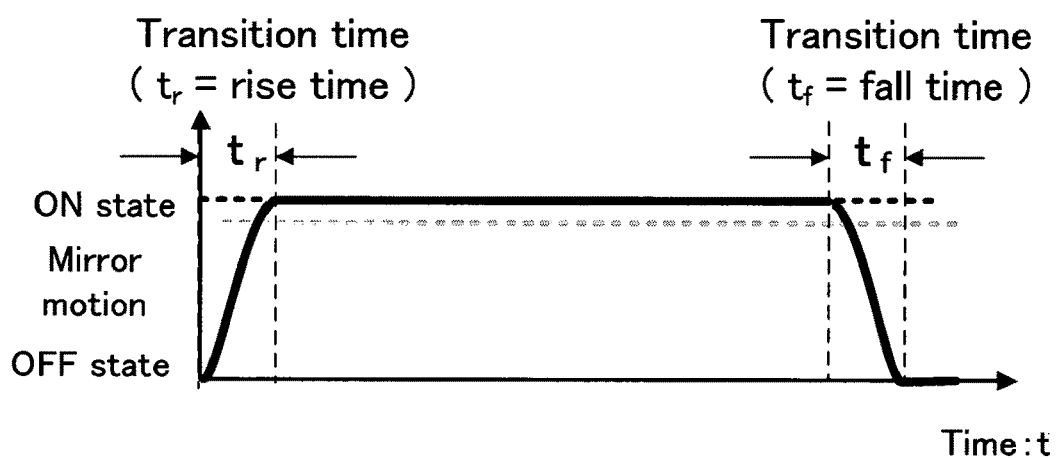
FIG. 23 is a timing diagram for showing the transition response between the ON state and the OFF state of a mirror of a mirror device.

FIG. 23 is a Timing diagram for showing the transition response between the ON state and OFF state of the mirror 4003. In a transition from the OFF state, in which the mirror 4003 abuts the address electrode 4008a, to the ON state, in which the mirror 4003 is abuts the address electrode 4008b, a rise time $t_r$, in the early stage of starting the transition, is required before the mirror 4003 fully reaches the ON state; and, in a transition from the ON state to the OFF state, a fall time $t_f$ is likewise required before the mirror fully reaches the OFF state. Note that the following description calls the rise time $t_r$ and fall time $t_f$. The mirror changeover transition time is known as $t_M$ when rise time and fall time are not distinguished from each another.

The following description outlines the inherent frequency of the oscillation system of a to mirror device according to the present embodiment.

As discussed above, a free oscillation of the mirror provides the advantages that a higher resolution of gray scales can be achieved by applying a lower drive voltage. With the mirror now operated with free oscillation, the light intensity represented by a least significant bit (LSB) is therefore related to a natural oscillation cycle. The natural oscillation cycle of an oscillation system implemented with an elastic hinge can be further analyzed as follows: The natural oscillation cycle T of an oscillation system=$2*\pi*\sqrt{(I/K)}$=LSB time/X [%];
where:
I: the moment of rotation of an oscillation system,
K: the spring constant of an elastic hinge,
LSB time: the LSB cycle at displaying n bits, and
X [%]: the ratio of the light intensity obtained by one oscillation cycle to the light intensity during a Full-ON state during the same cycle
Note that:
"I" is determined by the weight of a mirror and the distance between the center of gravity and the center of rotation;
"K" is determined on the basis of the thickness, width, length and cross-sectional shape of an elastic hinge;
"LSB time" is determined on the basis of frame time, or one frame time and the number of reproduction bits in the case of a single-panel projection method; and
"X" is determined on the basis of the F number of a projection lens and the intensity distribution of an illumination light.

As an example, in an image projection system implemented with a single-panel color sequential method, the percentage of light intensity projected during one oscillation cycle is 32%. The minimum light intensity in one oscillation cycle for a system controlled by applying a 10-bit grayscale is designated as "I" with the "I" and "K" design based on the mirror elements oscillating with a natural oscillation cycle. The length of the natural oscillation cycle is:

$$T=1/(60*3*2^{10}*0.32) \approx 17.0 \, \mu sec.$$

In contrast, when a conventional PWM control is employed, the changeover transition time $t_M$ of a mirror is approximately equal to the natural oscillation frequency of the oscillation system of the mirror. Accordingly, the LSB is required to control the mirror that the light intensity in the interim during the changeover transition can be ignored. The gray scale reproducible with the above-described hinge is about 8-bit, even if the LSB is set at five times the changeover transition time $t_M$. Therefore, compared with a conventional display system, the display systems of this invention can achieve an image display with a 10-bit grayscale by using the 8-bit grayscale control signals because of the implementation of the intermediate control states. In another exemplary embodiment for an image display system to display image with a 13-bit gray scale by a single-panel projection apparatus, the length of time represented by a LSB can be calculated as follows:

$$LSB \, time=(1/60)*(1/3)*(1/2^{13})=0.68 \, \mu sec$$

For a display system with intermediate control state controllable to project 38% of the ON state intensity, the oscillation cycle T is as follows:

$$T=0.68/0.38\%=1.8 \, \mu sec$$

In contrast, when attempting to obtain an 8-bit grayscale in a multi-panel projection apparatus described above, the length of time represented by the LSB can be calculated as follows:

$$LSB \, time=(1/60)*(1/3)*(1/2^{8})=21.7 \, \mu sec$$

In another exemplary embodiment, when the light intensity obtained in one cycle by controlling the mirror to operate in an intermediate state is 20% of the ON state intensity, then the oscillation cycle T can be set as follows: T=65.1/20%=108.5 μsec.

As described above, the present embodiment is configured to set the mirror to oscillate with a natural oscillation cycle of the oscillation system. The display system includes an elastic hinge. The natural oscillation cycle can be set between about 1.8 μsec and 108.5 μsec with three deflection states. The mirror element in a first deflection state is modulated by the mirror element directed towards the projection light path. The mirror element in the second deflection state is controlled to reflect a light in a direction away from the projection light path. The mirror element in a third deflection state is controlled to oscillate between the first and second deflection states. The intermediate state provide a reduced amount of controllable light thus enabling the display system to display images of a gray scale with higher resolution without increasing the drive voltage of the mirror element.

Figure 24A:
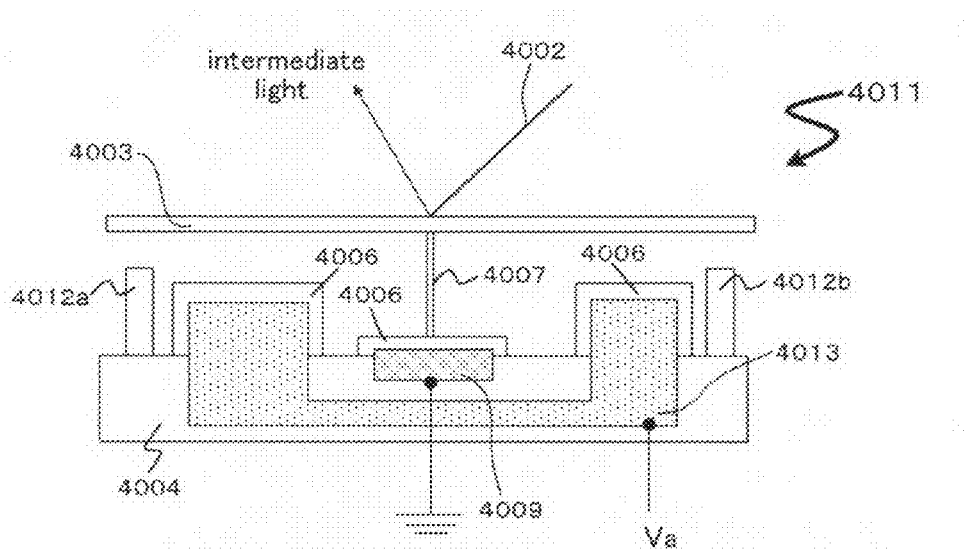
FIG. 24A shows a cross-section of a mirror element that includes only one address electrode and drive circuit, as another exemplary embodiment of a mirror element.

FIG. 24A shows a cross-section of a mirror element as an alternate embodiment that is configured to implement with only one address electrode and one drive circuit. The mirror element 4011 shown in FIG. 24A incldes insulation layer 4006 on the device substrate 4004 and includes one drive circuit (see FIG. 24B) for deflecting a mirror 4003. Further, an elastic hinge 4007 is provided on the insulation layer 4006. The elastic hinge 4007 supports the mirror 4003, and the one address electrode 4013, which is connected to the drive circuit, is placed under the mirror 4003. Further, a hinge electrode 4009 connected to the elastic hinge 4007 is grounded through the insulation layer 4006.

Note that the areas of the address electrode 4013 exposed above the device substrate 4004 are configured to be different between the left side and right side of the elastic hinge 4007, or the deflection axis of mirror 4003. The area size of the exposed part of the address electrode 4013 on the left side of the elastic hinge 4007 is larger than the area size on the right side.

Here, the mirror 4003 is deflected by the electrical control of one address electrode 4013 and drive circuit. Further, the deflected mirror 4003 is retained at a specific deflection angle by contact with stopper 4012a or 4012b, which are placed in the vicinity of the exposed parts on the left and right sides of the address electrode 4013.

An alternative configuration of the mirror is to eliminate the stopper as a separate member. The mirror is configured to contact the address electrode directly, as described previously.

Incidentally, the present patent application discloses the address electrode 4013 in FIG. 24A, which is exposed above the device substrate 4004, the as the "electrode part". Specifically the left part is termed the "first electrode part" and the right part termed the "second electrode part, with the elastic hinge 4007 or the deflection axis of mirror 4003 referred to as the border.

By configuring the address electrode 4013 to be asymmetrical with the area of the left side different from that of the right side, in relation to the elastic hinge 4007 or the deflection axis of mirror 4003, a voltage applied to the electrode 4013 will generate a difference in coulomb force between (a) and (b), where (a): a coulomb force generated between the first electrode part and mirror 4003, and (b): a coulomb force generated between the second electrode part and mirror 4003. Thus, the mirror 4003 can be deflected by differentiating the Coulomb force between the left and right sides of the deflection axis of the elastic hinge 4007 or mirror 4003.

Figure 24B:
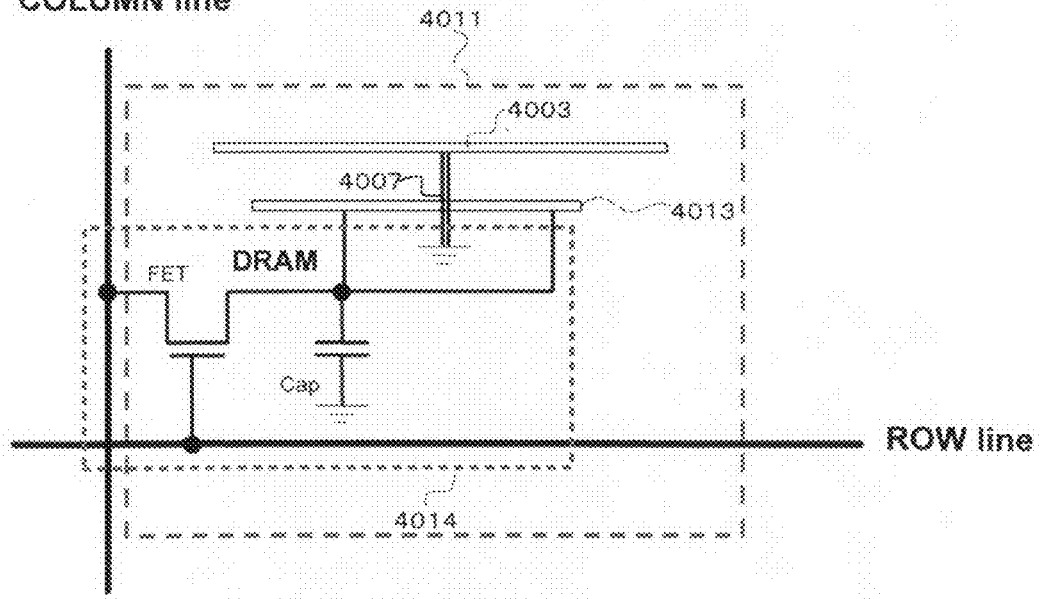
FIG. 24B is an outline diagram of a cross-section of the mirror element shown in FIG. 24A.

FIG. 24B is an outline diagram of a cross-section of the mirror element 4011 shown in FIG. 24A. The mirror device when implemented with a single address electrode 4013 makes it possible to control the mirror with only one memory cell. FIG. 24B shows a configuration wherein two memory cells 4010a and 4010b correspond to the two address electrodes 4008a and 4008b shown in FIG. 12, is now reduced to one memory cell 4014. The amount of wiring for controlling the deflection of mirror 4003 is also reduced.

Other possible configurations are similar to the configuration described in FIG. 12, and therefore descriptions are not provided here.

Figure 25A:
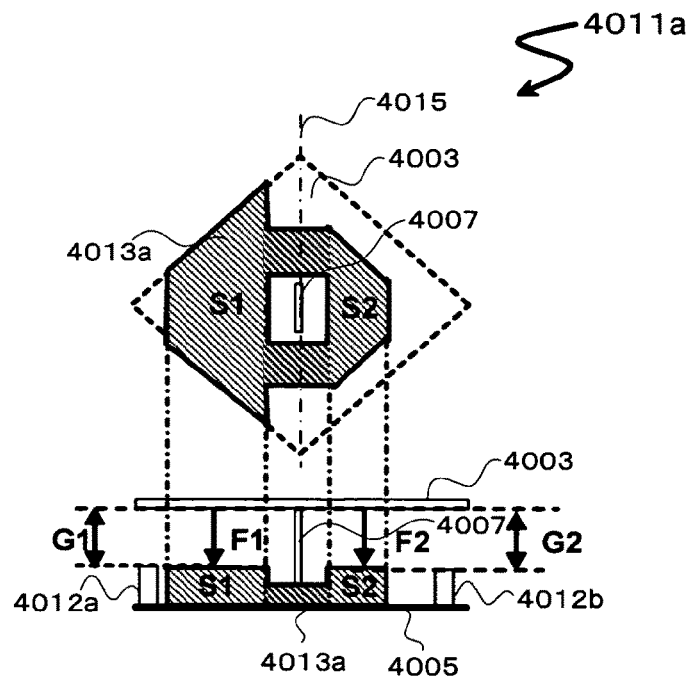
FIG. 25A is a diagram of the top and side cross-sectional views of a mirror element configured so that the area size S1 of the first electrode part of one address electrode is greater than the area size S2 of the second electrode part (S1>S2), and so that the connection part between the first and second electrode parts is in the same layer as both S1 and S2.
Figure 25B:
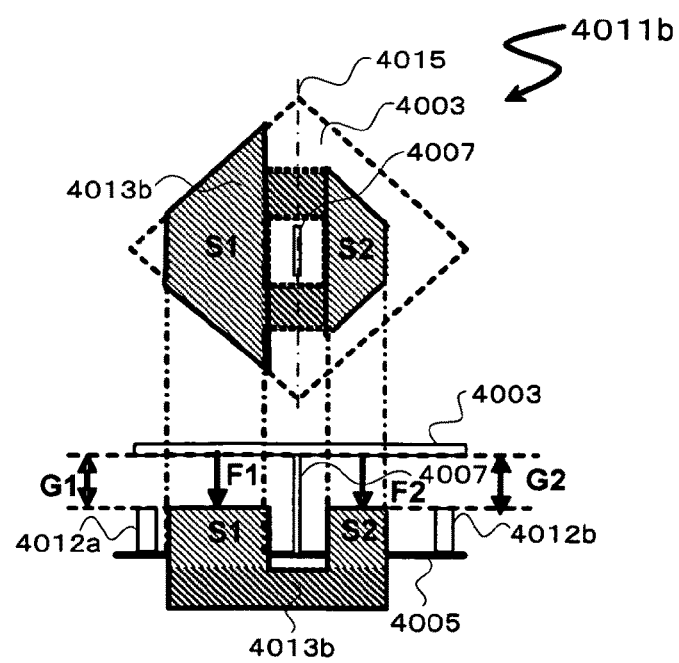
FIG. 25B is a diagram of the top and side cross-sectional views of a mirror element configured so that the area size S1 of the first electrode part of one address electrode is greater than the area size S2 of the second electrode part (S1>S2), and so that the connection part between the first and second electrode parts is in a layer different from that of S1 and S2.

Referring to FIGS. 25A, 25B and 25C, and FIG. 26 in the following detail descriptions for a single address electrode 4013 to control the deflection of a mirror. Mirror elements 4011a and 4011b, respectively shown in FIGS. 25A and 25B, are each configured such that the respective area sizes of the first and second electrode parts of the one address electrode 4013, on the left and right sides of the deflection axis 4015 of the mirror 4003, are different from each other (i.e., asymmetrical).

FIG. 25A shows a top view diagram with a view from above and a cross-sectional diagram, both of a mirror element 4011a structured such that the area size S1 of a first electrode part of the one address electrode 4013a is greater than the area size S2 of a second electrode part (S1>S2), and such that the part connecting the first and second electrode parts are in the same structural layer as the first and second electrode parts.

FIG. 25B also shows a top view diagram with a view from above and a cross-sectional diagram, both of a mirror element 4011b structured such that the area size S1 of the first electrode part of the one address electrode 4013b is greater than and the area size S2 of a second electrode part, such that S1>S2, and such that the part connecting the first and second electrode parts are in a structural layer different from the layer in which the first and second electrode parts are placed.

Referring to FIG. 25A or 25B for a description of the control for the deflecting operation of a mirror in the mirror element 4011a or 4011b respectively.

The following descriptions refer to the control of only the mirror element 4011a shown in FIG. 25A and to the control of mirror element 4011a and mirror element 4011b shown in FIG. 25B, unless otherwise noted.

Figure 26:
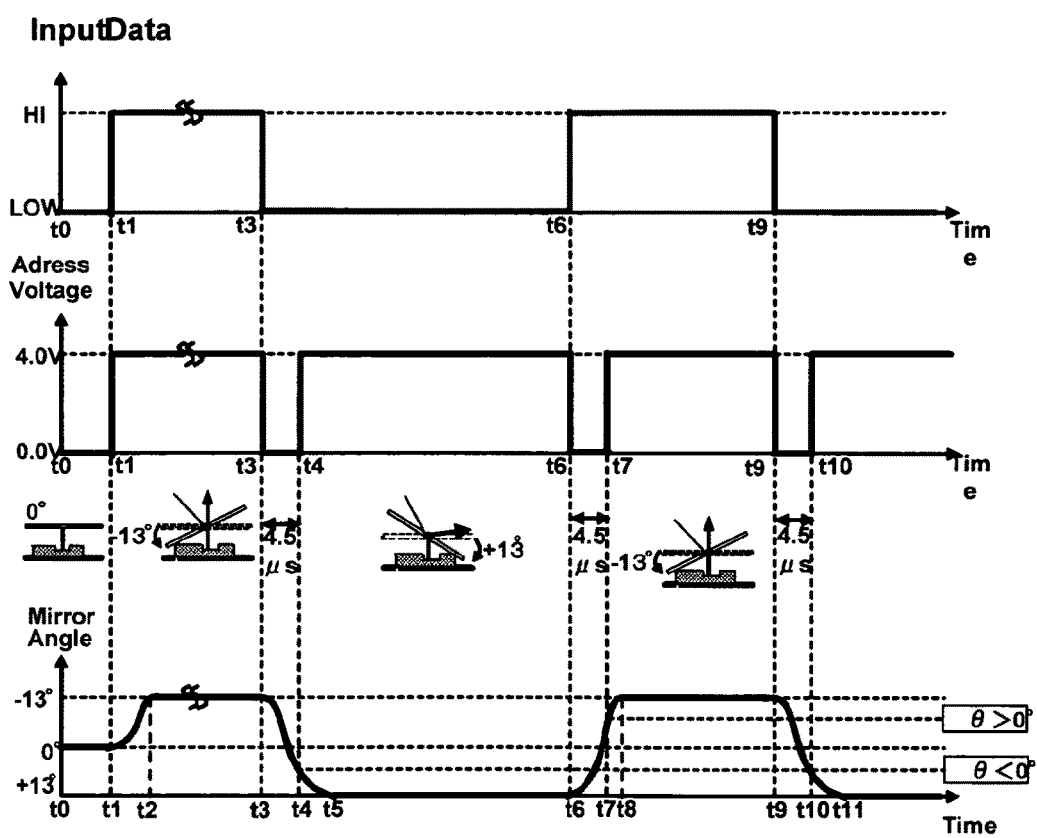
FIG. 26 shows a series of timing diagrams for showing the relationship between data input to the mirror element shown in FIG. 25A, application of a voltage to an address electrode, and the deflection angle of the mirror, in a time series.

FIG. 26 is a timing diagram for showing the sequence and the relationship between data input to the mirror elements 4011a or 4011b, the voltage application to the address electrodes 4013a or 4013b, and the deflection angles of the mirror 4003, in a time series.

In FIG. 26, the data is inputted to the mirror element 4011a or 4011b, which is controlled in two states, HI and LOW, with HI representing a data input, that is, projecting an image, and LOW representing no data input, that is, not projecting an image.

The vertical axis of the "address voltage" of FIG. 26 represent the voltage values applied to the address electrode 4013a of the mirror element 4011a and the voltage values applied to the address electrode 4013a, for example, "4" volts and "0" volts.

The vertical axis of "mirror angle" of FIG. 26 represents the deflection angle of the mirror 4003, setting "0" degrees as the deflection angle when the mirror 4003 is parallel to the device substrate 4004. Further, with the first electrode part of the address electrode 4013a defined as the ON state side, the maximum deflection angle of the mirror 4003 in the ON state is set at −13 degrees. With the second electrode part of the address electrode 4013a defined as the OFF state side, the maximum deflection angle of the mirror 4003 in the OFF state is set at +13 degrees. Therefore, the mirror 4003 deflects within a range in which the maximum deflection angles of the ON state and OFF state are ±13. The maximum deflection angle designated at 13 degrees is only provided as an example and the maximum deflection angle may be flexibly adjusted to other value larger or smaller than 13 degrees. The horizontal axis of FIG. 26 represents elapsed time t. When a deflecting operation of the mirror 4003 is performed in the configuration of FIG. 25A, a voltage is applied to the address electrode 4013a with the timing of the voltage based on data input and a data rewrite.

Referring to FIG. 26, no data is inputted between the time t0 and t1, and the mirror 4003 is accordingly in the initial state. That is, the deflection angle of the mirror 4003 is "0" degrees in the state, in which no voltage is applied to the address electrode 4013a. At time t1, a voltage of 4 volts is applied to the address electrode 4013a, causing the mirror 4003 to be attracted by a coulomb force generated between the mirror 4003 and address electrode 4013a towards the first electrode part, which has a larger area size, so that the mirror 4003 shifts from the 0-degree deflection angle at time t1 to a −13-degree deflection angle at time t2. The mirror 4003 is then retained on the stopper 4012a or on the first electrode part.

The distance G1 between the mirror 4003 and the first electrode part and the distance G2 between the mirror 4003 and the second electrode part are equal when the mirror 4003 is in the initial state. However, since the first electrode part has a larger area than the second electrode part, and the first electrode part can retain a larger amount of charge, and as a result, a larger coulomb force is generated for the first electrode part.

The mirror 4003 is retained on the stopper 4012a or on the first electrode part as a result of continuously applying a voltage of 4 volts to the address electrode 4013a, in accordance with data inputted between the time t2 and time t3. Then, at time t3, stopping the data input applies a voltage of "0" volts to the address electrode 4013a. As a result, the Coulomb force generated between the address electrode 4013a and mirror 4003 is cancelled. This causes the mirror 4003 retained on the first electrode part side to be shifted to a free oscillation state due to the restoring force of the elastic hinge 4007.

Further, the deflection angle of the mirror 4003 becomes θ>0 degrees, and when a voltage of 4 volts is applied to the address electrode 4013a at the time t4, when a coulomb force F1, which is generated between the mirror 4003 and first electrode part, and a coulomb force F2, which is generated between the mirror 4003 and second electrode part, constitutes the relationship of F1<F2, the mirror 4003 is attracted to the second electrode part.

Then at time t5, the mirror 4003 is retained on the stopper 4012b or on the second electrode part. The reason for this is that the second power of a distance has a larger effect on a coulomb force F than the difference in electrical potentials, according to the equation of the electrostatic force as discussed above.

Therefore, with an appropriate adjustment of the area sizes of the first and second electrode parts, a coulomb force F has a stronger effect on the smaller distance G2, the distance between the address electrode 4013a and mirror 4003, despite the fact that the area S2 of the second electrode part is smaller than the area S1 of the first electrode part. As a result, the mirror 4003 can be deflected to the second electrode part.

Note that the transition time of the mirror 4003 between the time t3 and t4 is preferably about 4.5 μsec, in order to obtain a high grade of gradation. Further, it is possible to perform a control in such a manner so as to turn off the illumination light in sync with a transition of the mirror 4003, so as to not let the illumination light be reflected and incident to the projection light path during a data rewrite, that is, during the transition of the mirror 4003, between the time t3 and t4.

Between the time t5 and t6, the mirror 4003 is continuously retained on the stopper 4012b or on the second electrode part by continuously applying voltage to the address electrode 4013a. In this event, no data is inputted, and therefore no image is projected.

Then, at the time t6, new data is inputted. The voltage of 4 volts, which has been applied to the address electrode 4013a, is changed over to "0" volts at time t6, in accordance with the data input. This operation cancels the coulomb force generated between the mirror 4003, retained on the second electrode part, and the address electrode 4013a, similar to the case at time t3, so that the mirror 4003 shifts to a free oscillation state due to the restoring force of the elastic hinge 4007.

Then, a voltage of 4 volts is again applied to the address electrode 4013a at time t7. Coulomb force F1, which is generated between the mirror 4003 and first electrode part, becomes greater than coulomb force F2, which is generated between the mirror 4003 and the second electrode part, (F1>F2) when the deflection angle of the mirror 4003 becomes θ<0 degrees, and thereby the mirror 4003 is attracted to the first electrode part and is retained on the first electrode part at time t8.

This principle is understood from the description of the action of a coulomb force between the above described times t3 and t5. Also in this event, the transition time of the mirror 4003, between time t6 and t7, is preferably about 4.5 μsec, and the control is performed in such a manner to turn off the illumination light in sync with a transition of the mirror 4003, so as to not let the illumination light be reflected and incident to the projection light path during the transition of the mirror 4003.

Then, between the times t8 and t9, the mirror 4003 is continuously retained on the stopper 4012a or on the first electrode part by continuously applying a voltage of 4 volts to the address electrode 4013a. In this event, data is continuously inputted, and images are projected.

Then, the voltage applied to the address electrode 4013a is changed from 4 volts to "0" volts as the data input is stopped at time t9. This operation puts the mirror 4003 into the free oscillation state.

Applying a voltage to the address electrode 4013a at time t10 makes it possible to retain the mirror 4003 on the stopper 4012b or on the second electrode part at the time t11 on the same principle as that applied between the time t3 and t5 and between the time t6 and t8. A repetition of similar operations enables control of deflecting the mirror 4003.

Next is a description of the control necessary for returning the mirror 4003 from being retained, either on the stopper 4012a or on the first electrode part or on the stopper 4012b or on the second electrode part, back to the initial state.

In order to return the mirror 4003 back to the initial state from the state of being retained on the stopper 4012a or onto the first electrode part, or on the stopper 4012b or onto the second electrode part, in which a voltage is applied to the address electrode 4013a, an appropriate pulse voltage is applied. For example, changing the voltage applied to the address electrode 4013a to "0" volts causes the mirror 4003 to perform a free oscillation. During free oscillation, when the distance between the address electrode 4013a and mirror 4003 becomes appropriate, a temporary application of an appropriate voltage to the address electrode 4013a generates a coulomb force F that pulls the mirror 4003 back to the first electrode part or second electrode part, on which the mirror was previously retained, that is, generates acceleration in a direction opposite to the direction in which the mirror 4003 was heading, and thereby the mirror 4003 can be returned to the initial state.

Thus, the application of a pulse voltage to one address electrode 4013a, as described above, makes it possible to return the mirror 4003 to the initial state from a state in which it is retained on the stopper 4012a or on the first electrode part, or retained on the stopper 4012b or on the second electrode part.

Applying the principle of the coulomb force between the mirror and address electrode 4013a, as described above, the application of a voltage to the address electrode 4013a at an appropriate distance between the mirror 4003 and address electrode 4013a also makes it possible to retain the mirror 4003 at the deflection angle of the OFF state by returning the mirror 4003 from the ON state, or at the deflection angle of the ON state by returning the mirror 4003 from the OFF state.

The above descriptions are the same in the case of the address electrode 4013b of the mirror element 4011b shown in FIG. 25B.

Note that the control of mirror 4003, of the mirror elements 4011a and 4011b shown in FIG. 26, is widely applicable to a mirror element that is configured to have a single address electrode and to be asymmetrical about the elastic hinge or the deflection axis of mirror. As described above, the mirror can be deflected to the deflection angle of the ON state or OFF state, or put in the free oscillation state, with a single address electrode of a mirror element.

Figure 25C:
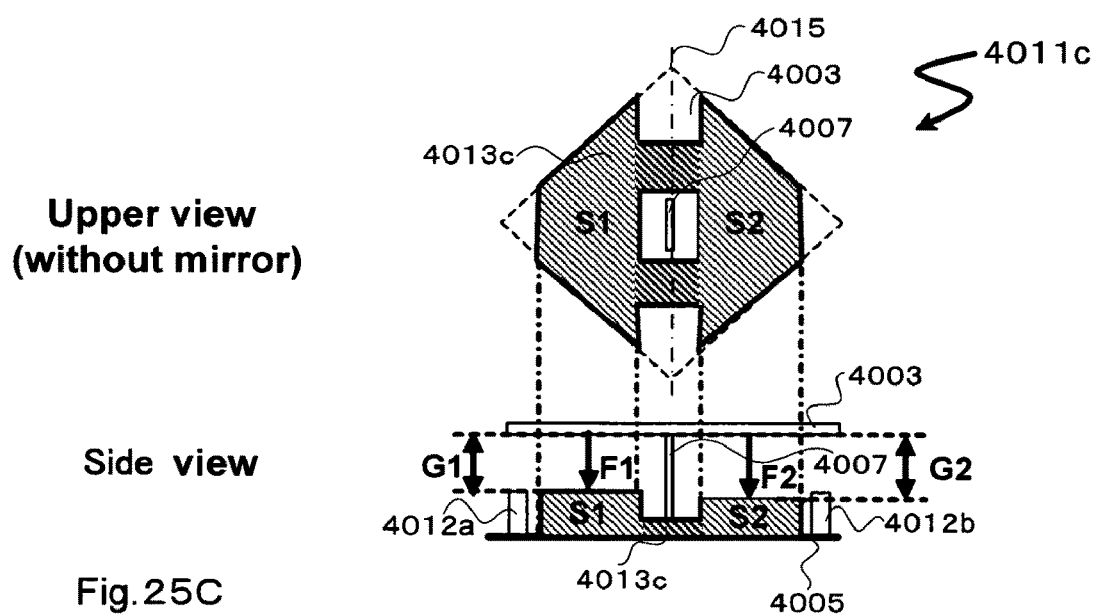
FIG. 25C is a diagram of the top and side cross-sectional views of a mirror element configured so that the area size S1 of the first electrode part of one address electrode is equal to the area size S2 of the second electrode part (S1=S2), and so that the distance G1 between the mirror and the first electrode is less than the distance G2 between the mirror and the second electrode (G1<G2)

FIG. 25C shows diagram, as viewed from above, and a cross-sectional diagram, of a mirror element 4011c structured such that the area size S1 of the first electrode part of the one address electrode is equal to the area size S2 of a second electrode (S1=S2), and such that the distance G1 between a mirror 4003 and the first electrode part is less than the distance G2 between the mirror 4003 and the second electrode part (G1<G2).

That is, the configuration of FIG. 25C is such that, for the address electrode 4013, the height of the first electrode part is greater than that of the second electrode part and such that the distance G1 between the first electrode part and mirror 4003 is less than the distance G2 between the second electrode part and mirror 4003 (G1<G2). Further, the part connecting the first electrode part to the second electrode part is on the same layer as the address electrode 4013.

In the case of the mirror element 4011c as shown in FIG. 25C, the size of the coulomb force generated between the mirror 4003 and address electrode 4013c in the first electrode part differs from that generated between the mirror 4003 and address electrode 4013c in the second electrode part because the distances between the mirror 4003 and address electrode 4013 are different. Therefore, the deflection of the mirror 4003 can be controlled by carrying out a control similar to the case described above in FIG. 26.

The maximum deflection angles of the mirror 4003 as shown in FIGS. 25A, 25B and 25C show are defined by the stoppers 4012a and 4012b. However, the maximum deflection angles of the mirror 4003 can also be established by configuring the address electrode 4013c to also serve the function of the stoppers 4012a and 4012b.

Further, while the present embodiment is configured to set the control voltages at 4-volt and 0-volt applied to the address electrode 4013a, 4013b or 4013c, such control voltages may be adjusted depending on specific applications and other appropriate voltages may be used to control the mirror 4003.

Furthermore, the mirror can be controlled with multi-step voltages applied to the address electrode 4013a, 4013b or 4013c. As an example, if the distance between the mirror 4003 and address electrode 4013a, 4013b or 4013c may be reduced for increasing the coulomb force, the mirror 4003. The mirror can be controlled with a lower voltage than when the mirror 4003 is in the initial state.

As described above, even that the mirror element is controlled by only one address electrode; the single address electrode is able to operate the mirror in three deflection states. Specifically, the mirror may be operated at the ON state, in which the light modulated by the mirror element is headed towards a projection light path. The mirror may be operated in the OFF state with the deflected light is reflected in a direction away from the projection light path. The mirror may be operated in the oscillation state, for the mirror element to oscillate between the ON and OFF deflection states, makes it possible to display an image with a higher resolution of gray level of without requiring an increase in the drive voltage for the mirror element.

Figure 27:
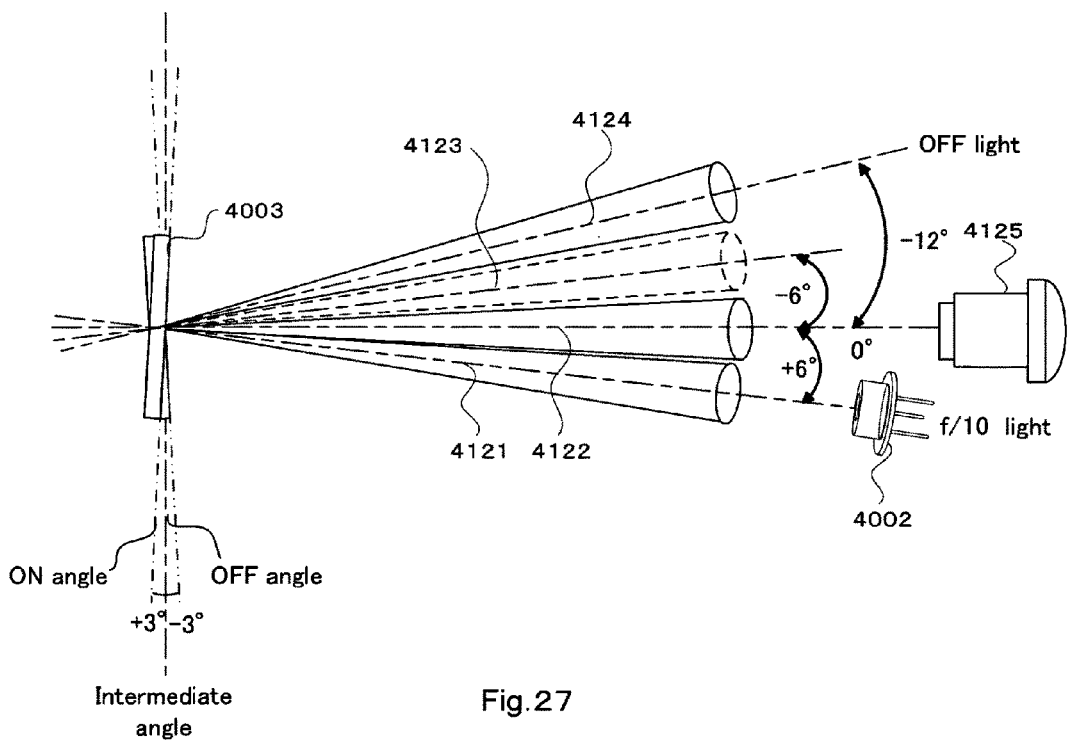
FIG. 27 is side view for diagram for depicting the light reflecting from a mirror under a situation of reflecting an f/10 light flux with a coherent characteristic by configuring a mirror to operate with the deflection angles of the mirror in ON light state and OFF light state within an angular range of ±3 degrees.

As such, each mirror element of the mirror device, according to the present embodiment, is configured to change the deflection states of the mirror in accordance with the voltage applied to the electrode, deflecting the light incident to the mirror 4003 to specific directions, as shown in FIG. 27.

FIG. 27 is a cross-sectional diagram for depicting a situation of reflecting a light flux of the F number 10 (f/10) emitted from a laser light source possessing a coherent characteristic for a mirror device configured such that the deflection angles of the mirror in ON light state and OFF light state are designated as ±3 degrees, respectively. The illumination light ejected from the light source 4002 is incident to the mirror 4003 as depicted by an optical axis 4121. Then, the illumination light is reflected as depicted by an optical axis 4122 in the ON state of the mirror 4003, is reflected as depicted by an optical axis 4124 in the OFF state of the mirror 4003 and is reflected as depicted by an optical axis 4123 in the initial state of the mirror 4003. The configuring as such makes it possible to not allow more securely the diffraction light and scattered light generated by the mirror in the OFF light state or OFF angle to enter a projection optical system 4125.

The following description outlines a package used for a mirror device according to the present embodiment.

Figure 28A:
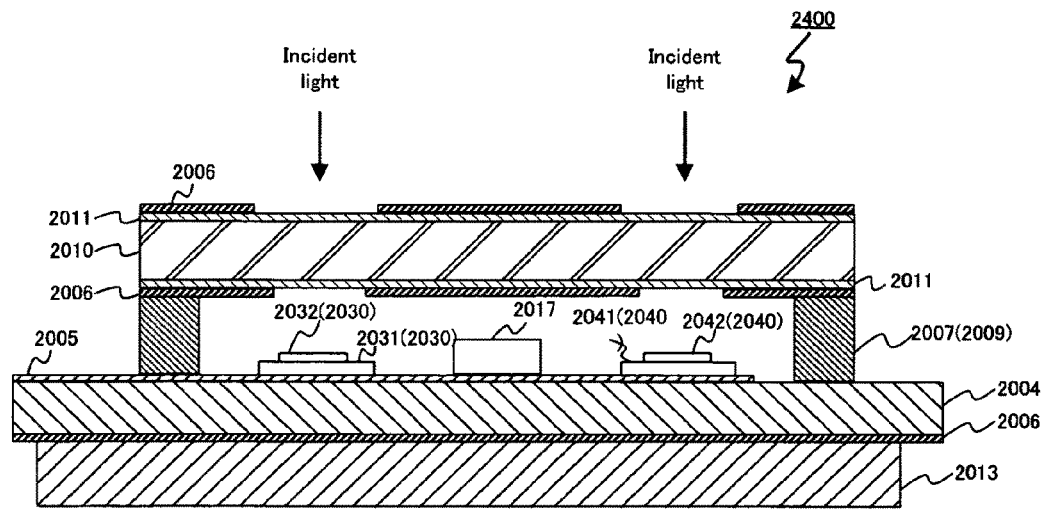
FIG. 28A is a front cross-sectional diagram of an assembly body that packages two mirror devices using a package substrate.
Figure 28B:
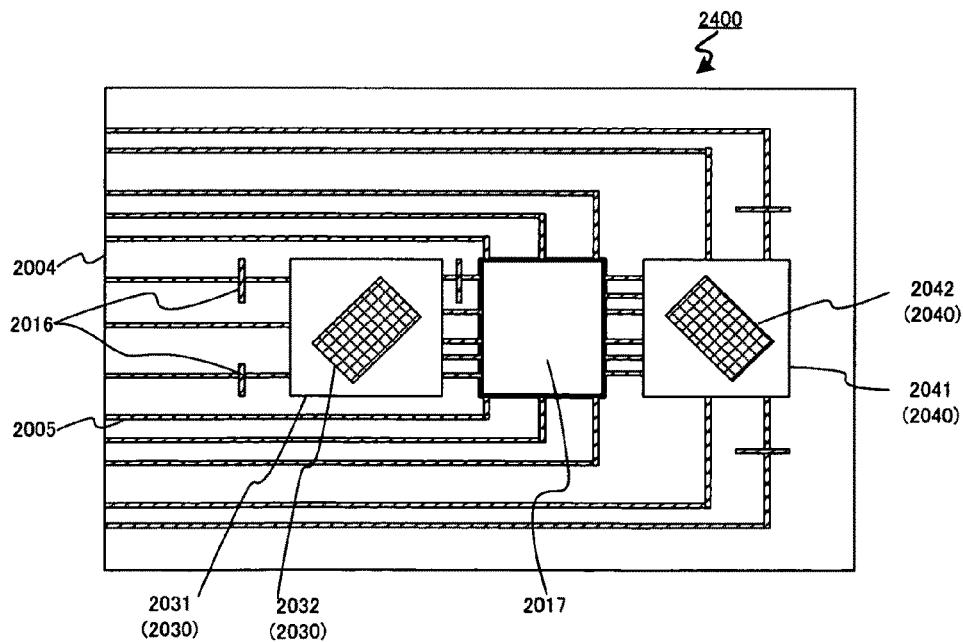
FIG. 28B is a diagram of the assembly body shown in FIG. 31A, as viewed from above, with the cover glass and intermediate member removed.

FIGS. 28A and 28B are diagrams for showing the packaging configuration of an assembly body that contains two mirror devices. The assembly body 2400 comprises a cover glass 2010 and a package substrate 2004, which is composed of glass, silicon, ceramics, metal or a composite of some of these materials. The glass used for the package substrate 2004 is preferably a material with high thermal conductivity, i.e., soda ash glass (0.55 to 0.75 W/mK) or Pyrex glass (1 W/mK), for improving radiation efficiency. The assembly body 2400 may comprise a thermal conductive member and a cooling/radiation member 2013 for radiation. The materials for each of these constituent parts are should be selected so that they have, as much as possible, similar values of thermal expansion coefficients in order to prevent a failure in the actual usage environment, such as cracking or parts mutual peeling off from one another.

Further, an intermediate member 2009 for joining the individual constituent members includes a support part 2007, for determining the height of the cover glass 2010, and a joinder member made of fritted glass, solder, epoxy resin, or the like.

The cover glass may further be provided with a light shield layer 2006, to shield the device from extraneous light, and an anti-reflection (AR) coating 2011, to prevent extraneous reflection of incident light. The anti-reflection coating 2011 is a coating made of magnesium fluoride or a nano-structure no wider than the wavelength applied to a glass surface. The light shield layer 2006 is constituted by a thin black film layer containing carbon, or a multi-layer structure consisting of a thin black film layer and a metallic layer.

Note that it is possible to accommodate a plurality of mirror devices and a control circuit 2017 inside the package shown in FIG. 28A.

Accommodating multiple devices in one package includes various benefits, in addition to cost reduction. In a projection apparatus comprising the assembly body 2400, the projecting position of each device is basically adjusted by the positional adjustment of the respective optical elements. Thus, when the pixels of the individual mirror devices 2030 and 2040 accurately overlap with each other, the resolution of the projected image is increased, and the colors reflected by the respective mirror devices 2030 and 2040 are projected more sharply. Note that FIGS. 28A and 28B exemplify a configuration in which a mirror array 2032 is placed on a device substrate 2031 and a mirror array 2042 is places on a device substrate 2041.

Further, as shown in FIGS. 28A and 28B, with the control circuit 2017 inside of the package, enables a package substrate to accommodate a large number of circuit wirings patterns 2005 of the control circuit 2017. As a result, the floating capacity of the circuit wirings pattern 2005 is substantially reduced. Furthermore, it is possible to place the control circuit 2017, controlled in higher speed than a video image signal, at a position equidistant from the individual mirror devices 2030 and 2040, so that the differences in resistance values and floating capacitance values between the respective circuit wirings patterns 2005, connected to the individual mirror devices 2030 and 2040, are reduced. This makes it possible to configure mirror devices with a large number of mirror elements and to allow a large volume of data processing for a high degree of gradation. This in turn enables projection of images with high degrees of gradation and resolution. Further, the shortening of the circuit wiring from the control circuit 2017 to each mirror device makes it easy to synchronize the timings, between the individual mirror devices, to control the respective mirror devices in high speed.

Furthermore, the multiple mirror devices placed on the same package substrate are operated under the thermal environment conditions thereby the shifts in the positions of the mirror elements of the individual mirror devices due to thermal expansion are also the same. Therefore the projection states of the individual devices are identical. Further, since the controls for the individual mirror devices can be set with the assumption that they are in the same environment, analogous control for the mirrors and the control condition of the voltage value for the memory can also be the same.

Furthermore, a projection apparatus 2500 shown in FIGS. 29A through 29D is configured such that the prism members and cover glass of the assembly body, which contain the above described multiple mirror devices, are connected with thermal conductive members 2062. This enables an exchange of heat between the prisms and mirror devices, making it possible to radiate heat in a lamp by way of radiation (not shown in the drawing) equipped on the mirror device or prism member.

The projection apparatus 2500 shown in FIGS. 29A through 29D is described later in detail. Note that the mirror devices 2030 and 2040 and the device substrates 2031 and 2041, which are shown in FIGS. 28A through 29D, correspond to the mirror device 4000 and device substrate 4004, respectively, which are shown in FIG. 6; and the mirror arrays 2032 and 2042 shown in FIGS. 28A through 29D correspond to the mirror element array 5110 shown in FIG. 21.

As described above, the mirror device according to the present embodiment is configured such that the electrode also fills the role of a stopper for regulating the deflection angle of a mirror, and thereby space utilization efficiency is improved when a mirror element is miniaturized, enabling an increase in the area size of the electrode. Therefore, a parallel application of an oscillation control for a mirror makes it possible to enable both a miniaturization of the mirror device and an enhancement of gradations.

Note that the mirror pitch, mirror gap, deflection angle, and drive voltage of the mirror device according to the present embodiment are not limited to the values exemplified in the above description. Preferably, they should be within the following ranges (including the values at each end of the range): the mirror pitch is between 4 μm and 10 μm; the mirror gap is between 0.15 μm and 0.55 μm; the maximum deflection angle of mirror is between 2 degrees and 14 degrees; and the drive voltage of mirror is between 3 volts and 15 volts.

Second Embodiment

With reference to the accompanying drawings, the following is a description of a projection apparatus according to the present embodiment comprising a mirror device described in detail for the second embodiment.

Figure 30:
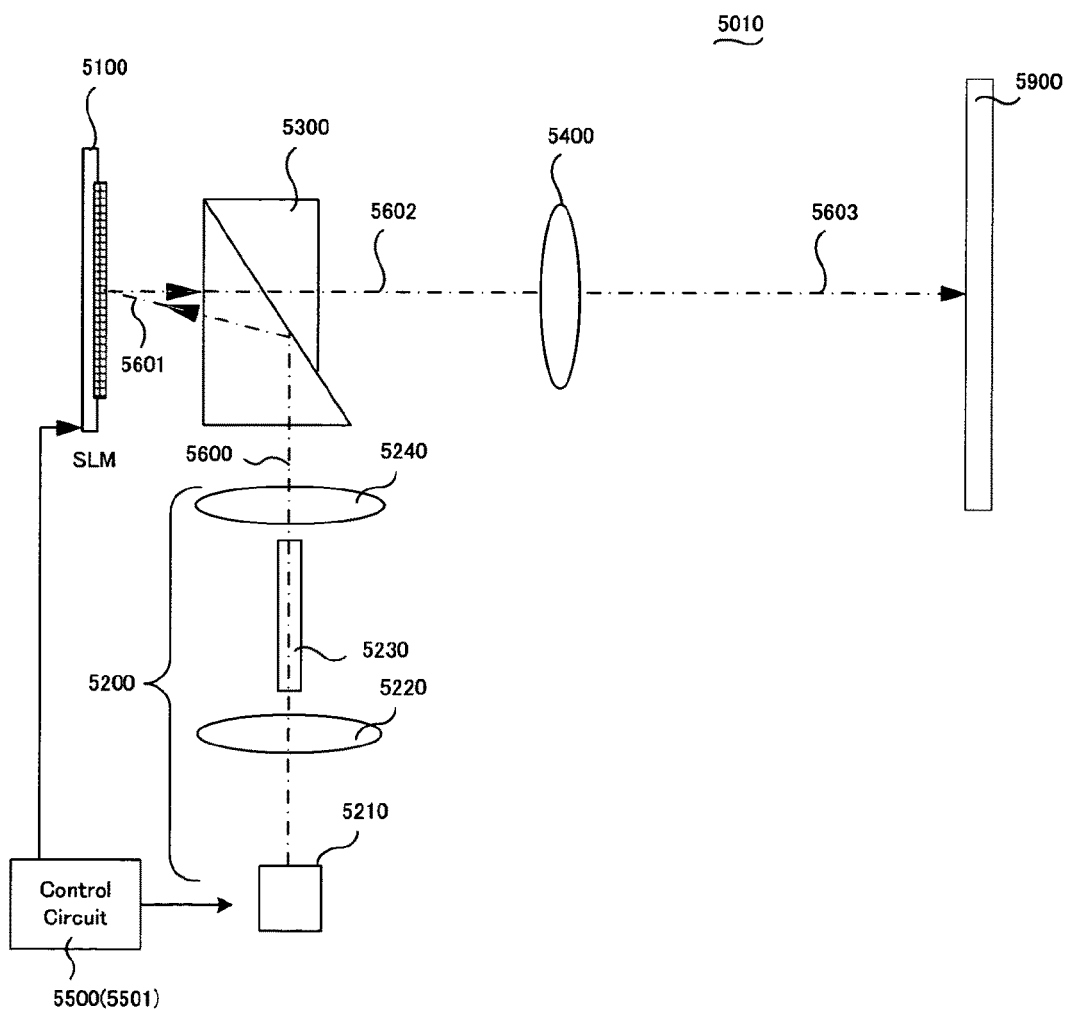
FIG. 30 is a functional block diagram showing the configuration of a single-panel projection apparatus according to the embodiment of the present invention.

First is a description of the configuration of a single-panel projection apparatus comprising a single spatial light modulator, and displaying a color display with the frequencies of projected light changing during, a time series, with reference to FIG. 30. Note that the spatial light modulated used in the present embodiment is actually the mirror device 4000 described in detail in the first embodiment.

FIG. 30 is a conceptual diagram showing the configuration of a single-panel projection apparatus according to the present embodiment. A projection apparatus 5010 comprises a single spatial light modulator (SLM) 5100, a control unit 5500, a Total Internal Reflection (TIR) prism 5300, a projection optical system 5400 and a light source optical system 5200, as exemplified in FIG. 30.

The projection optical system 5400 is equipped with the spatial light modulator 5100 and TIR prism 5300 in the optical axis of the projection optical system 5400, and the light source optical system 5200 is equipped in such a manner that the optical axis thereof matches that of the projection optical system 5400.

The TIR prism 5300 directs the illumination light 5600, which is incoming from the light source optical system 5200 placed onto the side towards the spatial light modulator 5100 at a prescribed inclination angle as incident light 5601 and transmits the reflection light 5602, reflected by the spatial light modulator 5100, to the projection optical system 5400.

The projection optical system 5400 projects the reflection light 5602, coming in from the spatial light modulator 5100 and TIR prism 5300, onto a screen 5900 as projection light 5603.

The light source optical system 5200 comprises a variable light source 5210 for generating the illumination light 5600, a condenser lens 5220 for focusing the illumination light 5600, a rod type condenser body 5230, and a condenser lens 5240.

The variable light source 5210, condenser lens 5220, rod type condenser body 5230, and condenser lens 5240 are sequentially placed in the aforementioned order in the optical axis of the to illumination light 5600 emitted from the variable light source 5210 and incident to the side face of the TIR prism 5300.

The projection apparatus 5010 employs a single spatial light modulator 5100 for implementing a color display on the screen 5900 by means of a sequential color display method. That is, the variable light source 5210, comprising a red laser light source 5211, a green laser light source 5212 and a blue laser light source 5213 (which are not shown in the drawing) that allows independent controls for the light emission states, divides one frame of display data into multiple sub-fields (in this case, three sub-fields: red (R), green (G) and blue (B)) and makes each of the light sources, the red laser light source 5211, green laser light source 5212 and blue laser light source 5213, emit each respective light in a time series at the time band corresponding to the sub-field of each color. This process will be described in greater detail later. Alternately, the red laser light source 5211, green laser light source 5212 and blue laser light source 5213 may be replaced with light emitting diodes (LEDs).

Figure 31A:
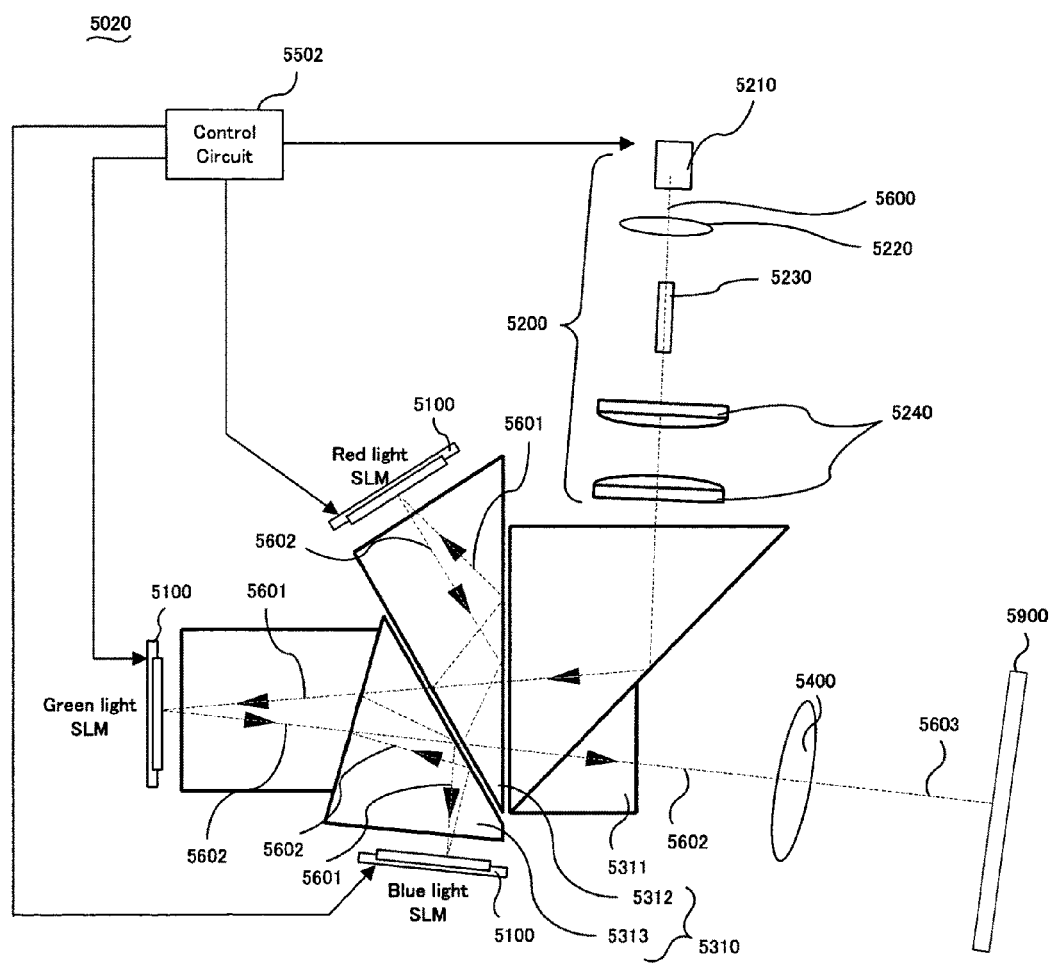
FIG. 31A is a functional block diagram showing the configuration of a multi-panel projection apparatus according to the embodiment of the present invention.
Figure 31B:
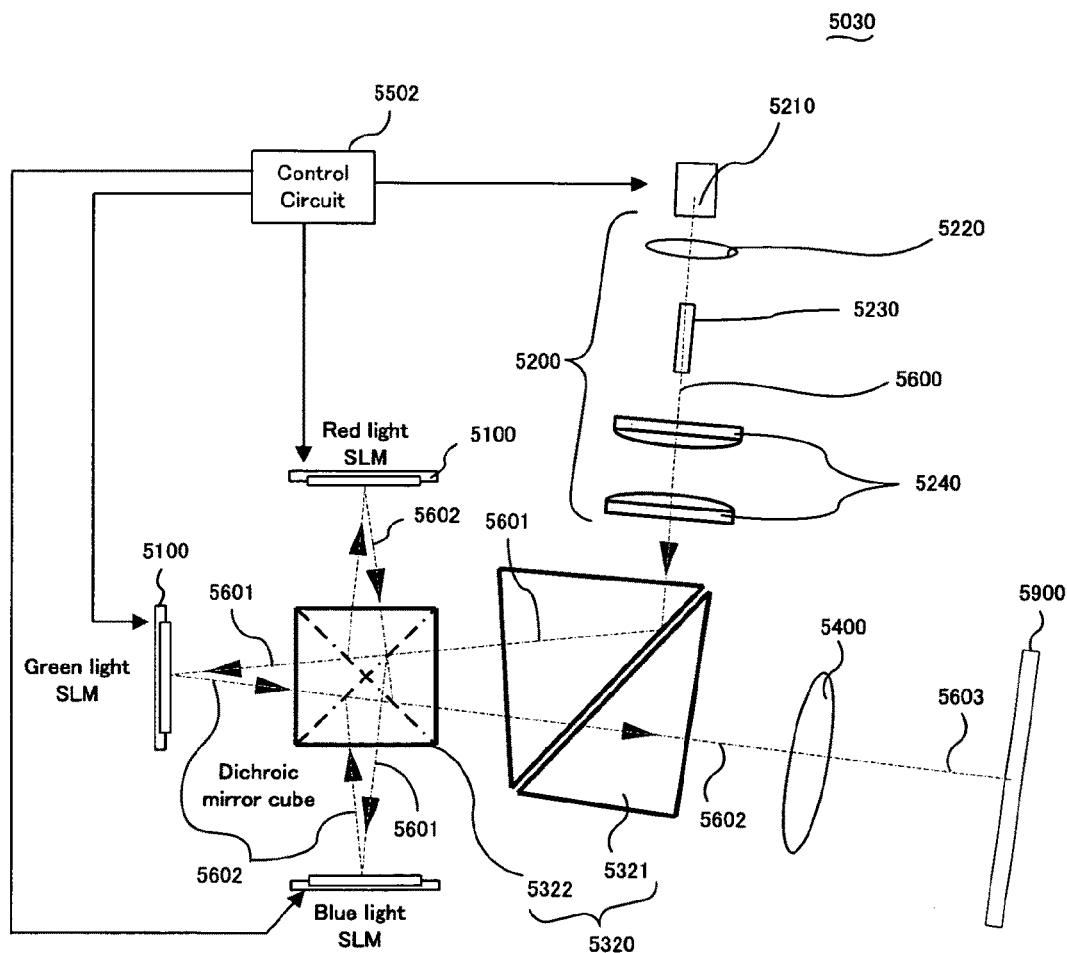
FIG. 31B is a functional block diagram showing the configuration of an exemplary modification of a multi-panel projection apparatus according to the embodiment of the present invention.
Figure 31C:
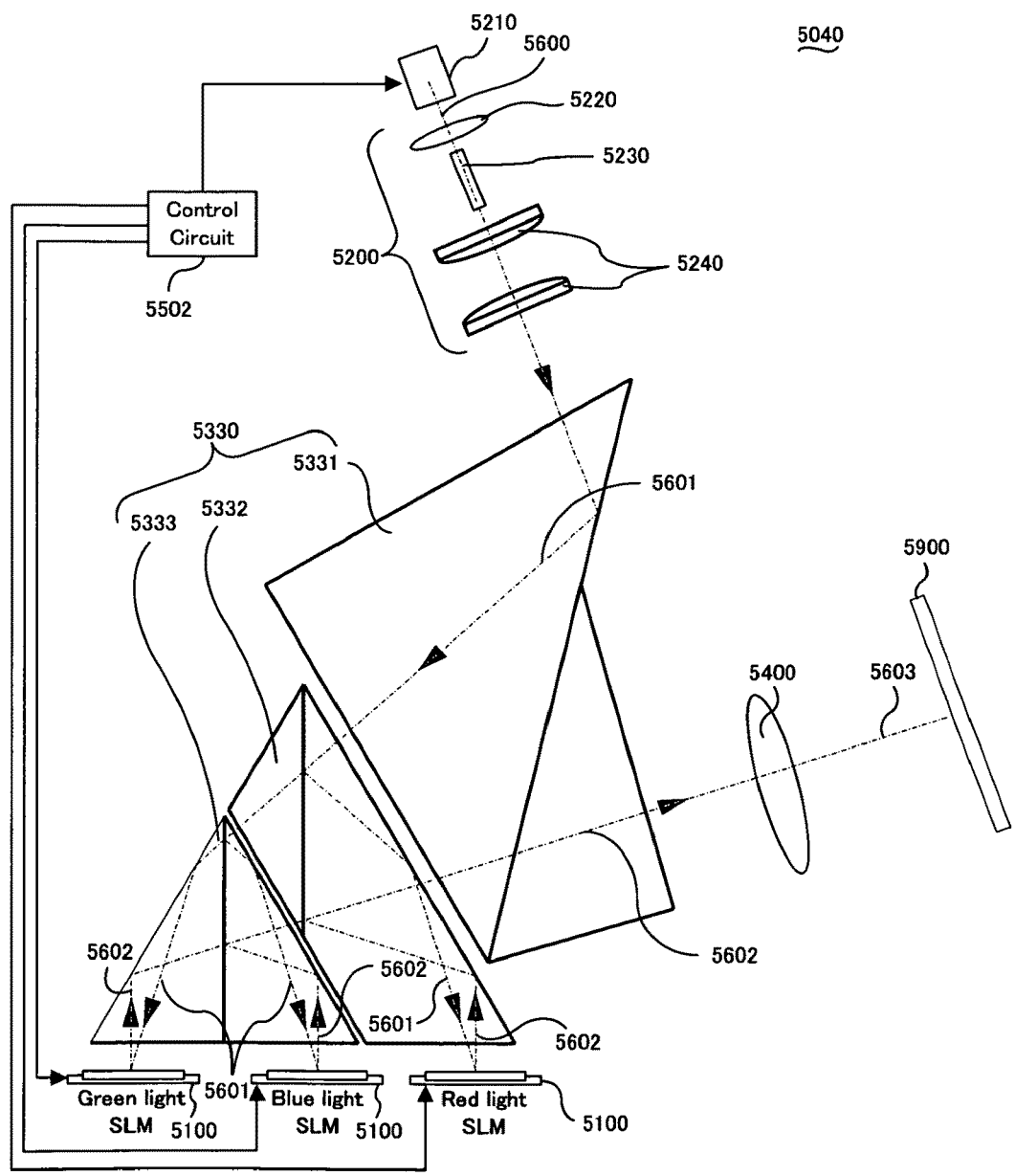
FIG. 31C is a functional block diagram showing the configuration of another exemplary modification of a multi-panel projection apparatus according to the embodiment of the present invention.

FIGS. 31A, 31B, and 31C describe three-panel projection apparatus using three spatial light modulators, as an example of a multi-panel projection apparatus.

FIG. 31A shows a multi-panel projection apparatus using a plurality of spatial light modulators to continuously modulate the illumination lights, with respectively different frequencies, using the individual spatial light modulators and carrying out a color display by synthesizing the modulated illumination lights.

FIG. 31A is a functional block diagram showing the configuration of a multi-panel projection apparatus according to the embodiment. The projection apparatus 5020 is a so-called multiple-plate projection apparatus comprising a plurality of spatial light modulators 5100, which is the main difference from the above described projection apparatus 5010. Further, the projection apparatus 5020 comprises a control unit 5502 in place of the control unit 5500.

The projection apparatus 5020 comprises a plurality of spatial light modulators 5100, and is equipped with a light separation/synthesis optical system 5310 between the projection optical system 5400 and each of the spatial light modulators 5100.

The light separation/synthesis optical system 5310 comprises a TIR prism 5311, color separation prism 5312 and color separation prism 5313.

The TIR prism 5311 functions to direct the illumination light 5600, incident from the side of the optical axis of the projection optical system 5400, to the spatial light modulator 5100 as incident light 5601.

The color separation prism 5312 has the functions of separating red (R) light from an incident light 5601, incident by way of the TIR prism 5311, and making the red light incident to the red light-use spatial light modulators 5100, and the function of directing the reflection light 5602R of the red light to the TIR prism 5311.

Likewise, the color separation prism 5313 has the functions of separating blue (B) and green (G) lights from the incident light 5601, incident by way of the TIR prism 5311, and making them incident to the blue color-use spatial light modulators 5100 and green color-use spatial light modulators 5100, and the function of directing the reflection light 5602 of the green light and blue light to the TIR prism 5311. Therefore, the spatial light modulations of three colors R, G, and B are simultaneously performed at three spatial light modulators 5100, and the reflection lights resulting from the respective modulations are projected onto the screen 5900 as the projection light 5603, by way of the projection optical system 5400, and thus a color display is carried out.

Note that various modifications are conceivable for a light separation/synthesis optical system and are not limited to the light separation/synthesis optical system 5310.

FIG. 31B is a functional block diagram for showing the configuration of an example of a modification of a multi-panel projection apparatus according to the present embodiment. The projection apparatus 5030 comprises a light separation/synthesis optical system 5320 in place of the above described light separation/synthesis optical system 5310. The light separation/synthesis optical system 5320 comprises a TIR prism 5321 and a cross dichroic mirror 5322.

The TIR prism 5321 functions to direct an illumination light 5600, incident from the lateral direction of the optical axis of the projection optical system 5400, towards the spatial light modulators 5100 as incident light 5601.

The cross dichroic mirror 5322 has the function of separating red, blue and green lights from the incident light 5601, incoming from the TIR prism 5321, making the incident lights 5601 of the three colors enter the red-use, blue-use and green-use spatial light modulators 5100, respectively, and also converging the reflection lights 5602, reflected by the respective color-use spatial light modulators 5100, and directing it towards the projection optical system 5400.

FIG. 31C is a functional block diagram for showing the configuration of another exemplary modification of a multi-panel projection apparatus according to the present embodiment. The projection apparatus 5040 is configured differently from the above described projection apparatuses by placing 5020 and 5030 adjacent to one another in the same plane. A plurality of spatial light modulators 5100 corresponding to the three colors R, G and B are on one side of a light separation/synthesis optical system 5330. This configuration makes it possible to consolidate the multiple spatial light modulators 5100, by integrating them into the same packaging unit, and thereby saving space.

The light separation/synthesis optical system 5330 comprises a TIR prism 5331, a prism 5332, and a prism 5333.

The TIR prism 5331 has the function of directing, to spatial light modulators 5100, the illumination light 5600, incident in the lateral direction of the optical axis of the projection optical system 5400, as incident light 5601.

The prism 5332 has the functions of separating the red light from the incident light 5601 and directing it towards the red color-use spatial light modulator 5100 and of capturing the reflection light 5602 and directing it to the projection optical system 5400.

Likewise, the prism 5333 has the functions of separating the green and blue incident lights from the incident light 5601, making them incident to the individual spatial light modulators 5100 equipped for the respective colors, and of capturing the green and blue reflection lights 5602 and directing them towards the projection optical system 5400.

Note that the multi-panel projection apparatus can totally eliminate the color break problem. Because, unlike the above described single-panel projection apparatus, a multiple panel projection system prevents the occurrence of a visual problem by continuously projecting the individual primary colors. Further, a bright image can be obtained because the light emitted from the light source can be effectively utilized. On the other hand, there are the problems of a more complicated positioning of the spatial light modulator corresponding to the light of each individual color and an increase in the size of the apparatus.

The following is a description of a two-panel projection apparatus using two spatial light modulators (i.e., mirror devices) as another example of a multi-panel projection apparatus. FIGS. 29A through 29D show the configuration of a two-panel projection apparatus 2500 comprising the assembly body 2400, shown in the above described FIGS. 28A and 28B, which is contained within one package accommodating two mirror devices 2030 and 2040.

The two-panel projection apparatus 2500 does not project only one color of three colors R, G and B in sequence, nor does it project the R, G and B colors continuously and simultaneously, as in the case of a three-panel projection apparatus. A two-panel projection apparatus projects an image by continuously projecting, for example, a green light source with high visibility and projecting a red light source and a blue light source in sequence.

The two-panel projection apparatus 2500 is capable of changing over colors in high speed by means of pulse emission in 180 kHz to 720 kHz by controlling the laser light sources, thereby making it possible to obscure flickers caused by the change over among the light sources of the different colors.

Further, a projection method for continuously projecting the brightest color and changing over the other colors in sequence, on the basis of the image signals, can also be implemented. Such projection methods can also be adopted for a configuration making R, G and B lights correspond to the respective mirror devices, as in the three-panel projection method.

Figure 29A:
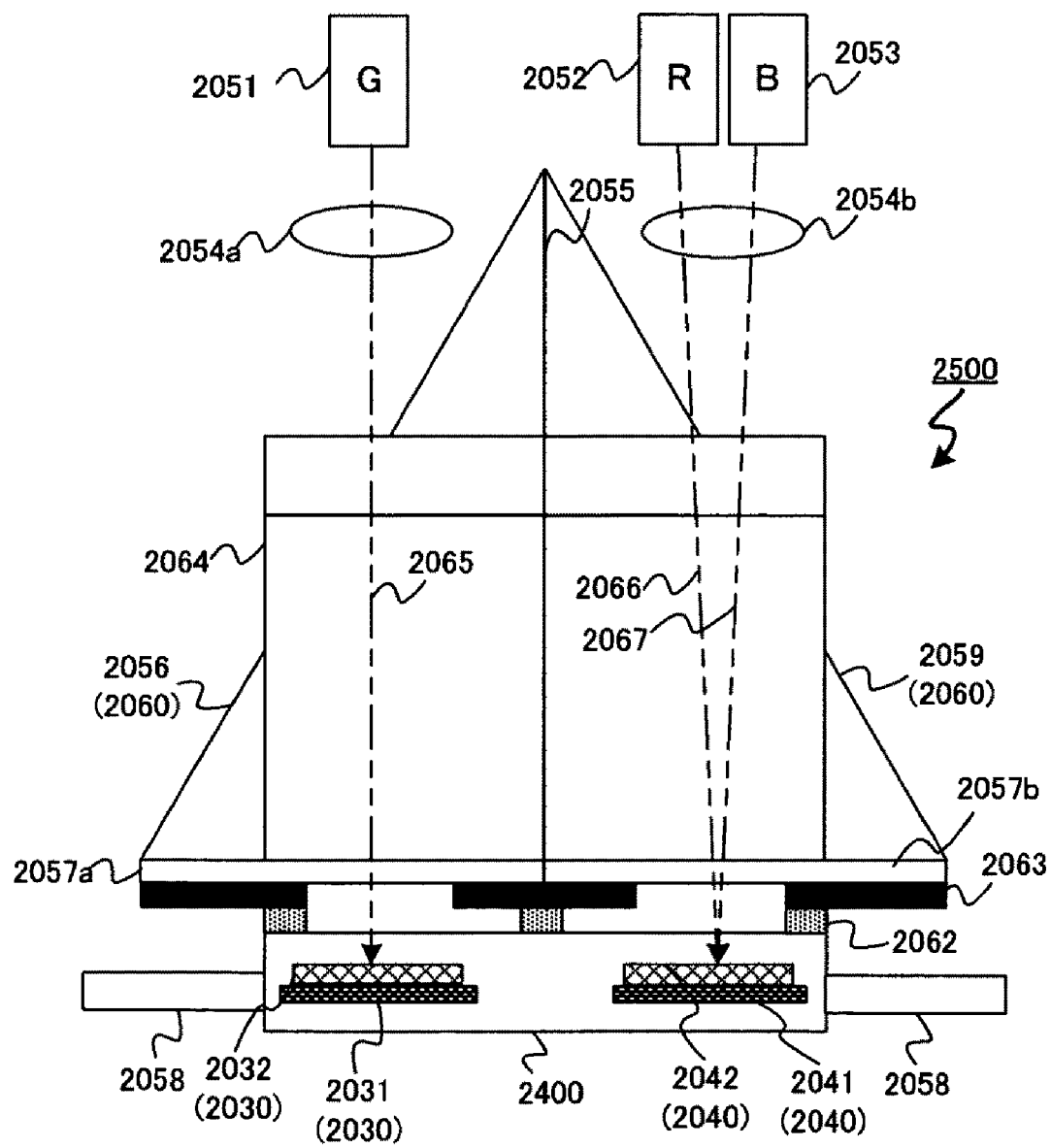
FIG. 29A is a front view diagram of a two-panel projection apparatus comprising a plurality of mirror devices packaged in a single package.
Figure 29B:
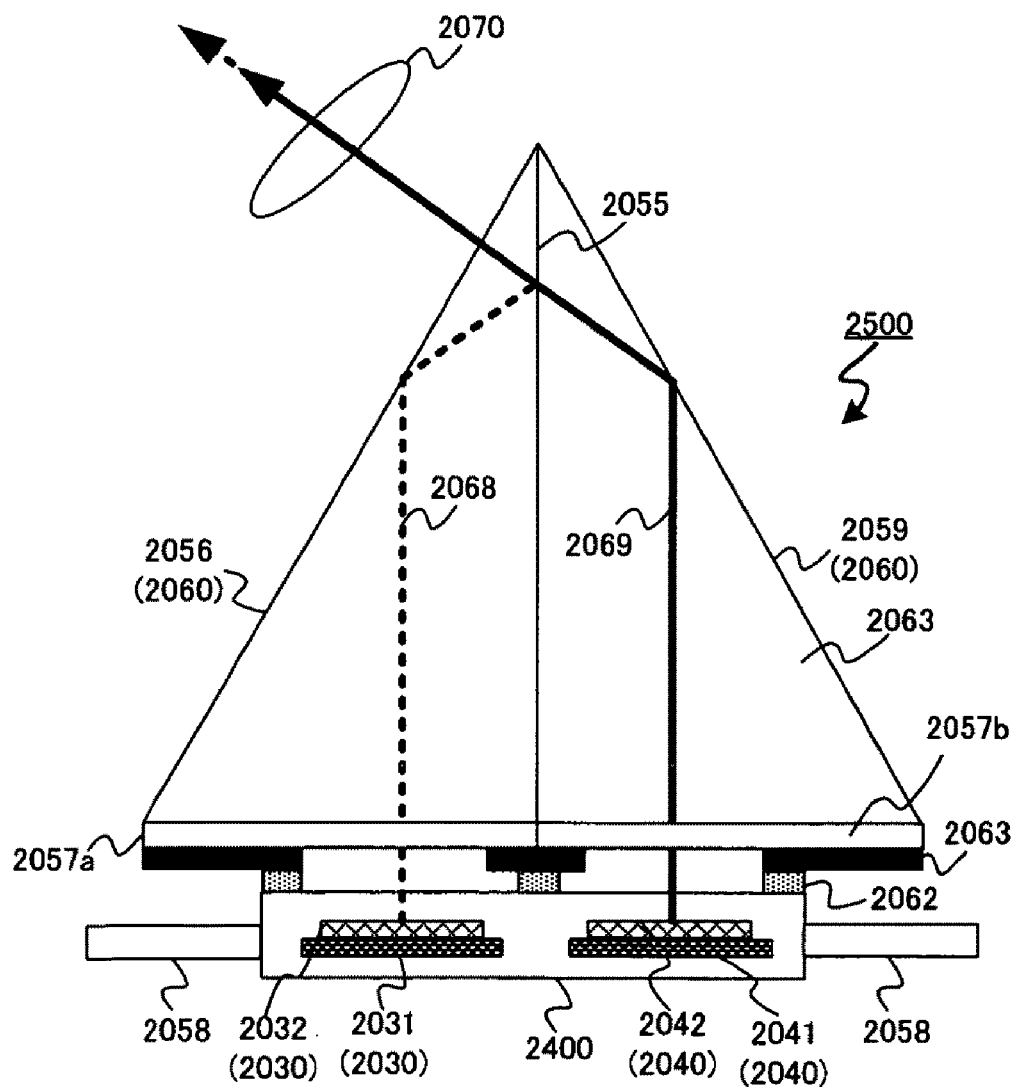
FIG. 29B is a rear view diagram of the two-panel projection apparatus shown in FIG. 32A.
Figure 29C:
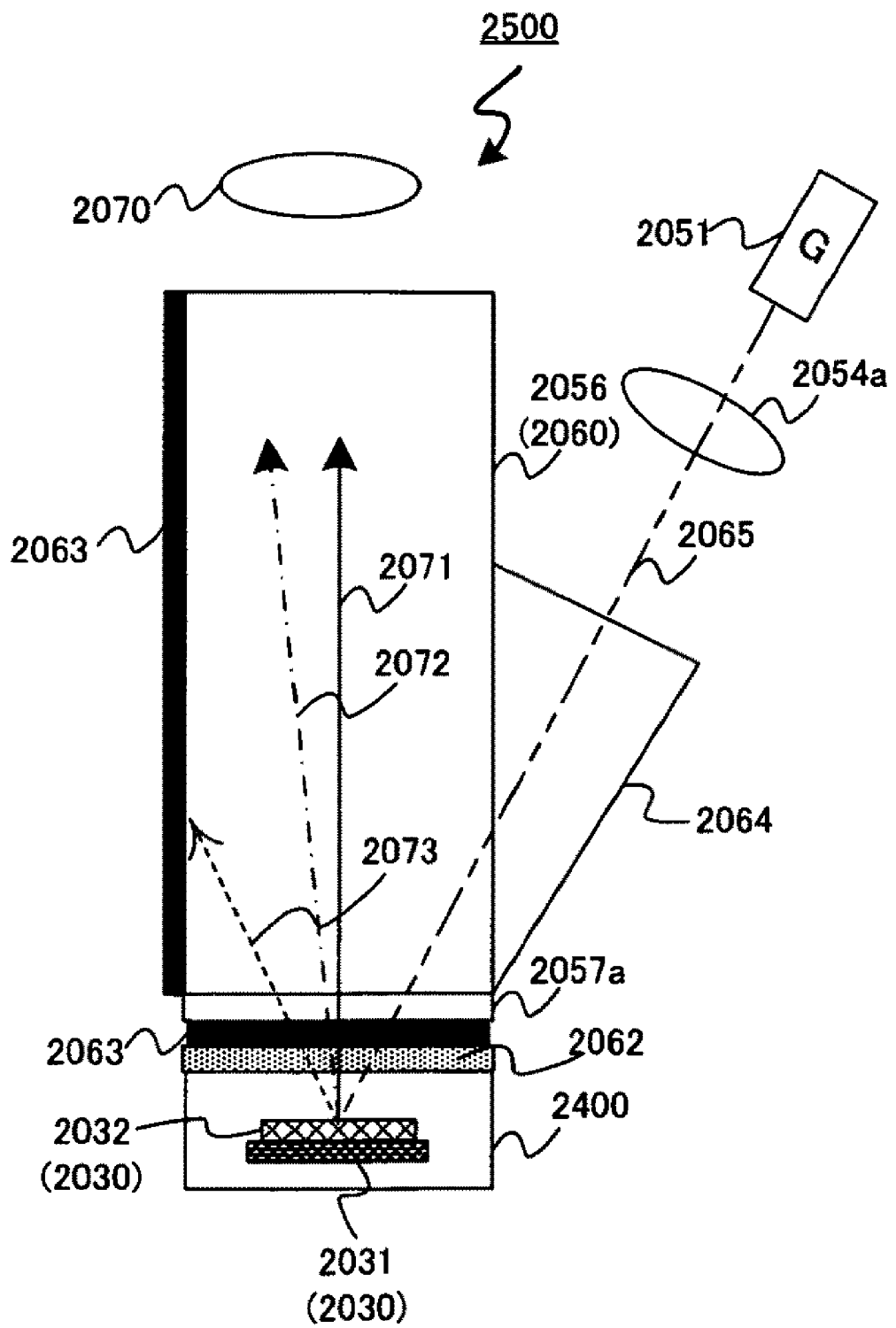
FIG. 29C is a side view diagram of the two-panel projection apparatus shown in FIG. 32A.
Figure 29D:
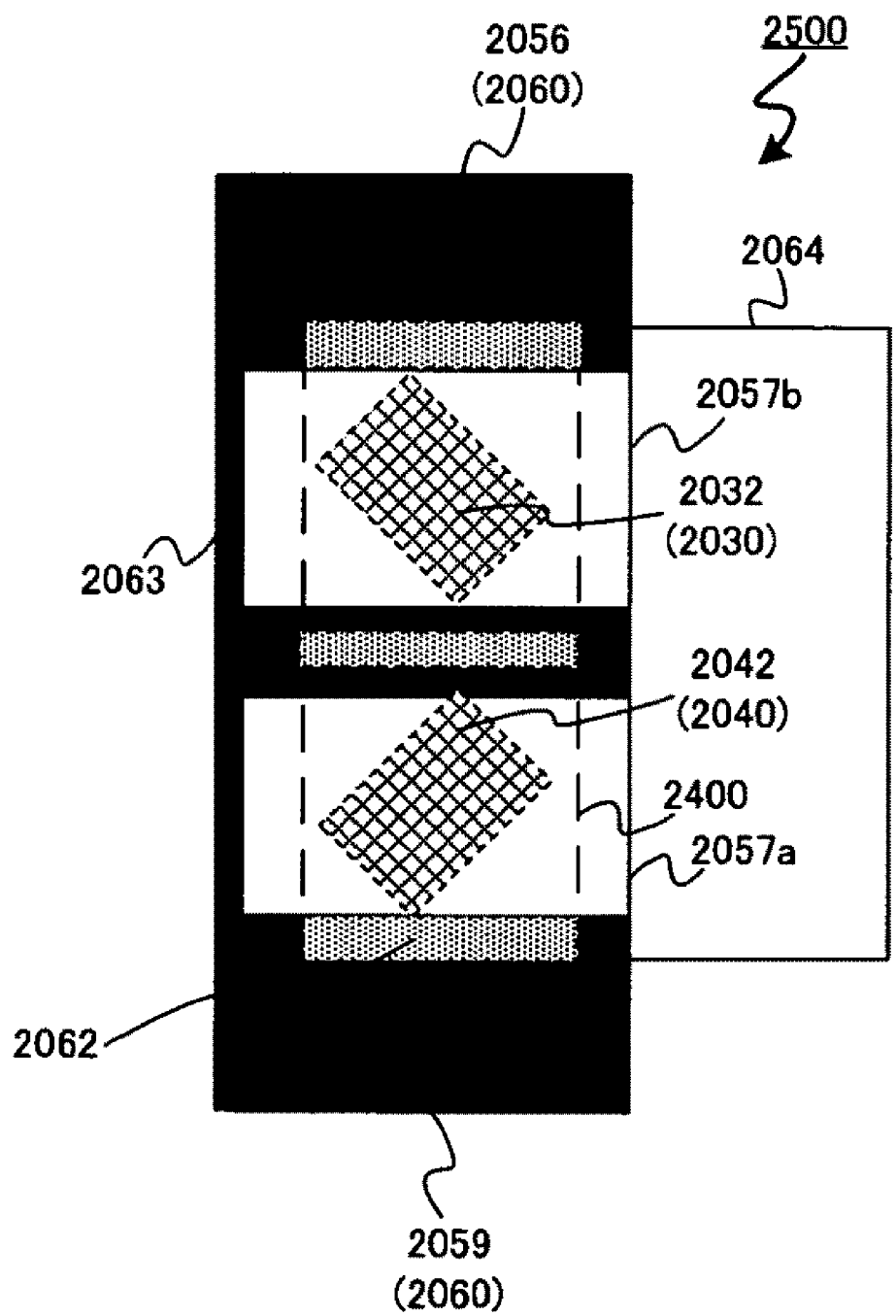
FIG. 29D is a diagram of the two-panel projection apparatus shown in FIG. 29A, as viewed from above.

FIG. 29A is a front view diagram of a two-panel projection apparatus 2500; FIG. 29B is a rear view diagram of the two-panel projection apparatus 2500; FIG. 29C is a side view diagram of the two-panel projection apparatus 2500; and FIG. 29D is a diagram, as viewed from above, of the two-panel projection apparatus 2500.

The following description explains the optical transmissions and principles of projection of the two-panel projection apparatus 2500 shown in FIGS. 29A through 29D.

The projection apparatus 2500 shown in FIGS. 29A through 29D includes a green laser light source 2051, a red laser light source 2052, a blue laser light source 2053, illumination optical systems 2054a and 2054b, two triangular prisms 2056 and 2059, ¼ wavelength plates 2057a and 2057b, two mirror devices 2030 and 2040 accommodated in a single package, a circuit board 2058, a light guide prism 2064, and a projection lens 2070.

The two triangular prisms 2056 and 2059 are joined together to constitute one polarization beam splitter prism 2060. Further, the joined part between the two triangular prisms 2056 and 2059 is provided with a polarization beam splitter film 2055 or coating. The polarization beam splitter prism 2060 serves the primary functions of synthesizing the light reflected by the two mirror devices 2030 and 2040.

The polarization beam splitter film 2055 is a filter for transmitting only an S-polarized light and reflecting P-polarized light.

A sloped face of the right-angle triangle cone light guide prism 2064 is adhesively attached to the front surface of the polarization beam splitter prism 2060, with the bottom of the light guide prism 2064 facing upwards. The green laser light source 2051, the illumination optical system 2054*a* corresponding to the green laser light source 2051, the red laser light source 2052, the blue laser light source 2053, and the illumination optical system 2054*d* corresponding to the red laser light source 2052 and blue laser light source 2053 are placed above the bottom surface of the light guide prism 2064, with the respective optical axes of the green laser light source 2051, red laser light source 2052, blue laser light source 2053 being aligned perpendicularly to the bottom surface of the light guide prism 2064.

The light guide prism 2064 is provided to direct the respective lights of the green laser light source 2051, red laser light source 2052 and blue laser light source 2053 to enter perpendicularly to the polarization beam splitter prism 2060. Such a light guide prism 2064 makes it possible to reduce the amount of the reflection light caused by the polarization beam splitter prism 2060 when the laser light enters the polarization beam splitter prism 2060.

Further, a ¼-wavelength plates 2057*a* and 2057*b* are provided on the bottom surface of the polarization beam splitter prism 2060. A light shield layer 2063 is applied on the regions other than the areas where the light is irradiated on the individual mirror devices 2030 and 2040. Note that the ¼ wavelength plates 2057*a* and 2057*b* may alternatively be placed on the cover glass of the package. Furthermore, the rear surface of the polarization beam splitter prism 2060 is also coated with a light shield layer 2063.

The two mirror devices 2030 and 2040, which are accommodated in a single package, are under the ¼ wavelength plates 2057*a* and 2057*b*, and the cover glass of the package is joined to the polarization beam splitter prism 2060 by way of a thermal conduction member 2062. This makes it possible to radiate heat from the cover glass of the package to the polarization beam splitter prism 2060 by way of the thermal conduction member 2062. Further, the circuit boards 2058 comprising a control circuit(s) for controlling the individual mirror devices 2030 and 2040 are placed, respectively, on both sides of the package.

The mirror devices 2030 and 2040 are placed to form a 45-degree angle relative to the four sides of the outer circumference of the package. The deflecting direction of each mirror element of the mirror devices 2030 and 2040 is approximately orthogonal to the slope face forming the polarization beam splitter prism 2060 and to the plane on which the reflection lights are synthesized. The mirror devices 2030 and 2040 must be precisely placed with a high precision in relation to the polarization beam splitter prism 2060 within the package by means of the positioning pattern 2016.

The illumination optical systems 2054*a* and 2054*b* each comprises a convex lens, a concave lens, and other components, and the projection lens 2070 comprises a plurality of lenses and other components.

The following description explains the principle of projection of the projection apparatus 2500 shown in FIGS. 29A through 29D.

In the projection apparatus 2500, the individual laser lights 2065, 2066 and 2067 are incident from the front direction and are reflected by the two mirror devices 2030 and 2040 toward the rear direction, and then an image is projected by way of the projection lens 2070 located in the rear.

Next is a description of the projection principle starting from the incidence of the individual laser lights 2065, 2066 and 2067 to the reflection of the respective laser lights 2065, 2066 and 2067 at the two mirror devices 2030 and 2040 toward the rear direction, with reference to the front view diagram of the two-panel projection apparatus 2500 shown in FIG. 29A.

The respective laser lights 2065, 2066 and 2067 from the S-polarized green laser light source 2051, and the P-polarized red laser light source 2052 and blue laser light source 2053 are made to project to the polarization beam splitter prism 2060 through the illumination optical systems 2054*a* and 2054*b*, respectively corresponding to the laser lights 2065, and 2066 and 2067, and by way of the light guide prism 2064. After transmission through the polarization beam splitter prism 2060, the S-polarized green laser light 2065 and the P-polarized red and blue laser lights 2066 and 2067 are incident to the ¼ wavelength plates 2057*a* and 2057*b*, which are placed on the bottom surface of the polarization beam splitter prism 2060. After passing through the ¼ wavelength plates 2057*a* and 2057*b*, the polarization of the individual laser lights 2065, 2066 and 2067 are changed by the amount of ¼ wavelengths to be in a circular polarized light state.

Then, the ¼ wavelength plates 2057*a* and 2057*b* project the circular polarized green laser light 2065 and the circular polarized red and blue laser lights 2066 and 2067 to the two mirror devices 2030 and 2040 contained in a single package. The individual laser lights 2065, 2066 and 2067 are modulated and reflected by the correspondingly mirror devices so that the rotation directions of the circular polarization are reversed.

Next is a description of the projection principle starting from the reflection of individual laser lights 2065, and 2066 and 2067 to the projection of an image, with reference to the rear view diagram of the two-panel projection apparatus 2500 shown in FIG. 29B.

The ON light 2068 of the circular polarized green laser and the mixed ON light 2069 of the circular polarized red and blue lasers, which are reflected by the respective mirror devices 2030 and 2040, passes through the ¼ wavelength plates 2057*a* and 2057*b* again and enter the polarization beam splitter prism 2060. In this event, the polarization of the green laser ON light 2068 and that of the mixed red and blue laser ON light 2069 are respectively changed by the amount of ¼ wavelengths to become a linear polarized state with a 90-degree rotation of the polarization axis. That is, the green laser ON light 2068 is changed to a P-polarized light, while the mixed red and blue laser ON light 2069 is changed to an S-polarized light.

Then, the green laser ON light 2068 and the mixed red and blue laser ON light 2069 are reflected by the outer side surface of the polarization beam splitter prism 2060, and the P-polarized green laser ON light 2068 is reflected again by the polarization beam splitter film 2055. Meanwhile, the S-polarized mixed red and blue laser ON light 2069 passes through the polarization beam splitter film 2055. Then, the green laser ON light 2068 and red and blue laser mixed ON light 2069 are incident to the projection lens 2070, and thereby a color image is projected. Note that the optical axes of the lights incident to the projection lens 2070 from the polarization beam splitter prism 2060 are desired to be orthogonal to the ejection surface of the polarization beam splitter prism 2060. Alternatively, there is a viable configuration that does not use the ¼ wavelength plates 2057*a* and 2057*b*.

With the configuration and the principle of projection as described above, an image can be projected in the two-panel projection apparatus 2500 comprising the assembly body 2400 that packages the two mirror devices 2030 and 2040, which are accommodated in a single package.

FIG. 29C is a side view diagram of the two-panel projection apparatus 2500. The green laser light 2065 emitted from the green laser light source 2051 perpendicularly enters the light guide prism 2064 via the illumination optical system 2054a. In this event, the reflection of the laser light 2065 is minimized by the laser light 2065 entering the light guide prism 2064 along an orthogonal direction.

Then, having passed through the light guide prism 2064, the laser light 2065 passes through the polarization beam splitter prism 2060 and ¼ wavelength plates 2057a and 2057b, which are joined to the light guide prism 2064, and then, enters the mirror array 2032 of the mirror device 2030.

The mirror array 2032 reflects the laser light 2065 with the deflection angle of a mirror that puts the reflected light in any of the states, i.e., an ON light state in which the entirety of the reflection light is incident to the projection lens 2070, an intermediate light state in which a portion of the reflection light is incident to the projection lens 2070, and an OFF light state in which no portion of the reflection light is incident to the projection lens 2070.

The reflection light of a laser light (i.e., ON light) 2071, from which the ON light state is selected, is reflected by the mirror array 2032 and will be incident to the projection lens 2070. A portion of the reflection light of a laser light (i.e., intermediate light) 2072, from which the intermediate state is selected, is reflected by the mirror array 2032 and will be incident to the projection lens 2070.

Further, the reflection light of a laser light (i.e., OFF light) 2073, from which the OFF light state is selected, is reflected by the mirror array 2032 toward the light shield layer 2063, in which the reflection light is absorbed.

With this configuration, the laser light enters the projection lens 2070 at the maximum light intensity of the ON light, at an intermediate intensity between the ON light and OFF light of the intermediate light, and at the zero intensity of the OFF light. This configuration makes it possible to project an image in a high level of gradation. Note that the intermediate light state produces a reflection light reflected by a mirror, in which the deflection angle is regulated between the ON light state and OFF light state.

Meanwhile, making the mirror perform a free oscillation causes it to cycle three deflection angles producing the ON light, the intermediate light and the OFF light, respectively. Here, controlling the number of free oscillations makes it possible to adjust the light intensity and obtain an image with a higher level of gradation.

FIG. 29D is diagram of the two-panel projection apparatus 2500, as seen from above. The mirror devices 2030 and 2040 are placed in a package on the same horizontal plane, with them respectively forming an approximately 45-degree angle in relation to the four sides of the outer circumference of the package, as shown in FIG. 29D, and thereby the light in the OFF light state can be absorbed by the light shield layer 2063 without allowing the light to be reflected by the sloped face of the polarization beam splitter prism 2060, and the contrast of an image is improved.

Further, the heat generated inside of the package is conducted to the polarization beam splitter prism 2060 by way of the thermal conduction member 2062 and is radiated from there to the outside. As such, the conduction of the heat generated in the mirror device to the polarization beam splitter prism 2060 improves the radiation efficiency. Further, the heat generated by absorbing light is radiated to the outside instantly because the light shield layer 2063 is exposed to the outside.

When a mirror element reflects the incident light towards a projection lens 2070 at an intermediate light intensity (i.e., an intermediate state), that is, the intensity between the ON light and OFF light states, an effective reflection plane needs to be provided along the length of the slope face of a prism in a conventional apparatus.

In contrast, the projection apparatus 2500 is enabled to provide a wide effective reflection plane along the direction of the thickness of the polarization beam splitter prism 2060, even when the mirror element as described above has an intermediate state. With this configuration, the total reflection by the slope face of the polarization beam splitter prism 2060 for the reflection light from the mirror element can be alleviated.

Next is a description of a suitable projection lens in the case where the mirror device comprised in the projection apparatus, according to the present embodiment, is miniaturized.

If a mirror device with a diagonal size of 0.95 inches is used for a rear projection system with about a 65-inch screen size, a required projection magnification ratio is about 68. If a mirror array with a diagonal size of 0.55 inches is used, a required projection magnification ratio is about 118. As such, the projection magnification increases in association with the shrinking of the mirror array. This introduces the problem of color aberration caused by a projection lens.

The focal distance of the lens needs to be shortened to increase the projection magnification. Accordingly, the F number for the projection lens is set at 5 or higher when used with a laser light source. With a laser light source, it is possible to use a projection lens with the F number at 2 times the value, and the focal distance at half the value of a conventional apparatus using a mercury lamp, in which the focal distance is set at 15 mm and the F number at about 2.4 for the projection lens. The usage of a projection lens with a large F number makes it possible to reduce the outer size of the projection lens. This in turn reduces the image size with which a light flux passes through the illumination optical system, thereby making it possible to suppress a color aberration caused by the projection lens.

Therefore, in a case where a laser light source is used with a mirror device miniaturized to between 0.4 inches and 0.87 inches, the deflection angle of mirror can be reduced to between ±7 degrees and ±5 degrees, and the F number for a projection lens can be increased. Alternatively, the setting of the numerical aperture NA of an illumination light flux between 0.1 and 0.04 with the deflection angle of mirror maintained at ±13 degrees makes it possible to reflect the OFF light to a larger distance from the projection lens, improving the contrast of the projection image.

As described above, the projection magnification of a projection lens can be set at 75× to 120× by reducing the numerical aperture NA of the light flux emitted from a laser light source, using a mirror device with which the deflection angle of mirror is reduced to between ±7 degrees and ±5 degrees, and in which the mirror array is miniaturized to a diagonal size of 0.4 inches to 0.87 inches, and thereby the F number for a projection lens is increased. Meanwhile, when a mirror device is moved forwards or backwards relative to the optical axis of projection, a distance with which an image blur (i.e., out of focus) of a projected image is permissible is called a focal depth. When an image is projected with a permissible blur depending on the size of the mirror by an optical setup of the same focal distance, projection magnification and mirror size, a depth of focus is approximated as follows:

$$\text{Depth of focus } Z = 2*(\text{permissible blur})*(F \text{ number})$$

Here, the depth of focus is proportional to the F number of a projection lens. That is, the permissible distance of the shift in positions of a placed mirror device, relative to the optical axis of projection, increases with F number. This factor is represented by the relationship between a permissible circle of confusion and a depth of focus. As an example, where the F number of a projection lens is "8" and the permissible blur is equivalent to a 10 μm mirror size in the above described approximation equation, the depth of focus is:

Z=2*10*8=160 [μm]

Further, where a mirror size is 5 μm and an F number is 2.4, the depth of focus is 24 μm. Here, considering the errors of a projection lens and other components of the optical system, the depth of focus is preferably no larger than 20 μm, or several micrometers or less. With this in mind, when the top or bottom surface of a package substrate is taken as reference, the difference in heights of the reflection on the surface of mirrors placed respectively on both ends of a mirror array is preferably no more than 20 μm.

Further, a blurred image caused by dust, or other such object, on the surface of a cover glass can be made negligible by configuring the device so that the distance between the top surface of a mirror and the bottom surface of the cover glass is no less than the value of the depth of focus. It is therefore preferable to configure the device so that the distance between the top surface of the mirror and the bottom surface of the cover glass is at least 20 times, or more, of the mirror size.

Figure 32:
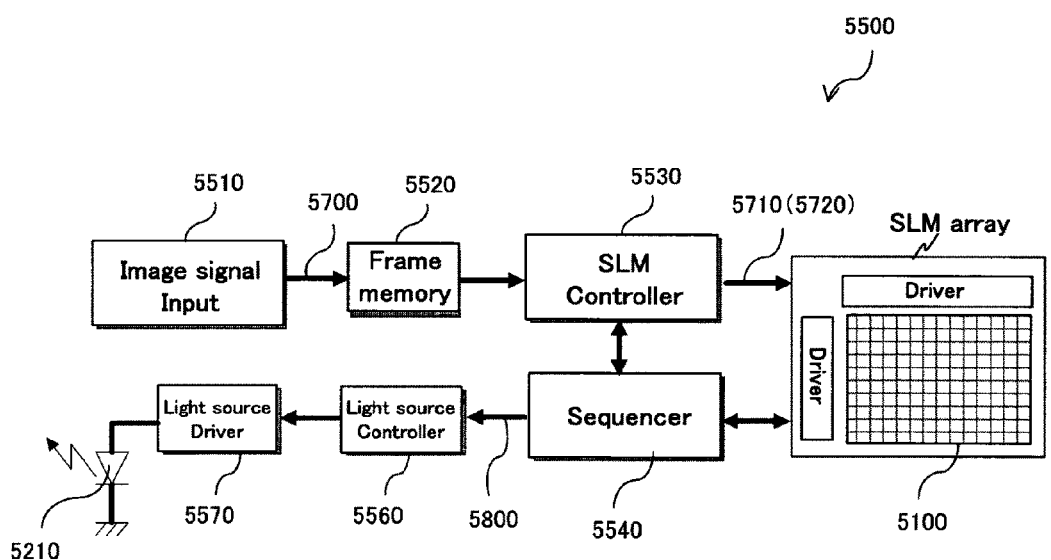
FIG. 32 is a block diagram for showing a control unit for a projection apparatus according to the embodiment of the present invention.

Next is a description of the embodiment of a control unit used for a projection apparatus according to the present embodiment. FIG. 32 is a block diagram for illustrating a control unit 5500 implemented in the above described single-panel projection apparatus 5010.

The following is a description of the control unit of the projection apparatus according to the present embodiment using, as an example, the control unit 5500 comprised in the single-panel projection apparatus 5010.

The control unit 5500 comprises a frame memory 5520, an SLM controller 5530, a sequencer 5540, a light source control unit 5560, and a light source drive circuit 5570.

The sequencer 5540, constituted by a microprocessor, controls the operation timing of the entirety of the control unit 5500 and spatial light modulators 5100.

The frame memory 5520 retains the amount of one frame of input digital video data 5700 incoming from an external device (not shown in the drawing), which is connected to a video signal input unit 5510. The input digital video data 5700 is updated, moment-by-moment, every time the display of one frame is completed.

Figure 33A:
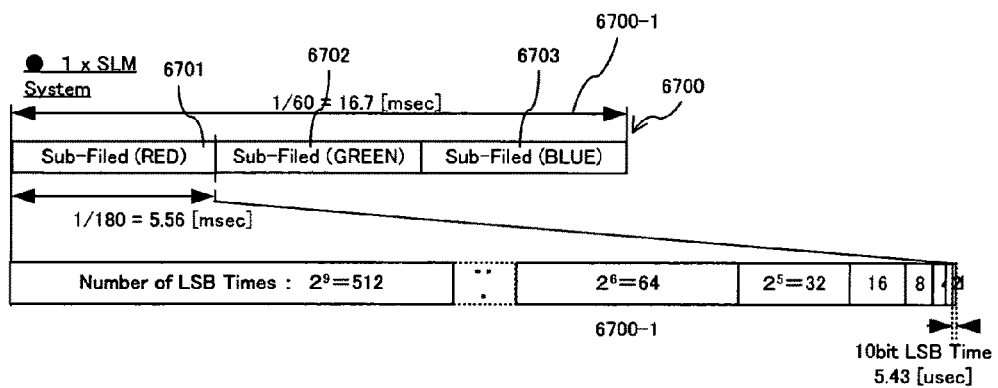
FIG. 33A is a data structure diagram for showing the data structure of image data used in a single-panel projection apparatus according to the embodiment of the present invention.

In the case of the single-panel (1×SLM) projection apparatus 5010, one frame (i.e., a frame 6700-1) of the input digital video data 5700 is constituted by a plurality of subfields 6701, 6702 and 6703, in a time sequence, corresponding to the respective colors R, G and B as exemplified in FIG. 33A, in order to carry out a color display by means of a color sequence method. The SLM controller 5530 separates the input digital video data 5700 read from the frame memory 5520 into a plurality of subfields 6701, 6702 and 6703, then converts them into mirror profiles (i.e., mirror control profiles 6710 and 6720) that are drives signals for implementing the ON/OFF control and oscillation control for the mirror of the spatial light modulator 5100 for each sub-field, and outputs the converted mirror profiles to the spatial light modulator 5100.

Note that the mirror control profile 6710 is a mirror control profile consisting of binary data. Here, the binary data means the data in which each bit has a different weighting factor and which includes a pulse width in accordance with the weighting factor of each bit. Meanwhile, the mirror control profile 6720 is a mirror control profile consisting of non-binary data. Here, the non-binary data means the data in which each bit has an equal weighting factor and which includes a pulse width in accordance with the number of continuous bits of "1".

The mirror control profile generated by the SLM controller 5530 is also inputted to the sequencer 5540, which in turn transmits a light source profile control signal 5800 to the light source control unit 5560 on the basis of the mirror control profile input from the SLM controller 5530.

The light source control unit 5560 instructs the light source drive circuit 5570 regarding the emission timing and light intensity of an illumination light 5600 required of the variable light source 5210, corresponding to the driving of the spatial light modulator 5100. The variable light source 5210 performs emission so as to emit the illumination light 5600 at the timing and light intensity driven by the light source drive circuit 5570.

With this control, it is possible to change the brightness of a displayed pixel through a continuous adjustment of the emission light intensity of the variable light source 5210 and to control the characteristics of the gradations of the display image in the midst of driving the spatial light modulator 5100, that is, in the midst of displaying an image onto the screen 5900. The emission light intensity of the variable light source 5210 is adjusted by using a mirror control profile used for driving the spatial light modulator 5100, and therefore no extraneous irradiation occurs, making it possible to reduce the heat from and the power consumption of the variable light source 5210.

The description above is based on the example of the control unit 5500 comprised in the single-panel projection apparatus. In the case of a multi-panel projection apparatus, however, a configuration may be such that the SLM controller 5530 and sequencer 5540 control a plurality of spatial light modulators 5100. An alternative configuration may be to equip an apparatus with multiple SLM controllers, in place of the SLM controller 5530, so as to control the respective spatial light modulators 5100.

Figure 33B:
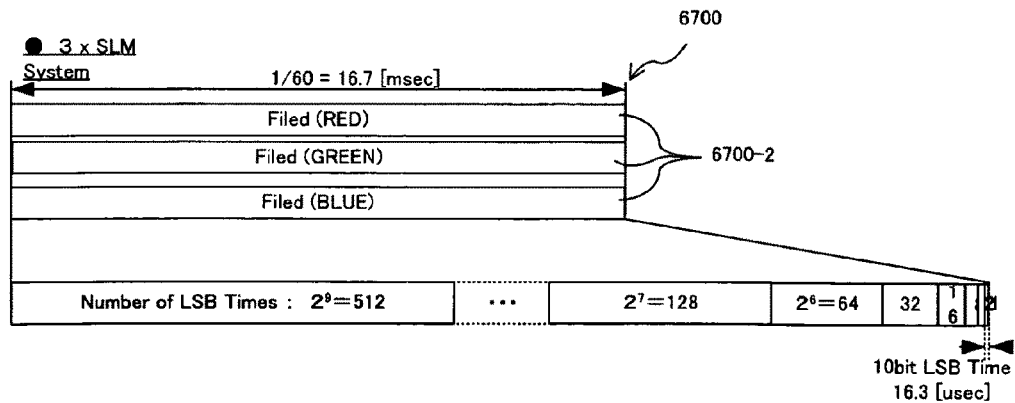
FIG. 33B is a data structure diagram for showing the data structure of image data used in a multi-panel projection apparatus according to the embodiment of the present invention.

In the case of a multi-panel projection apparatus, the structure of the input digital video data 5700 is also different. In the case of, for example, the above described multi-panel (3×SLM) projection apparatuses 5020, 5030 and 5040, the input digital video data 5700 corresponding to one frame (i.e., the frame 6700-1) display period is constituted by a plurality of fields 6700-2 (i.e., which are equivalent to the subfields 6701, 6702 and 6703) corresponding to the respective colors R, G and B, and the fields of the respective colors are outputted to the respective of spatial light modulators 5100 simultaneously, as exemplified in FIG. 33B. Also in this case, these subfields are outputted after being converted into the above described mirror control profile 6710 or mirror control profile 6720 for each of the fields 6700-2.

Figure 34A:
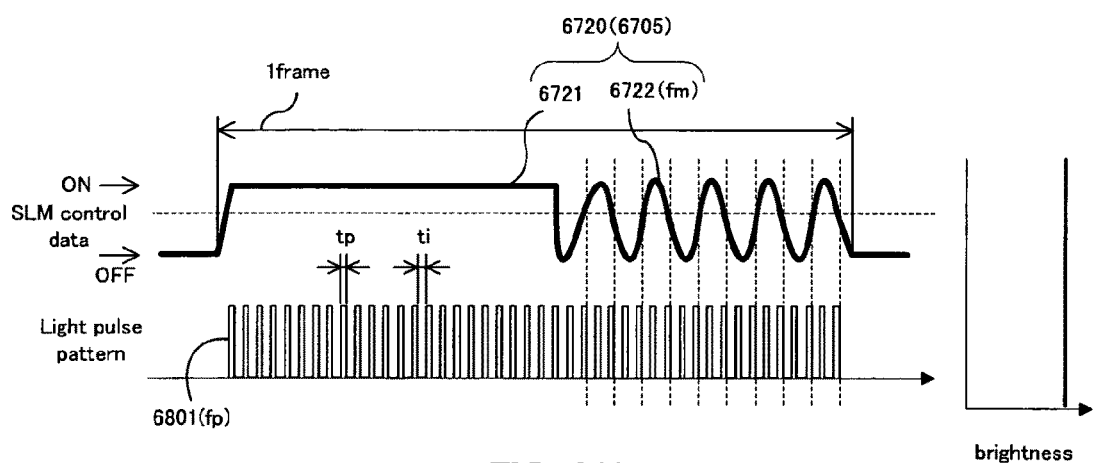
FIG. 34A is a timing diagram for showing a control signal used in a projection apparatus according to the embodiment of the present invention.
Figure 34B:
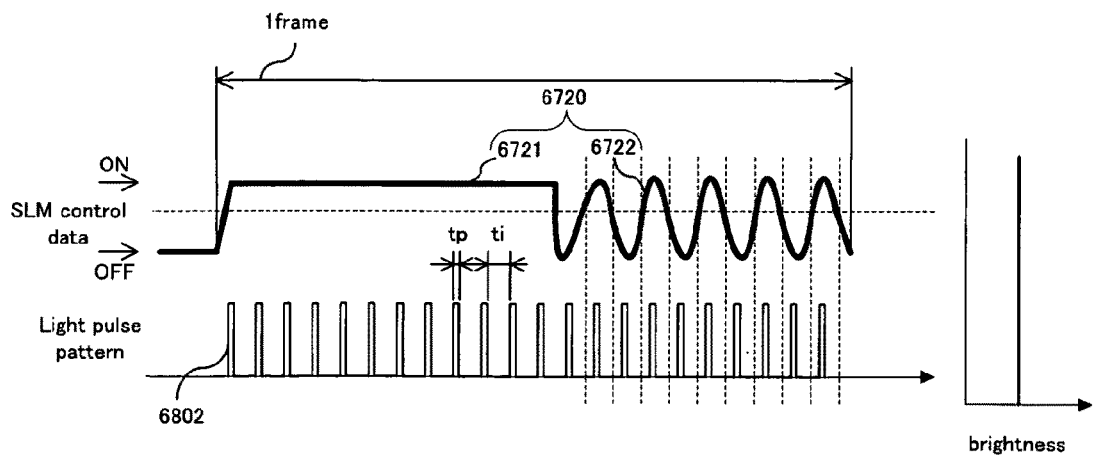
FIG. 34B is a timing diagram for showing another control signal used in a projection apparatus according to the embodiment of the present invention.

Next is a description, in detail, of the embodiment of controlling the variable light source 5210 with the light source profile control signal 5800 corresponding to the mirror control profile. FIGS. 34A and 34B are timing diagram for showing the waveform of a mirror control profile 6720, that is a control signal output from a SLM controller 5530 to a spatial light modulator 5100, and an example of the waveform of a light source pulse pattern 6801 generated by a light source control unit 5560 from a light source profile control signal 5800 corresponding to the aforementioned mirror control profile 6720.

In this case, one frame of the mirror control profile 6720 includes the combination of a mirror ON/OFF control 6721 in the early stage of the frame and a mirror oscillation control 6722 in the later stage of the frame and is used for controlling the tilting operation of the mirror corresponding to the gray scale of the present frame. The mirror ON/OFF control signal 6721 controls the mirror under either of the ON state or OFF states, and the mirror oscillation control signal 6722 controls the mirror 5112 under an oscillation state in which it oscillates between the ON state and OFF state.

The light source control unit 5560 changes the frequencies of the pulse emission of the variable light source 5210 in accordance with the signal (i.e., mirror control profile 6720) driving the spatial light modulator 5100.

The spatial light modulator 5100 is the above described mirror device 4000 and performs a spatial light modulation of the illumination light 5600 by means of a large number of mirrors corresponding to pixels to be displayed and of the tilting operation of the mirrors.

In controlling the mirror element with the mirror oscillation control signal 6722, the pulse emission frequency fp of the variable light source 5210 emitting the illumination light 5600 is preferably either higher (in the case of the light source pulse pattern 6801 shown in FIG. 34A) by ten times, or more, than the oscillation frequency fm of the oscillation control for the mirror, or lower (in the case of the light source pulse pattern 6802 shown in FIG. 34B) by one tenth, or less, than the frequency fm. The reason is that, if the oscillation frequency fm of the mirror and the pulse emission frequency fp of the variable light source 5210 are close to each other, a humming occurs which may hamper an accurate display of gray scales by means of the mirror oscillation control 6722.

Figure 34C:
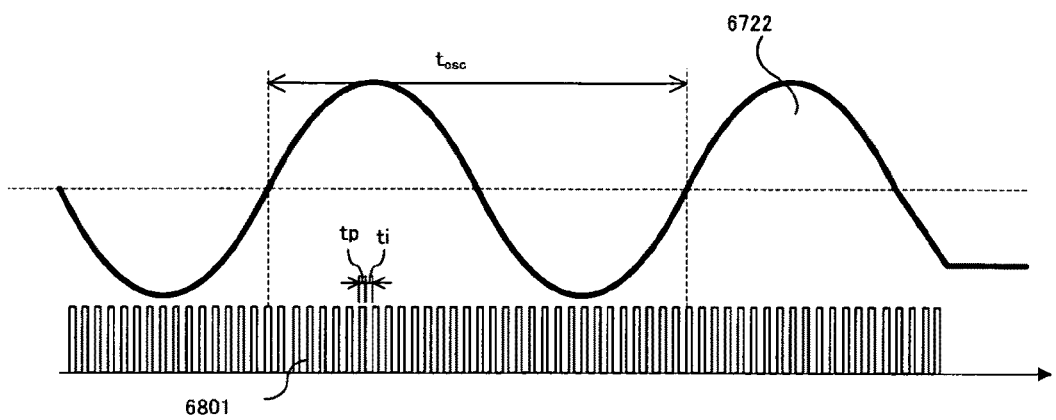
FIG. 34C is a timing diagram for showing an expanded portion of a control signal used in a projection apparatus according to the embodiment of the present invention.

FIG. 34C is a timing diagram for illustrating the above described light source pulse pattern 6801, which is shown by enlarging a part of the pulse pattern 6801. The timing diagram corresponds to the mirror oscillation control 6722. The mirror oscillation control 6722 control the mirror to oscillate at an oscillation cycle tosc (1/fm), and in contrast the light source pulse pattern 6801, perform pulse emission at a pulse emission frequency fp (1/(tp+ti)) with [emission pulse width tp+emission pulse interval ti] as one cycle. In this case, the condition is: fp>(fm*10). Based on what are shown in FIG. 34C, about 32 pulses of emission is carried out during the oscillation cycle tosc of the mirror oscillation control 6722. As described above, adjustment of the light intensity of the illumination light 5600 emitted from the variable light source 5210 is achievable by changing the frequencies of the pulse emission of the variable light source 5210.

Although the present invention has been described in terms of the presently preferred embodiment, it is to be understood that such disclosure is not to be interpreted as limiting. Various alternations and modifications will no doubt become apparent to those skilled in the art after reading the above disclosure. The present invention may be changed in various manners possible within the scope of the present invention, and is not limited to the configurations exemplified in the above-described embodiments. Accordingly, it is intended that the appended claims be interpreted as covering all alternations and modifications as fall within the true spirit and scope of the invention.

What is claimed is:

1. A mirror device comprising a plurality of deflectable mirrors each supported on a elastic hinge formed on a substrate with an electrode disposed near said hinge for applying a voltage thereon to control the mirror to deflect to a range of deflecting angles, wherein:

the electrode has an non-rectangular shape formed on a top surface of said substrate with an outer edge extends approximately in parallel to mirror edge wherein the electrode further comprises an intersecting edge intersecting said outer edge, and the intersecting edge is substantially parallel to a deflection axis of the deflectable mirror; and the electrode further contacts and stops the deflectable mirror when the deflectable mirror is deflected to a maximum deflection angle wherein the electrode is further covered by an insulation layer composed of an etchant resistant material to function as an electrode protective film from an etching process in forming the electrode.

2. The mirror device according to claim 1, wherein:
the outer edge and the interesting edge of the electrode have two different lengths.

3. The mirror device according to claim 1, wherein:
the electrode has a second outer edge extends substantially in parallel to another edge of the deflectable mirror.

4. The mirror device according to claim 1, wherein:
a top surface of electrode along said interesting edge extends in parallel to said deflection axis of the deflecting mirror contacts and stops.

5. The mirror device according to claim 1, wherein:
the electrode having the non-rectangular shape is configured with a shape satisfying the relationship of:

$$d1 \geq (L1 * d2)/L2,$$

where:

"L1" represents a distance between an inner edge of the electrode near the deflection axis of the deflectable mirror to a deflectable hinge, "L2" represents a distance between the intersecting edge of the electrode opposite said inner edge and away from the deflection axis of the mirror to the deflectable hinge, "d1" represents a vertical distance between the bottom surface of the mirror to the top surface of the electrode along the inner edge of the electrode near the deflectable hinge, and "d2" represents a vertical distance between the bottom surface of the mirror to the top surface of the electrode along the intersecting edge of the disposed away from the deflectable hinge.

6. The mirror device according to claim 1, wherein
the electrode has a stopper portion on a top surface of the electrode to contact and stop the deflectable mirror wherein said stopper portion is disposed away from the interesting edge away from the deflectable hinge.

7. The mirror device according to claim 1, wherein:
the electrode has a stopper portion on a top surface of the electrode to contact and stop the deflectable mirror wherein said stopper portion comprising substantially a stopper contact point on the top surface of the electrode.

8. The mirror device according to claim 1, wherein:
the electrode has a stopper portion on a top surface of the electrode to contact and stop the deflectable mirror wherein said stopper portion comprising substantially a stopper contact line on the top surface of the electrode.

9. The mirror device according to claim 1, wherein:
the drive electrode has a stopper portion on a top surface of the electrode to contact and stop the deflectable mirror wherein said stopper portion comprising substantially a stopper contact area on the top surface of the electrode.

10. The mirror device according to claim 1, wherein:
the electrode has a tilted top surface having a stopper contact area for contacting and stopping the deflectable mirror when oscillating to a maximum deflection angle.

11. The mirror device according to claim 1, wherein:
the electrode having a top surface comprising at least two stopper portions for contacting and stopping the deflectable mirror when oscillating to a maximum deflection angle.

12. The mirror device according to claim 1, wherein:
the electrode having a top surface comprising at least two stopper portions for contacting and stopping the deflectable mirror when oscillating to a maximum deflection angle wherein the stopper portions occupies at least thirty percent of the top surface.

13. The mirror device according to claim 1, wherein:
electrode having a top surface comprising a stopper portion for contacting and stopping the deflectable mirror wherein the stopper portion is covered with said insulation layer having a dielectric strength to sustain at least twice a driving voltage of the mirror device.

14. The mirror device according to claim 13, wherein:
the dielectric strength of the insulation layer covering said stopper portion on the top surface of the electrode is provided to sustain a voltage at least 3 volts.

15. The mirror device according to claim 1, wherein:
the mirror has an approximate square shape wherein the deflection axis of the mirror extends along a diagonal line thereof.

16. The mirror device according to claim 1, wherein:
a pitch between two adjacent mirrors is between 4 µm and 10 µm.

17. The mirror device according to claim 1, wherein:
the maximum deflection angle is adjustable by changing a configuration including a height, shape and location of the electrode by taking into account of an aperture ratio of a projection optical system to achieve a targeted resolution.

18. The mirror device according to claim 1, wherein:
the electrode having a top surface including a stopper portion for contacting and stopping the deflectable mirror wherein the stopper portion is covered with the insulation layer composed of a passivation material.

19. The mirror device according to claim 1, wherein:
the passivation material comprises a halide.

20. The mirror device according to claim 1, wherein:
at least a part of the electrode is covered with a layer composed of a low reflection material.

21. The mirror device according to claim 1, wherein:
at least a part of the electrode is covered with a film having a film thickness of approximately ¼ of the wavelength of the visible light.

22. A projection apparatus, comprising:
a light source;
an illumination optical system for condensing and directing an illumination light emitted from the light source;
a mirror device; comprising an array of mirror elements; each having a deflectable mirror for modulating the illumination light emitted from the light source; and
a projection optical system for projecting the light modulated by the mirror device, wherein
each of the mirror elements includes a drive electrode for driving the deflectable mirror, wherein the electrode formed on a top surface of a semiconductor substrate and covered by an insulation layer composed of an etchant resistant material to function as an electrode protective film from an etching process in forming the electrode wherein the electrode further contacts and stops the deflectable mirror at a maximum deflection angle and wherein
the maximum deflection angle of the mirror is adjustable by changing a configuration including a height, shape and location of the electrode in each of the mirror elements by taking into account an aperture ratio of the projection optical system.

23. The projection apparatus according to claim 22, wherein:
the maximum deflection angle of the mirror is between 2 degrees and 14 degrees relative to a horizontal mirror direction.

24. A projection apparatus, comprising:
a light source;
an illumination optical system for condensing and directing an illumination light emitted from the light source;
a mirror device comprising an array of mirror elements each having a deflectable mirror for modulating the illumination light emitted from the light source; and
a projection optical system for projecting the light modulated by the mirror device, wherein
each of the mirror elements includes a drive electrode for driving the deflectable mirror wherein the electrode is formed on a top surface of a semiconductor substrate and covered by an insulation layer composed of an etchant resistant material to function as an electrode protective film from an etching process in forming the electrode wherein the electrode further contacts and stops the deflectable mirror at a maximum deflection angle and wherein
the maximum deflection angle is adjustable by changing a configuration including a height, shape and location of the electrode in each of the mirror elements for achieving a target resolution.

* * * * *